United States Patent
Kerschner et al.

(10) Patent No.: US 8,750,570 B2
(45) Date of Patent: Jun. 10, 2014

(54) METHODS, SYSTEMS AND APPARATUS FOR AUTOMATED AUTHENTICATION

(71) Applicant: Security Pacific Capital Corporation, Seattle, WA (US)

(72) Inventors: Michael B. Kerschner, Puyallup, WA (US); Donald L. Gardner, Gig Harbor, WA (US)

(73) Assignee: Security Pacific Capital Corporation, Seattle, WA (US)

( * ) Notice: Subject to any disclaimer, the term of this patent is extended or adjusted under 35 U.S.C. 154(b) by 0 days.

(21) Appl. No.: 13/802,034

(22) Filed: Mar. 13, 2013

(65) Prior Publication Data

US 2013/0315437 A1    Nov. 28, 2013

Related U.S. Application Data

(60) Provisional application No. 61/651,786, filed on May 25, 2012.

(51) Int. Cl.
*G06K 9/00*    (2006.01)

(52) U.S. Cl.
USPC .......................................... 382/103; 348/135

(58) Field of Classification Search
USPC ......... 382/100, 103, 108, 109, 115, 119, 124, 382/141; 348/92, 135
See application file for complete search history.

(56) References Cited

U.S. PATENT DOCUMENTS 3,749,220 A * 7/1973 Tabiichi et al. ............... 194/319
4,234,071 A * 11/1980 Le-Hong ....................... 194/317

(Continued)

FOREIGN PATENT DOCUMENTS

JP    2001-175911 A    6/2001
JP    2007-18461 A     1/2007

(Continued)

OTHER PUBLICATIONS

Aguilar et al, "Off-the-shelf laser scanning and close-range digital photogrammetry for measuring agricultural soils microrelief," *Biosystems Engineering*, vol. 103, Issue 4, Aug. 2009, pp. 504-517, Abstract only, retrieved from http://www.sciencedirect.com/science/article/pii/S1537511009000622, on Oct. 1, 2013, 1 page.

(Continued)

*Primary Examiner* — Anand Bhatnagar
(74) *Attorney, Agent, or Firm* — Seed IP Law Group PLLC

(57) ABSTRACT

The present disclosure is directed to an automated precious metal bullion authentication apparatus and system that, without human intervention, develops and disseminates information to enable a user to distinguish between genuine and non-genuine precious metals bullion items. The systems and devices may work together with third-party hardware or software and, with Internet access, may be utilized 24/7, 365 days a year. The system or device enables a user to receive directly at a point of sale, or anywhere in public or private, information regarding whether an item is genuine or not. Information regarding genuineness of an item may be provided to the user before, during, or after a monetary or non-monetary exchange or transaction between individuals or entities. The system or device identifies and authenticates precious metal bullion items automatically through a multiplicity of procedures and renders a conclusion based on data from acquired digital images and other physical measurements.

129 Claims, 20 Drawing Sheets

(56) References Cited

U.S. PATENT DOCUMENTS

| | | | | | |
|---|---|---|---|---|---|
| 4,582,189 | A | * | 4/1986 | Schmitt | 194/317 |
| 4,898,564 | A | * | 2/1990 | Gunn et al. | 453/3 |
| 5,926,555 | A | | 7/1999 | Ort et al. | |
| 7,630,559 | B2 | * | 12/2009 | Ito et al. | 382/209 |
| 7,844,547 | B2 | * | 11/2010 | Amos | 705/43 |
| 8,321,330 | B2 | * | 11/2012 | Kerschner et al. | 705/37 |
| 8,339,589 | B2 | | 12/2012 | Jones et al. | |
| 2009/0192938 | A1 | * | 7/2009 | Amos | 705/43 |
| 2011/0047062 | A1 | | 2/2011 | Kerschner et al. | |
| 2011/0280440 | A1 | * | 11/2011 | Holt | 382/103 |
| 2012/0066097 | A1 | | 3/2012 | Amos | |
| 2012/0116559 | A1 | | 5/2012 | Davis et al. | |
| 2012/0301009 | A1 | | 11/2012 | Dabic | |
| 2013/0022237 | A1 | * | 1/2013 | Kuznetsov et al. | 382/103 |
| 2013/0041841 | A1 | | 2/2013 | Lyons | |

FOREIGN PATENT DOCUMENTS

| | | | |
|---|---|---|---|
| KR | 10-2007-0082362 A | | 8/2007 |
| WO | 2011/022424 A2 | | 2/2011 |
| WO | 2012/135346 A1 | | 10/2012 |

OTHER PUBLICATIONS

AndroLib, "Precious Metal Quotes," retrieved from http://www.androlib.com/android.application.com-goldeneaglecoin-wzzA.aspx, on Oct. 4, 2013, 3 pages.

Apple, inc., "iTunes Preview—Gold and Silver Spot Market Vault Calculator by William Sheppard," 2013, retrieved from https://itunes.apple.com/au/app/my-precious/id507343539?mt=8&ign-mpt=uo%3D2, on Oct. 4, 2013, 2 pages.

Apple, inc., "iTunes Preview—Gold Silver by APMEX," 2013, retrieved from https://itunes.apple.com/us/app/gold-silver/id347704868?mt=8, on Oct. 4, 2013, 2 pages.

Apple, inc., "iTunes Preview—Kcast Gold Live!+ by Kitco Metals Inc," 2013, retrieved from https://itunes.apple.com/us/app/kcast-gold-live/id298687558?mt=8&ign-mpt= . . . , on Oct. 4, 2013, 2 pages.

APMEX, "Buy & Sell Prices Right in the Palm of Your Hand," retrieved from http://www.apmex.com/mobileapps/, on Oct. 1, 2013, 1 page.

Author unknown, "Automated Assaying Apparatus Employing Close Range Photogrammetry and Associated Methods of Use and Manufacture," filed May 25, 2012, for U.S. Appl. No. 61/658,716, 33 pages.

BlackBerry World, "Gold Silver by American Precious Metals Exchange Inc.," BlackBerry 2013, retrieved from http://appworld.blackberry.com/webstore/content/5851/?countrycode=US&lang=en, on Oct. 4, 2013, 2 pages.

Burgess, "10 Ways Protect Yourself From Fake Bullion Coins," Investment U Research, Jan. 31, 2012, retrieved from http://investmentu.com/2012/January/fake-bullion-coins.html on Oct. 1, 2013, 7 pages.

EverBank, "Metals Select Allocated Account," retrieved from https://www.everbank.com/investing/metals/allocated, on Oct. 2, 2013, 3 pages.

Fryer et al., "Enhancement of Image Resolution in Digital Photogrammetry," *Photogrammetric Engineering & Remote Sensing* 67(6):741-749, Jun. 2001.

Gitanjali Mechatronics, "Portable Gold Testing Machine," retrieved from http://www.goldtest.in/portable-gold-testing-machine-564395.html on Oct. 1, 2013, 3 pages.

Hardy, "Measuring the 7Be Neutrino Flux From the Sun: Calibration of the Borexino Solar Neutrino Detector," Abstract of dissertation, Apr. 2, 2010, retrieved from http://scholar.lib.vt.edu/theses/available/etd-04092010-132651/, on Oct. 4, 2013, 2 pages.

International Search Report, mailed Jun. 28, 2013, for PCT/US2013/031054, 3 pages.

Kitco, "Kcast—Free Kitco apps for mobile and desktop," 2013 Kitco Metals Inc., retrieved from http://applications.kitco.com/supportcenter/, on Oct. 13, 2013, 2 pages.

Langlois, "Muthoot's MD: Buying Gold on Your Mobile Will Become As Popular As Online Travel," Visible Banking, Sep. 29, 2012, retrieved from http://www.visiblebanking.com/muthoot-md-buying-gold-mobile-will-become-popular-online-travel, on Oct. 1, 2013, 5 pages.

Moore, "Fantasy iPhone applications: 20 apps we would like to see," The Telegraph, Sep. 25, 2009, retrieved from http://www.telegraph.co.uk/technology/news/6230674/Fantasy-iPhone-applications-20-apps-we-would-like-to-see.html, on Oct. 1, 2013, 4 pages.

Morgan Mill Metals, "Mobileapps | Precious Metals Refining and Processing," 2010, retrieved from http://morganmillmetals.com/Mobileapps/, on Oct. 1, 2013, 1 page.

National Transaction, "High Risk Merchant Account for High Risk Credit Card Processing," National Transaction Corporation, 2013, retrieved from http://www.nationaltransaction.com/KnowledgeBase-High_Risk_Merchant_Account.php, on Oct. 1, 2013, 6 pages.

Northwest Territorial Mint, "MyBullion Tracker," retrieved from http://bullion.nwtmint.com/mybulliontracker.php, on Oct. 4, 2013, 7 pages.

PCMag, "The Top 100 Free Apps for Your Phone," retrieved from http://www.pcmag.com/article2/0,2817,2356415,00.asp, on Oct. 1, 2013, 5 pages.

PMDP—Plateau Mineral Development, Inc., "Plateau Mineral Secures $20,000,000 in Surety Underwriting for Gold Contract; Purchase and Shipping to Begin," Feb. 15, 2011, retrieved from http://hotstockmarket.com/t/71159/pmdp-plateau-mineral-development-inc/360, on Oct. 1, 2013, 3 pages.

Sheriff, "Calibration of the Nikon D200 for Close Range Photogrammetry," City College of New York, New York, SLAC National Accelerator Laboratory, Menlo Park, California, Aug. 14, 2009, 17 pages.

Shorter, "Unsupervised Building Detection From Irregularly Spaced Lidar and Aerial Imagery," dissertation, University of Central Florida, 2009, 168 pages.

Tao Economics, "Silver Apps and Gold Bullion Precious Metal Apps," retrieved from http://www.taoeconomics.com/content/silver-apps-and-gold-bullion-precious-metal-apps, on Oct. 1, 2013, 2 pages.

Theiss et al., "Independent Validation of Sensor Models in the Community Sensor Model Program," ASPRS 2006 Annual Conference, Reno, Nevada, May 1-5, 2006, 12 pages.

Thermo Scientific, "Gold Analysis, Silver Analysis & Precious Metal Testing," retrieved from http://www.niton.com/en/lp/preciousmetals?gclid=CIPc9uzGwrUCFQyg4AodRnAA4w on Oct. 1, 2013, 1 page.

Thermo Scientific, "Gold Analysis & Precious Metal Testing . . . Featuring the Thermo Scientific Niton DXL Precious Metal Analyzer and AuDIT Plating Detection Technology," retrieved from http://www.niton.com/en/metal-and-alloy-analysis/applications/goldanalysis on Oct. 1, 2013, 2 pages.

Whitmill, L.D., "Close-range Photogrammetry," *Engineering Field Notes*—United States Forest Service, Engineering Staff, Mar./Apr. 1986, vol. 18, 4 pages.

Windows Phone Apps + Games Store (United States), retrieved from http://www.windowsphone.com/en-us/store?ocid=sem_store&cmpid=sem_staS1FenL_perid_16510671157_kwd_phone%20apps_pmt_p on Oct. 1, 2013, 3 pages.

Windows Phone Apps + Games Store (United States), "Currency Exchanger," retrieved from http://www.windowsphone.com/en-us/store/app/currency-exchanger/84e93a20-cefb-460f-b0d9-a57689b33c10 on Oct. 1, 2013, 2 pages.

Written Opinion of the International Searching Authority, mailed Jun. 28, 2013, for PCT/US2013/031054, 5 pages.

Yeung, "65 Small Business Mobile Applications You Must Check Out," Small Business Trends, Apr. 28, 2011, retrieved from http://smallbiztrends.com/2011/04/small-business-mobile-applications.html, on Oct. 1, 2013, 16 pages.

* cited by examiner

METHODS, SYSTEMS AND APPARATUS FOR AUTOMATED AUTHENTICATION

CROSS-REFERENCE TO RELATED APPLICATION

This application claims the benefit under 35 U.S.C. §119 (e) of U.S. Provisional Patent Application No. 61/651,786 filed May 25, 2012, which is incorporated herein by reference in its entirety.

BACKGROUND

1. Field

The present disclosure relates to the field of counterfeit detection for precious metal bullion pieces, a term that encompasses bullion rounds, ingots and bars of pure or almost pure precious metal and used for investment. Examples of precious metal bullion pieces include but are not limited to sovereign bullion coins such as the South African Krugerrand, the American Gold and Silver Eagle, the Canadian Gold and Silver Maple Leaf and the Austrian Gold Philharmonic, and the like. The present disclosure relates to a method, system and apparatus utilized for the automated authentication of precious metal items for the primary purpose of counterfeit detection. An embodiment encompasses a device, method and system empowering the automatic authentication of precious metal bullion by utilizing computer vision and associated data capture techniques in conjunction with multiple non-destructive testing methodologies.

2. Description of the Related Art

Counterfeit or forged renditions of genuine examples of precious metal bullion items are illegal and made with the intent to defraud others. Investment grade bullion is defined as a bulk quantity of precious metal, usually gold, silver, platinum or palladium assessed by weight and typically cast as bars or coins. Bullion monetary value is based on precious metal content and fluctuates daily based upon world commodities markets.

The recent advancement in underlying technologies necessary to produce very high quality fakes along with advanced techniques in metallurgy necessary to produce sophisticated metal alloys has evolved making even moderately well trained counterfeiters capable of producing very good counterfeit coins and bars. Since 2008 the value of gold bullion has increased dramatically and high quality counterfeit coins and bars continue to be a problem for unknowing precious metals bullion investors. The subject matter disclosed and discussed herein meets a current and demanding need that has been identified by experts in the industry by implementing a portable, point of sale counterfeit bullion detection device. At present there exists no device that performs the multitude of testing procedures required for immediate, point of sale authentication for precious metal bullion products. An embodiment of the subject matter disclosed herein utilizes, in part, an optical digital metrology technique known as close range photogrammetry. An important basis for this type of macro digital imaging and measurement stems from similar concepts as utilized in computer vision and biometric recognition systems. The present disclosure provides a unique method by which a common person may utilize a fully automatic procedure to authenticate precious metal bullion by employing required multiple non-destructive tests within a single operation on a single device with the means to effectively and accurately authenticate bullion items without expert human participation and providing an automatic determination of genuineness to the user at the point of sale, before a purchase is made.

Today, accepted industry standard procedures utilized for the authentication of precious metal bullion products always include human participation in order to perform a series of evaluative testing procedures to accurately assay, assess and render a final decision determining the genuineness of a precious metal product. Human participation is usually performed by an experienced assayer, appraiser or grader with some past experience in precious metals assay and authentication. In order to effectively assay precious metal bullion one must accurately measure the critical physical properties of the subject and determine without fault the exact shape, weight, size, thickness, mass and volume while at the same time ascertaining the composition of any alloy, or base metal combination which determines the underlying precious metal fineness, or purity of the metal. The apparatus performs a full and complete assay of the subject coin but unlike numismatic collectables the apparatus disclosed and described herein does not assign a grade or condition nor does the apparatus of the disclosure assign any monetary value to precious metal bullion coin or bar. No determination as to coin grade, quality or value is attempted, or issued. However, the apparatus of the disclosure does automatically authenticate precious metal bullion coins and bars by using a definitive combination of industry standard non-destructive test procedures, without human participation in the assay. The sole purpose of the assay is to determine the authenticity and genuineness of the bullion coin or bar and issue an automatic pass or fail determination as to the genuineness of the item.

The bullion industry continues to recognize the distinct difference between the identification of a coin and the much more involved process of bullion coin or bar authentication. Simply put, it is known that the mere identification of a coin is to simply recognize it as a particular thing or item, thus essentially establishing the grand scale "make and model" of the item. It is also known that simply the identification of a coin or bar does not speak to the actual genuineness of the item. Alternatively, the series of processes undertaken for valid authentication sets forth on the path to establish "proof of identity" and as such necessitates performing a multiplicity of procedures or testing in accordance with actually confirming the truth of the "identity" already established on the grand scale. Accurate and reliable authentication can only be established with the reasonable confirmation of the primary attributes and data of the item under scrutiny. The proper procedure of "authenticating" a known identity must lie within the comparison of the attributes of the object itself to what is known about the origin of the object. A proper analogy for the purpose of further explanation of the difference between identifying an item and authenticating an item may be explained as simply as the following statement: "While the bank employee was standing outside the vault door waiting for permission to enter, the security camera on the wall identified him as employee Joe Smith. When Joe Smith placed his index finger upon the biometric fingerprint reader located at the vault door his identity was authenticated and permission was granted for entrance into the vault." Joe Smith's known identity was further authenticated with additional testing in order to confirm his known attributes of origin (fingerprints).

Today within all ranges of science and industry, including the commercial precious metals bullion industry there are certain analysis techniques and testing devices designed to evaluate properties of components, materials and metals without permanently causing damage to the material being investigated. These applications are known as non-destructive testing (NDT) procedures. Most often it is NDT testing procedures that are chosen to test precious metals items for the industry and private individuals. NDT testing devices widely vary and their differing techniques are utilized based upon the needs of individual users. Various testing procedures may rely upon the use of thermo-electric effects, electromotive force identification, electromagnetic radiation, x-ray fluorescence or diffraction, the measurement of acoustic velocity and other optical microscopy procedures, among others. Often combinations of NDT testing methodology may be used for determinations required in special categories of testing like the authentication of precious metal bullion. The investment bullion industry supports certain NDT testing depending on the needs of each user or client. It is known in the investment bullion industry in order to accurately authenticate investment bullion items like coins and bars no single NDT test procedure is considered adequate on its own to draw a conclusive, reliable determination of genuineness. For instance testing procedures utilizing x-ray fluorescence tools are widely used for elemental analysis on bullion products and are very accurate in breaking out specific alloy concentrations from base metals, but this test, in itself, is not a singular basis upon which to fully and accurately authenticate a bullion coin. It merely determines the mix of metallic elements of the item essentially qualifying the karat quality of the precious metal alloy. It will not quantify the precious metal nor does it weigh or measure other geometric properties of the coin. As a single test, it is inconclusive as a complete and accurate assay method for accurate authentication purposes. Likewise, the use of an ultrasonic NDT device made for measuring the acoustic velocity of sound pressure waves as they pass through an object, like a precious metal bullion coin, or bar, is quite effective at another level of inspection. It is very accurate in detecting imbedded foreign objects and other dissimilar metals, or inhomogeneous voids inside material. It is also accurate in measuring thicknesses of materials. On occasion, it is also used to create ultrasonic images of an item. A bullion coin tested with this NDT technology would certainly reveal internal flaws or voids in the precious metal, or identify imbedded slugs of a dissimilar metal. But, just as with the NDT x-ray technology a single ultrasound test does not qualify enough necessary information in order to complete a reliable assay effective enough to accurately authenticate a bullion coin or bar. The test may show that the coin has no internal flaws but ultrasound testing will not size, or weigh, the coin or qualify the precious metal alloy as to its fineness. Alternatively however, the apparatus and system of the disclosure are exceptionally capable of performing multiple tasks and testing procedures required in order to make an accurate judgment of genuineness and, if genuine, will automatically issue an immediate determination of authenticity for precious metal bullion items. The multiple testing procedures are either completed concurrently or consecutively and without participation in human will, or intervention by human hand.

Numismatic coin collecting is recognized worldwide as a hobby and is known officially as the study and collecting of coins, currency, medals, tokens and paper money. Numismatic coins have a monetary value based upon their rarity, demand, condition and mintage. Numismatic coin grading procedures rely heavily on a trained observer's eye and his experience in the field, and numismatic coins are graded using an industry standard alphanumeric scale. The scale rates all inspected coins using the following symbols; (G) for "good", (VG) for "very good", (F) for "fine", (VF) for "very fine", (EF or XF) for "extremely fine", (AU) for "about uncirculated", and (MS) for "mint state" condition coins. Mint state (MS) is the highest grade rating on a declining scale. In addition to the symbols used, each grade is assigned a numeric representation for its position within each recognized level. A number rating from 1-70 is assigned to each subject with 1 representing the worst possible condition of a specimen and 70 being the best possible condition. A coin rated as "mint state 70" (MS-70) would be considered the highest rating possible thus translating its graded condition and value assessment as superior to that of a lesser rating for coins of the same issue, for example "mint state 68" (MS-68). Other extenuating circumstances or market conditions may also allude to value adjustments up, or down, as determined by the professional grader. For instance a particular coin's rarity or popularity may figure into its final market value. Although coin graders are highly trained individuals usually held in high regard within the numismatic community, the industry also occasionally uncovers irregularities in awarded grading classifications. Some disagreement has been known to occur even between well respected graders as it is understood that, though grading standards are strictly adhered to, the subjective nature by which grades are applied may lead to occasional grade disparity, even among the most respected graders. The inherent difficulty in assessing accurate grades that are consistent is found within the actual process in which the system operates today. When classifying coins within the aforementioned scale categories, human intervention can lead to only subjective analysis at some level. The method of physically comparing the inspected subject to line drawings, photographs, textural descriptions and other facsimile coins cannot always lead to exact grade matches every time by every grader and are always susceptible to interpretation differences between the experts and, as a result, grade classifications even one step apart may have immense consequences in final values, creating thousands of dollars of difference in the potential assigned market value simply as a result of different professional grader's opinions and the resulting coin classification.

It is well known and realized within the industry that contemporary, or modern investment grade precious metal bullion is wholly different from numismatic collectable precious metal coins and bars that are graded and assigned value by professionals. Contemporary precious metal bullion essentially bears no premium value above its "melt value". A small dealer markup on each coin is usually all that's considered on each coin. The present device of the disclosure maintains only to measure the physical properties of the precious metal bullion in order to issue a determination of its genuineness. No market value is determined, contemplated or assigned.

From an investment perspective, precious metal bullion and numismatic precious metal collectables are not regarded the same as they differ tremendously in purpose as well as their respective function as an investment. A numismatist may collect precious metal bullion as part of a collection, but a serious bullion investor invests in physical bullion products primarily as a store of wealth separated from the fiat currency system and counter party risk. Thus, a very important distinction between the two types of precious metals, bullion vs. numismatic, is in part the manner in which the market value assessment for each is acquired and determined and assigned. It is commonly known by those in the art that precious metal bullion is valued strictly for its mass and purity of content, with its commercial market value reflective only of the daily spot market price offered for good delivery. It is also commonly understood in the industry that physical bullion possesses much lower premium fees than numismatic collectables making it more advantageous to acquire as a store of wealth for investors, as opposed to numismatic collectors who typically pay extra for an intrinsic value markup over the "melt value" of the precious metal. Physical bullion also requires no further assay, appraisal or third party grading process in order to qualify or quantify its precious metal content in the event an investor wishes to promptly liquidate his investment bullion holdings. Almost every sovereign mint issuer of bullion coins and bars makes a public claim to guarantee the authenticity of its own precious metal products. Accordingly, precious metal investors generally agree that physical bullion it is a relatively safe and secure investment tool as a store of wealth. The only realistic downside of purchasing investment grade bullion in today's market is that it requires the investor to trust his supplier. The quantity of trust is inversely scaled to the extent of one's own personal knowledge and expertise in precious metal bullion. In other words, the less one understands about bullion as an investor the more one needs to trust your supplier. Most typical bullion investors and dealers must rely on their individual personal knowledge and expertise in the industry, while at the same time optimistically trusting the supplier of the precious metal bullion.

Precious metal bullion in its various forms is not generally accepted as common currency or coinage in day to day commerce in most countries today. Numismatic coins, ancient coins and other types of collectable coins having greater market value than do common investment grade precious metal bullion items are rarely, if ever, exchanged bought, or sold, for their "melt value". For those knowledgeable in the art it is known that the term "melt value" means the current market value contract spot price associated with the underlying precious metal commodity for the known amount of content. Accordingly, "melt value" is utilized more often with investment grades of precious metal bullion, as opposed to numismatic collectables, and therefore generally recognized as a store of wealth proportionate to the volume, weight and fineness of the precious metal as held. It is commonly known today that precious metal bullion coins and precious metal numismatic collectable coins are not subjected to automated coin authenticators for assaying purposes simply because they do not exist. As mentioned, numismatic collectables generally have an assigned market value in excess of the known precious metal content of the coin due to other market driven conditions particular to that coin. For instance, supply and demand inconsistencies for individual issues, the coin's age, the coin's rarity, occasional misstrikes and manufacturing errors of production, or low volume issues may be factors in imparting an additional premium to the intrinsic monetary value. Numismatic collectables may be held in collections as a store of wealth much as investment grade bullion is held as a store of wealth. However, it is commonly known that numismatic collections are considered by those in the art as less liquid in the secondary market than investment grade precious metal bullion items tend to be.

Professional coin graders often assess numismatic coins and collectables with premium values based on their knowledge of the present market and the condition (grade) of the subject at the time of the inspection. The grader's findings are known to be substantially subjective and fully dependent upon each reviewer's individual past experience. Often multiple graders work independently of one another within the same organization and average the individual grades to establish a more uniform finding. Numismatic coins, ancient coins and other collectables that are graded in this manor tend to exhibit market values much greater than sovereign investment grade bullion. It is also commonly known by those in the art that sovereign minted precious metal bullion coins are produced with great care and precision only occasionally producing a misstrike or die defect example of an issue. Even though stringent manufacturing specifications are followed while striking or casting precious metal bullion items every design specification allows for minor deviations within the specified tolerance as an allowable standard of deviation. One knowledgeable in the art knows that the allowable specification deviation is known by the term "remedy". The apparatus and system of the disclosure understand remedy tolerance and utilize dedicated algorithms to identify those coins exhibiting allowable production specification tolerances (remedy) before final assaying conclusions are issued.

It is paramount to understand that the apparatus and system herein described is designed as a fully automated precious metal assaying and authentication system, independent in its operational system without the customary human intervention necessary to complete a multidisciplined assay and authentication of precious metal bullion, including the automatic issuance of a pass/fail determination of authenticity of the subject under review. More importantly, the apparatus and system of the disclosure do not purport to assign a market value or coin grade determination to the bullion upon completion of inspection, but simply indicates authentic subjects over those that are not genuine.

Significant technical advancements within the disciplines of computer science and optics have led to more refined techniques for computer vision and computer aided inspection greatly increasing the potential for superior assaying processes for bullion metals while at the same time implementing more efficient faster and lower cost alternatives than available previously. One embodiment of the apparatus of the present disclosure accomplishes the inspection and assaying procedure in part by accurately acquiring the physical properties and characteristics of the subject by using principles of image-based recognition, more specifically close range photogrammetry. The present disclosure provides to both novice and experienced users fully automatic image-based data collection for the purpose of precious metals bullion authentication.

BRIEF SUMMARY

In one embodiment it is disclosed that the apparatus, method and system produce high quality digital imagery of a precious metal bullion item in sufficient detail to establish accurate geometric and physical measurements and other data required producing an accurate determination as to the genuineness of the item under review. A combination of several techniques including photogrammetric processes, weight-scale interpretations and electromotive force identification accurately establishes the subject's volumetric properties and other recognizable physical characteristics. The data is compiled, reviewed and compared to an archived database library, accessed via an Internet-connected device to identify certain model matching criteria. The result is a complete assay and an issuance of an automated judgment as to the genuineness of the item under review. The described embodiment works as a tool devised to operate in harmony with precious metal bullion items.

The presently disclosed methods, systems, and devices may at times be utilized to re-authenticate bullion previously assayed by the same device or other devices, or humans. When associated with the proper database, a presently disclosed device may authenticate other bullion or items previously identified or authenticated by others. In such an event, bullion or numismatic collectibles may be reviewed, re-matched and/or re-authenticated as such.

It is commonly known by those knowledgeable in the art that all coins and ingots have individual discriminating marks or abrasions known as contact marks that are unique to every coin and caused by normal occurrences like circulation wear. Additionally, mint production tooling and internal operational procedures tend to create other unique identifying features and marks upon the surface of individual coins and ingots. Whether coins or bars are struck using high quality dies or cast within molds, contact marks start in the issuing mint's factory. Even two brand new same issue coins will exhibit differing "birth marks" from the factory. An embodiment of the disclosure incorporates an optical system that records detailed images and charts geometric maps of each coin's unique surface characteristics. These maps are known as constellation signature maps (GSM's) and are somewhat analogous to an individual fingerprint for each coin. CSM characteristics and properties are derived typically from simple identifying marks occurring from normal circulation-related wear, damage history or manufacturing die tooling marks that are incurred from mint production. These contact marks and other identifying scratches and dings make for an irrefutable pattern of individual coin surface feature identification. An embodiment of the apparatus and system images and records the dimensions of and interrelationships between surface imperfections like contact marks, nicks, scratches, bag marks, tooling marks and die defects. The apparatus and system of the disclosure then formulates geometric angles and calculates exact distances between measured inclusions, thereby creating recognizable spatial relationships and geometric patterns unique to every subject. The constellation signature maps are as unique to each coin and bar as fingerprints and iris scans are to humans. The unique CSM makes it readily possible to unambiguously recognize or distinguish individual coins from one another by fully understanding minute surface characteristic differences using feature extraction and pattern matching, then comparing data to an archived modelbase library. New coin data is simply added to the library as coins are identified and logged. More importantly, it is further expected that the constellation signature map for any given coin will change somewhat during its circulation life span. Additional wear and tear or damage after the initial imaging event may occur and is totally dependent upon each coin's chain of custody and handling care history. It is considered that normal circulation wear and tear will most likely add additional unique identifiers to the existing constellation signature map of record for any coin. It is also understood that added surface imperfections may partially obscure previously established data for the coin, possibly obscuring or partially obscuring established CSM points of reference relied on in the past. However, unless a previously archived CSM has been completely defaced by some catastrophic event (damage), the probability remains high that recorded surface imperfections of record will remain in sufficient number to maintain identity confirmation results having sufficient reference data to re-establish the previously recognizable CSM or unique pattern set for the subject. Accordingly, new data acquired during the latest inspection is simply overlaid on the existing data set creating a revised new CSM for the subject. A continuous historic data library builds for every specimen reviewed on a continuous basis throughout its circulation life. As such the apparatus and system effectively learns and then modifies the reference database set as repeated imaging over time produces enhanced data sets of the same CSM establishing a dynamic history component to the archived CSM model database library.

A method of operating an article of value exchange system, which includes at least one processor, at least one nontransitory process-readable storage medium communicatively coupled to the at least one processor, and at least one image acquisition subsystem communicatively coupled to the at least one processor, may be summarized as including receiving an article of value by an article of value receiving portion of the article of value exchange system; capturing by the image acquisition subsystem a set of surface characteristics from the article of value that uniquely identifies the article of value from other articles of value of a same type and from articles of value of other types; automatically performing a plurality of authenticity assessment tests on the received article of value without human intervention, the authenticity assessment tests assessing at least constituent metal content and weight of the received article of value; determining an authenticity of genuineness of the received article of value, by the at least one processor, based on an outcome of the plurality of assessment tests and nominal specifications for at least constituent metal content and weight; creating a digital signature for the received article of value, by the at least one processor, that includes information that uniquely reproducibly identifies the article of value from other articles of value of the same type and of different types; and causing a storing of the digital signature for the received article of value for later use in at least one of recognition or verification of the received article of value.

In the method of operating an article of value exchange system, capturing a set of surface characteristics from the article of value that uniquely identifies the article of value may include capturing a plurality of images that provide a three-dimensional representation of at least a portion of at least one surface of the received article of value. Capturing a set of surface characteristics from the article of value that uniquely identifies the article of value may include capturing a plurality of images of at least one entire surface of the received article of value. Capturing a set of surface characteristics from the article of value that uniquely identifies the article of value may include capturing a plurality of images of at least a portion of a first surface of the received article of value and from at least a portion of a second surface of the received article of value, the second surface diametrically opposed to the first surface across a center plane of the article of value. Performing a plurality of authenticity assessment tests on the received article of value may include performing electromagnetic eddy current tests on the received article of value and weighing the received article of value. Determining an authenticity of genuineness of the received article of value may include comparing an assessed metal composition of the article of value to a nominal metal composition for articles of value of the same type as the received article of value. Determining an authenticity of genuineness of the received article of value may include comparing an assessed weight of the article of value to a nominal weight for articles of value of the same type as the received article of value. Determining an authenticity of genuineness of the received article of value may include comparing an assessed metal purity of the article of value to a nominal metal purity for articles of value of the same type as the received article of value. Determining an authenticity of genuineness of the received article of value may include detecting a discontinuity in a metal composition of the article of value. Determining an authenticity of genuineness of the received article of value may include comparing at least one perimeter dimension of the article of value from a number of captured images of at least a portion of the article of value to a respective nominal perimeter dimension for the article of value. Determining an authenticity of genuineness of the received article of value may include comparing at least one non-unique surface characteristic to a nominal non-unique surface characteristic for articles of value of the same type as the received article of value. Creating a digital signature for the received article of value may include creating from the captured images a constellation signature map that represents a number of contact marks from wear and a number of birth marks from striking or casting of the received article of value. Creating a digital signature for the received article of value may include creating from the captured images a constellation signature map that represents surface characteristics including a number of contact marks from wear and a number of birth marks from striking or casting of the received article of value in three dimensions. Creating a digital signature for the received article of value may further include creating the digital signature based at least in part on one or more measured or assessed physical characteristics of the received article of value in addition to the surface characteristics represented by the constellation signature map. Causing a storing of the digital signature for the received article of value for later use may include transmitting the digital signature to a remotely located host processor-based system for distribution to a plurality of remotely distributed article of value exchange systems.

The method of operating an article of value exchange system may further include updating a transaction history of the received article of value. Updating a transaction history of the received article of value may include storing at least one of a timestamp when a transaction occurs, a date when the transaction occurs, a location where the transaction occurs, a current spot price at a time of the transaction, a mobile communications device identifying a unique set of geographic coordinates, or assigning a unique transaction identifier to uniquely identify the transaction.

The method of operating an article of value exchange system may further include automatically providing an indication of a guarantee of the authenticity of the article value at a completion of the transaction. Automatically providing the guarantee of authenticity may follow updating the transaction history, including by any one or more of the methods noted above.

The method of operating an article of value exchange system may further include handling a payment for an article of value of the same type as the received article of value by a payment receipt portion of the article of value exchange system and dispensing the received article of value by a dispensing portion of the article of value exchange system.

The method of operating an article of value exchange system may further include updating a transaction history of the received article of value being dispensed. Updating the transaction history may follow handling the payment and dispensing the received article.

The method of operating an article of value exchange system may further include recapturing by the image acquisition subsystem, immediately before dispensing the received article of value, a set of surface characteristics from the article of value that uniquely identifies the article of value from other articles of value of the same type and from articles of value of other types; recreating a digital signature for the received article of value immediately before dispensing, by the at least one processor, that includes information that uniquely reproducibly identifies the article of value from other articles of value of the same type and of different types; and verifying an identity of the article of value being dispensed based at least in part on the recreated digital signature. Recapturing the set of characteristics, recreating the digital signature, and verifying the identity of the article may follow handling the payment and dispensing the received article of value.

The method of operating an article of value exchange system may further include re-performing the plurality of authenticity assessment tests on the received article of value immediately before dispensing the received article of value, the authenticity assessment tests assessing at least constituent metal content and weight of the received article of value; and re-determining an authenticity of genuineness of the received article of value, by the at least one processor, immediately before dispensing the received article of value, based on an outcome of the plurality of assessment tests and nominal specifications for at least constituent metal content and weight. Re-performing the plurality of authenticity assessment tests and re-determining the authenticity of genuineness may follow handling the payment and dispensing the received article of value.

The method of operating an article of value exchange system may further include receiving, by the at least one processor, an indication from a first party to a transaction for the received article of value that all conditions of the transaction for the received article of value have been met; and in response to at least receipt of the indication from the first party, dispensing the received article of value to a second party of the transaction for the received article of value by a portion of the article of value exchange system.

The method of operating an article of value exchange system may further include receiving a payment by a payment receipt portion of the article of value exchange system for escrow services rendered by the article of value exchange system. Receiving payment for escrow services may follow receiving from the first party the indication that all conditions of the transaction have been met and dispensing the received article to the second party.

The method of operating an article of value exchange system may further include receiving, by the at least one processor, an indication from a first party to a transaction for the received article of value that a first set of conditions of the transaction for the received article of value has been met; receiving, by the at least one processor, an indication from a second party to the transaction for the received article of value that a second set of conditions of the transaction for the received article of value has been met; and in response to at least receipt of the indications that the first and the second set of conditions have been met, dispensing the received article of value to the second party of the transaction for the received article of value and releasing compensation to the first party of the transaction for the received article of value. Receiving the indications from the first and second parties, dispensing the article to the second, and releasing the compensation to the first party may follow receiving payment for escrow services.

A method of operating an article of value exchange system, which includes at least one processor, at least one nontransitory process-readable storage medium communicatively coupled to the at least one processor, and at least one image acquisition subsystem communicatively coupled to the at least one processor, may be summarized as including receiving an article of value by an article of value receiving portion of the article of value exchange system; capturing by the image acquisition subsystem a set of surface characteristics from the article of value that uniquely identifies the article of value from other articles of value of a same type and from articles of value of other types; determining or creating a digital signature of the received article of value, by the at least one processor, based at least in part on the captured set of surface characteristics; and recognizing, by the at least one processor, whether the received article of value was previously assessed based at least in part on the determined digital signature for the received article of value. Recognizing whether the received article of value was previously assessed may include comparing the determined or created digital signature of the received article of value to a number of respective stored digital signatures of other articles of value of at least the same type as the received article of value. Capturing a set of surface characteristics from the article of value that uniquely identifies the article of value may include capturing a plurality of images that provide a three-dimensional representation of at least a portion of a first surface of the received article of value and from at least a portion of a second surface of the received article of value, the second surface diametrically opposed to the first surface across a center plane of the article of value.

The method of operating an article of value exchange system may further include automatically performing a plurality of authenticity assessment tests on the received article of value, the authenticity assessment tests assessing at least constituent metal content and weight of the received article of value, and determining, by the at least one processor, an authenticity of genuineness of the received article of value, based on an outcome of the plurality of assessment tests and nominal specifications for at least constituent metal content and weight.

The method of operating an article of value exchange system may further include receiving a guarantee claim for the received article of value; verifying, by the at least one processor, that the received article of value is one of a plurality of articles of value which were previously authenticated and guaranteed; and determining whether to honor the guarantee claim for the received article of value based at least in part on an outcome of the verification.

The method of operating an article of value exchange system may further include, in response to an outcome of the verification indicating that the received article of value was previously authenticated and guaranteed, examining a transaction history of the received article of value.

The method of operating an article of value exchange system may further include, in response to an outcome of the verification indicating that the received article of value was previously authenticated and guaranteed, electronically crediting an account. Electronically crediting an account may follow examining the transaction history.

The method of operating an article of value exchange system may further include, in response to an outcome of the verification indicating that the received article of value was previously authenticated and guaranteed, automatically dispensing by the article of value exchange system a redeemable replacement article of value receipt for a like-kind redemption. Automatically dispensing a redeemable receipt may follow examining the transaction history.

The method of operating an article of value exchange system may further include, in response to an outcome of the verification that indicates that the received article of value was previously authenticated and guaranteed, automatically providing a redeemable voucher with a unique identifier for at least a portion of a monetary value associated with the guarantee. Automatically providing a redeemable voucher may follow examining the transaction history.

The method of operating an article of value exchange system may further include verifying, by the at least one processor, that the received article of value is one of a plurality of articles of values which were previously authenticated and, in response to an outcome of the verification that indicates that the received article of value is one of a plurality of articles of values which were previously authenticated, updating a transaction history of the received article of value. Updating a transaction history of the received article of value, may include storing at least one of a timestamp when a transaction occurs, a date when the transaction occurs, a location where the transaction occurs, a current spot price at a time of the transaction, or assigning a unique transaction identifier to uniquely identify the transaction.

The method of operating an article of value exchange system may further include verifying, by the at least one processor, that the received article of value is one of a plurality of articles of values which were previously authenticated and, in response to an outcome of the verification that indicates that the received article of value is one of a plurality of articles of values which were previously authenticated, offering a preferred exchange rate for the received verified article of value relative to unverified articles of value.

The method of operating an article of value exchange system may further include verifying, by the at least one processor, that the received article of value is one of a plurality of articles of values which were previously authenticated and, in response to an outcome of the verification that indicates that the received article of value is one of a plurality of articles of values which were previously authenticated, determining, by the at least one processor, whether an entity who has currently provided the received article of value to the article of value exchange system was the same entity to whom the article of value was previously dispensed, based at least in part on a transaction history of the received article of value.

The method of operating an article of value exchange system may further include, in response to a determination that the entity who has currently provided the received article of value to the article of value exchange system was previously dispensed the received article of value, updating the transaction history of the received article of value.

The method of operating an article of value exchange system may further include, in response to a determination that the entity who has currently provided the received article of value to the article of value exchange system was previously dispensed the received article of value, providing at least one of a discount, a credit, or a bonus to the entity.

In the various methods of operating an article of value exchange system recognizing whether the received article of value was previously assessed may include comparing the determined digital signature of the received article of value to a number of respective stored digital signatures of other articles of value of at least the same type as the received article of value.

In the various methods of operating an article of value exchange system capturing a set of surface characteristics from the article of value that uniquely identifies the article of value may include capturing a plurality of images that provide a three-dimensional representation of at least a portion of a first surface of the received article of value and from at least a portion of a second surface of the received article of value, the second surface diametrically opposed to the first surface across a center plane of the article of value.

The various methods of operating an article of value exchange system may further include automatically performing a plurality of authenticity assessment tests on the received article of value, the authenticity assessment tests assessing at least constituent metal content and weight of the received article of value, and determining, by the at least one processor, an authenticity of genuineness of the received article of value, based on an outcome of the plurality of assessment tests and nominal specifications for at least constituent metal content and weight.

The method of operating an article of value exchange system may further include causing, by the at least one processor, a storing of the determined digital signature for the received article of value for later use in at least one of recognition or verification of the received article of value.

The method of operating an article of value exchange system may further include updating, by the at least one processor, a previously stored digital signature for the received article of value based on the determined digital signature for the received article of value.

The method of operating an article of value exchange system may further include automatically providing an indication of a guarantee of the authenticity of the article value upon dispensing the article of value.

A method for bullion piece authentication may be summarized as including placing a bullion piece in contact with a bullion piece authentication device by a first user; automatically measuring one or more characteristics of the bullion piece by the bullion piece authentication device; automatically and with no human intervention, comparing measurement data, that is, the one or more characteristics of the bullion piece, to a reference set of information for authentic bullion pieces; automatically and with no human intervention, determining whether the bullion piece is authentic; displaying an indication to the first user indicative of whether the bullion piece is authentic; and the first user removing the authenticated bullion piece from contact with the bullion piece authentication device. Placing a bullion piece in contact with a bullion piece authentication device by a first user may include placing the bullion piece in a handheld bullion piece authentication device. Placing a bullion piece in contact with a bullion piece authentication device by a first user may include placing the bullion piece in a retaining area within the bullion piece authentication device. Placing a bullion piece in contact with a bullion piece authentication device by a first user may include contacting the bullion piece with a probe of the bullion piece authentication device. Automatically measuring one or more characteristics of the bullion piece may include measuring electromagnetic characteristics of the bullion piece. Measuring electromagnetic characteristics of the bullion piece may include measuring eddy currents. Automatically measuring one or more characteristics of the bullion piece may include imaging to capture identifying characteristics on a surface of the bullion piece. Automatically measuring one or more characteristics of the bullion piece may include weighing the bullion piece. Automatically measuring one or more characteristics of the bullion piece may include lighting the bullion piece with structured or diffuse lighting. Automatically measuring one or more characteristics of the bullion piece may include x-raying the bullion piece. Automatically measuring one or more characteristics of the bullion piece may include measuring acoustic velocity of the bullion piece. Automatically measuring one or more characteristics of the bullion piece may include measuring far field scattering signatures of the bullion piece. Comparing measurement data to a reference set of information may include comparing the measurement data to the reference set of information at a remote location from the bullion piece authentication device. Comparing measurement data to a reference set of information may include comparing the measurement data to the reference set of information at the bullion piece authentication device.

The method of bullion piece authentication may further include transmitting characteristics measurements over the Internet to a remote location from the bullion piece authentication device.

The method of bullion piece authentication may further include charging a service fee for providing an authentication service via the bullion piece authentication device.

The method of bullion piece authentication may further include debiting a financial account of the first user a service fee for providing an authentication service via the bullion piece authentication device.

The method of bullion piece authentication may further include debiting a user account of the first user a service fee for providing an authentication service via the bullion piece authentication device.

The method of bullion piece authentication may further include debiting a revolving credit card account of the first user a service fee for providing an authentication service via the bullion piece authentication device.

The method of bullion piece authentication may further include debiting a gift card account of the first user a service fee for providing an authentication service via the bullion piece authentication device.

The method of bullion piece authentication may further include charging a financial account of the first user a service fee on a monthly, annual or other intermittent basis for providing an authentication service via the bullion piece authentication device.

In the method of bullion piece authentication, the first user may be offered the authentication service for no charge. In the method of bullion piece authentication, the first user may be offered the authentication service for a charitable donation. In the method of bullion piece authentication, the first user may be offered the authentication service for a combination of partial fee and partial charitable donation.

The method of bullion piece authentication may further include automatically making an offer of guarantee of authenticity to the first user when the bullion piece is automatically determined to be authentic.

The method of bullion piece authentication may further include charging a service fee to the first user for issuing a guarantee of authenticity to the first user as offered when the bullion piece is automatically determined to be authentic.

The method of bullion piece authentication may further include debiting a financial account of the first user a service fee for providing a guarantee of authenticity to the first user as offered when the bullion piece is automatically determined to be authentic.

The method of bullion piece authentication may further include debiting a user account of the first user a service fee for providing a guarantee of authenticity to the first user as offered when the bullion piece is automatically determined to be authentic.

The method of bullion piece authentication may further include causing a debiting of a wireless carrier account of the first user for providing a guarantee of authenticity to the first user as offered when the bullion piece is automatically determined to be authentic.

The method of bullion piece authentication may further include debiting a revolving credit card account of the first user for providing a guarantee of authenticity to the first user as offered when the bullion piece is automatically determined to be authentic.

The method of bullion piece authentication may further include debiting a gift card account of the first user for providing a guarantee of authenticity to the first user as offered when the bullion piece is automatically determined to be authentic.

The method of bullion piece authentication may further include charging a financial account of the first user a service fee on a monthly, annual or other intermittent basis for providing a guarantee of authenticity to the first user as offered when the bullion piece is automatically determined to be authentic.

In the method of bullion piece authentication, the first user may be offered a guarantee of authenticity for no charge. In the method of bullion piece authentication, the first user may be offered a guarantee of authenticity for a charitable donation. In the method of bullion piece authentication, the first user may be offered a guarantee of authenticity for a combination of partial fee and partial charitable donation.

The method of bullion piece authentication may further include an automatic determination by the bullion piece authentication device that, based upon identification of unique surface marks of the bullion piece, the bullion piece is a specific bullion piece previously catalogued in a database.

An article of value exchange system may be summarized as including at least one processor; at least one nontransitory process-readable storage medium communicatively coupled to the at least one processor; at least one image acquisition subsystem communicatively coupled to the at least one processor; and at least one assessment test subsystem communicatively coupled to the at least one processor. The exchange system may include an article of value receiving portion configured to receive an article of value. The at least one image acquisition subsystem may be operable to capture a set of surface characteristics from the article of value that uniquely identifies the article of value from other articles of value of a same type and from articles of value of other types. The exchange system may be operable to automatically perform a plurality of authenticity assessment tests on the received article of value without human intervention. The authenticity assessment tests may include assessing at least constituent metal content and weight of the received article of value. The at least one processor may be operable to determine an authenticity of genuineness of the received article of value. The determination of genuineness may be based on an outcome of the plurality of assessment tests and nominal specifications for at least constituent metal content and weight. The at least one processor may be operable to create a digital signature for the received article of value. The digital signature may include information that uniquely reproducibly identifies the article of value from other articles of value of the same type and of different types. The exchange system may be operable to store the digital signature of the received article of value for later use in at least one of recognition or verification of the received article of value.

In the article of value exchange system, the at least one image acquisition subsystem may capture a plurality of images that provide a three-dimensional structure of at least a portion of at least one surface of the received article of value. In the article of value exchange system, the at least one image acquisition subsystem may capture a plurality of images that provide a three-dimensional structure of at least a portion of at least one entire surface of the received article of value. In the article of value exchange system, the at least one image acquisition subsystem may capture a plurality of images that provide a three-dimensional structure of at least a portion of at least a portion of a first surface of the received article of value and from at least a portion of a second surface of the received article of value, the second surface diametrically opposed to the first surface across a center plane of the article of value. In the article of value exchange system, the at least one assessment test subsystem may include an electromagnetic eddy current tester and a load cell and may perform a plurality of authenticity assessment tests on the received article of value that may include performing electromagnetic eddy current tests on the received article of value and weighing the received article of value. In the article of value exchange system, the at least one processor may determine an authenticity of genuineness of the received article of value that may include comparing an assessed metal composition of the article of value to a nominal metal composition for articles of value of the same type as the received article of value. In the article of value exchange system, the at least one processor may determine an authenticity of genuineness of the received article of value that may include comparing an assessed weight of the article of value to a nominal weight for articles of value of the same type as the received article of value. In the article of value exchange system, the at least one processor may determine an authenticity of genuineness of the received article of value that may include comparing an assessed metal purity of the article of value to a nominal metal purity for articles of value of the same type as the received article of value. In the article of value exchange system, the at least one processor may determine an authenticity of genuineness of the received article of value that may include detecting a discontinuity in a metal composition of the article of value. In the article of value exchange system, the at least one processor may determine an authenticity of genuineness of the received article of value that may include comparing at least one perimeter dimension of the article of value from a number of captured images of at least a portion of the article of value to a respective nominal perimeter dimension for the article of value. In the article of value exchange system, the at least one processor may determine an authenticity of genuineness of the received article of value that may include comparing at least one non-unique surface characteristic to a nominal non-unique surface characteristic for articles of value of the same type as the received article of value. In the article of value exchange system, the at least one processor may create from the captured images a constellation signature map that may represent a number of contact marks from wear and a number of birth marks from striking or casting of the received article of value. In the article of value exchange system, the at least one processor may create from the captured images a constellation signature map that may represent surface characteristics including a number of contact marks from wear and a number of birth marks from striking or casting of the received article of value in three dimensions. In the article of value exchange system, the at least one processor may create a digital signature for the received article of value that may further include creating the digital signature based at least in part on one or more measured or assessed physical characteristics of the received article of value in addition to the surface characteristics represented by the constellation signature map. In the article of value exchange system, the exchange system may store the digital signature for the received article of value for later use that may include transmitting the digital signature to a remotely located host processor-based system for distribution to a plurality of remotely distributed article of value exchange systems. In the article of value exchange system, the processor may update a transaction history of the received article of value. In the article of value exchange system, updating a transaction history of the received article of value may include storing at least one of a timestamp when a transaction occurs, a date when the transaction occurs, a location where the transaction occurs, a current spot price at a time of the transaction, a unique mobile communications device identifying a set of geographic coordinates, or assigning a unique transaction identifier to uniquely identify the transaction. In the article of value exchange system, the exchange system may automatically provide an indication of a guarantee of the authenticity of the article value at a completion of the transaction. In the article of value exchange system, a payment receiving portion of the exchange system may handle a payment for an article of value of the same type as the received article of value and a dispensing portion of the exchange system may dispense the received article of value.

In the article of value exchange system, the processor may update a transaction history of the received article of value being dispensed. In the article of value exchange system, immediately before the dispensing portion of the exchange systems dispenses the received article of value, the image acquisition subsystem may recapture a set of surface characteristics from the article of value that may uniquely identify the article of value from other articles of value of the same type and from articles of value of other types; the at least one processor may recreate a digital signature for the received article of value that may include information that uniquely reproducibly identifies the article of value from other articles of value of the same type and of different types; and the at least one processor may verify an identity of the article of value being dispensed based at least in part on the recreated digital signature. In the article of value exchange system, immediately before the dispensing portion of the exchange systems dispenses the received article of value, the at least one assessment test subsystem may re-perform the plurality of authenticity assessment tests on the received article of value that may include assessing at least constituent metal content and weight of the received article of value; and the at least one processor may re-determine the authenticity of genuineness of the received article of value, based on an outcome of the plurality of assessment tests and nominal specifications for at least constituent metal content and weight. In the article of value exchange system, the at least one processor may receive an indication from a first party to a transaction for the received article of value that all conditions of the transaction for the received article of value have been met and, in response to at least receipt of the indication from the first party, may dispense the received article of value to a second party of the transaction for the received article of value by a dispensing portion of the article of value exchange system. In the article of value exchange system, a payment receipt portion of the exchange system may receive a payment for escrow services rendered by the exchange system. In the article of value exchange system, the at least one processor may receive an indication from a first party to a transaction for the received article of value that a first set of conditions of the transaction for the received article of value have been met; the at least one processor may receive an indication from a second party to the transaction for the received article of value that a second set of conditions of the transaction for the received article of value have been met; and in response to at least receipt of the indication that the first and the second set of conditions have been met, a dispensing portion of the exchange system may dispense the received article of value to the second party of the transaction for the received article of value; and the exchange system may release compensation to the first party of the transaction for the received article of value.

An article of value exchange system may be summarized as including at least one processor; at least one nontransitory process-readable storage medium communicatively coupled to the at least one processor; and at least one image acquisition subsystem communicatively coupled to the at least one processor. An article of value receiving portion of the exchange system may be configured to receive an article of value. The at least one image acquisition subsystem may be operable to capture a set of surface characteristics from the article of value that uniquely identifies the article of value from other articles of value of a same type and from articles of value of other types. The at least one processor may be operable to create a digital signature for the received article of value. The digital signature may include information that uniquely reproducibly identifies the article of value from other articles of value of the same type and of different types. The at least one processor may be operable to recognize whether the received article of value was previously assessed based at least in part on the determined digital signature for the received article of value.

In the article of value exchange system, the exchange system may receive a guarantee claim for the received article of value; may verify, by the at least one processor, that the received article of value is one of a plurality of articles of value which were previously authenticated and guaranteed; and may determine whether to honor the guarantee claim for the received article of value based at least in part on an outcome of the verification. In the article of value exchange system, in response to an outcome of the verification indicating that the received article of value was previously authenticated and guaranteed, the exchange system may examine a transaction history of the received article of value. In the article of value exchange system, in response to an outcome of the verification indicating that the received article of value was previously authenticated and guaranteed, the exchange system may electronically credit an account. In the article of value exchange system, in response to an outcome of the verification indicating that the received article of value was previously authenticated and guaranteed, the exchange system may automatically provide a redeemable voucher with a unique identifier for at least a portion of a monetary value associated with the guarantee. In the article of value exchange system, the exchange system may verify, by the at least one processor, that the received article of value is one of a plurality of articles of values which were previously authenticated and, in response to an outcome of the verification that indicates that the received article of value is one of a plurality of articles of values which were previously authenticated, may update a transaction history of the received article of value. In the article of value exchange system, updating a transaction history of the received article of value, may include storing at least one of a timestamp when a transaction occurs, a date when the transaction occurs, a location where the transaction occurs, a current spot price at a time of the transaction, or assigning a unique transaction identifier to uniquely identify the transaction. In the article of value exchange system, the exchange system may verify, by the at least one processor, that the received article of value is one of a plurality of articles of values which were previously authenticated and, in response to an outcome of the verification that indicates that the received article of value is one of a plurality of articles of values which were previously authenticated, may provide a preferred exchange rate for the received verified article of value relative to unverified articles of value. In the article of value exchange system, the exchange system may verify, by the at least one processor, that the received article of value is one of a plurality of articles of values which were previously authenticated and, in response to an outcome of the verification that indicates that the received article of value is one of a plurality of articles of values which were previously authenticated, may determine, by the at least one processor, whether an entity who has currently provided the received article of value to the article of value exchange system was previously dispensed the received article of value based at least in part on a transaction history of the received article of value. In the article of value exchange system, in response to a determination that the entity who has currently provided the received article of value to the article of value exchange system was the entity to whom the received article of value was previously dispensed, the exchange system may update the transaction history of the received article of value. In the article of value exchange system, in response to a determination that the entity who has currently provided the received article of value to the article of value exchange system was the entity to whom the received article of value was previously dispensed, the exchange system may provide at least one of a discount, a credit, or a bonus to the entity. In the article of value exchange system, operable to recognize whether the received article of value was previously assessed may include operable to compare the determined digital signature of the received article of value to a number of respective stored digital signatures of other articles of value of at least the same type as the received article of value. In the article of value exchange system, operable to capture a set of surface characteristics from the article of value that uniquely identifies the article of value may include operable to capture a plurality of images that provide a three-dimensional representation of at least a portion of a first surface of the received article of value and from at least a portion of a second surface of the received article of value, the second surface diametrically opposed to the first surface across a center plane of the article of value. In the article of value exchange system, the exchange system may automatically perform, by at least one assessment test subsystem, a plurality of authenticity assessment tests on the received article of value. The authenticity assessment tests may assess at least constituent metal content and weight of the received article of value, and may determine, by the at least one processor, an authenticity of genuineness of the received article of value based on an outcome of the plurality of assessment tests and nominal specifications for at least constituent metal content and weight. In the article of value exchange system, the exchange system may store, by at least one processor, the determined digital signature for the received article of value for later use in at least one of recognition or verification of the received article of value. In the article of value exchange system, the exchange system may update, by at least one processor, a previously stored digital signature for the received article of value based on the determined digital signature for the received article of value. In the article of value exchange system, the exchange system may automatically provide an indication of a guarantee of the authenticity of the article value upon a dispensing the article of value.

A bullion piece authentication device may be summarized as including at least one processor; at least one nontransitory process-readable storage medium communicatively coupled to the at least one processor; at least one bullion piece measurement subsystem communicatively coupled to the at least one processor; and at least one bullion piece contact site configured to contact a bullion piece. The at least one bullion piece measurement subsystem may be operable to measure physical characteristics of the bullion piece placed by a user in contact with the bullion piece contact site of the authentication device. The at least one processor may be operable to compare measurement data for the bullion piece placed by the user in contact with the bullion piece contact site of the bullion piece authentication device to a reference set of data for authentic bullion pieces. The at least one processor may be operable to determine the authenticity of the bullion piece placed by the user in contact with the bullion piece contact site of the bullion piece authentication device. The bullion piece authentication device may be operable to display to the user an indication of authenticity of the bullion piece. The bullion piece authentication device may transmit measured characteristics of a bullion piece over the Internet to a location remote from the authentication device. The bullion piece authentication device may charge a service fee to the user for providing an authentication service to the user. The bullion piece authentication device may make an offer of guarantee of authenticity to the user. The bullion piece authentication device may charge a service fee to the user for providing a guarantee of authenticity to the user. The bullion piece authentication device may automatically determine for a bullion piece processed in the authentication device, based on unique surface marks of the bullion piece, that the bullion piece is a specific bullion piece previously catalogued in a database.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
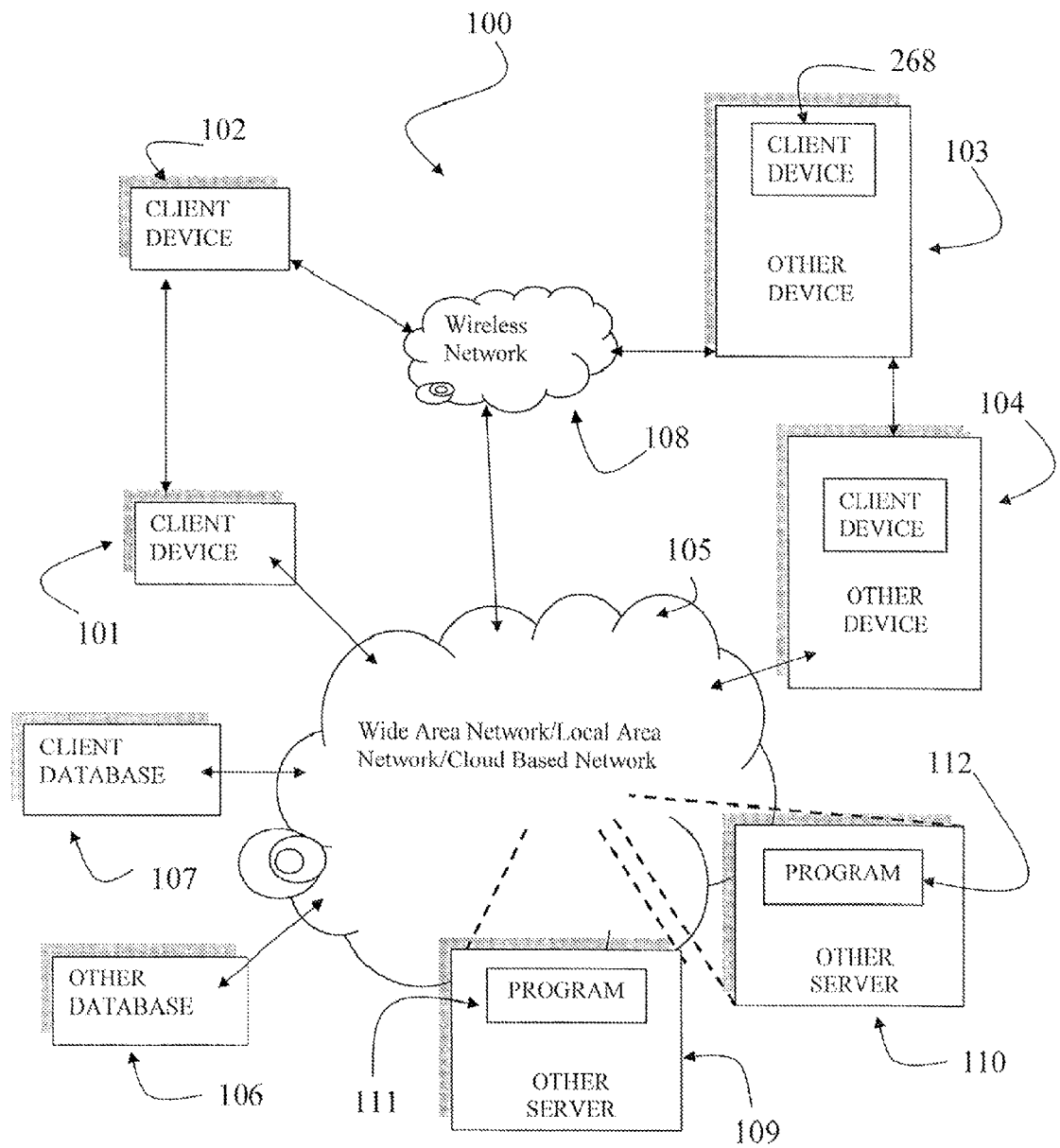
FIG. 1 is a schematic diagram of a system or environment including client devices, databases, servers and a communications network according to one illustrated embodiment.

In the following description, certain specific details are set forth in order to provide a thorough understanding of various embodiments of the disclosure. However, one skilled in the art will understand that the disclosure may be practiced without these details, or with other methods, components, materials, etc. In other instances, well-known structures associated with servers, networks, displays, and/or with computer type devices have not been shown or described in detail to avoid unnecessarily obscuring descriptions of the embodiments.

As used in this specification and the appended claims, the following terms take the meanings explicitly associated herein, unless the context clearly dictates otherwise. The word "comprise" and variations thereof, such as, "comprises" and "comprising" are to be construed in an open, inclusive sense, that is as "including, but not limited to." The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used in this specification and the appended claims, notwithstanding external definitions, the terms "automated", "automatic" or "automated" refer to acting or operating in a manner essentially independent of external influence or control, largely or wholly involuntary, as in "accomplished by machine" or by mechanical means without human intervention in will or in hand. These terms refer to the described processes, apparatus, methods and systems of the disclosure utilized for determining bullion item genuineness and authenticity without interference, assistance or intervention of human will or human physical involvement in the process, as in a machine or device or apparatus able to perform its designed function independently.

As used in this specification and the appended claims, notwithstanding external definitions, the term "assay" means an investigative procedure and analysis for qualitatively assessing or quantitatively measuring the presence or amount of a target entity in any given sample.

As used in this specification and the appended claims, notwithstanding external definitions, the term "bullion" refers to any form of precious metal in the form of cast or struck, ingots, rounds, or bars. It is commonly known in the art that precious metal in bulk form is known as bullion and is usually gold, silver, platinum or palladium and is assessed by weight. Bullion monetary value is based on its precious metal content and fluctuates daily based upon world commodities market spot pricing.

As used in this specification and the appended claims, notwithstanding external definitions, the term "numismatic", or "numismatic collectables" refers to the study or collection of currency including coins, tokens, paper money and other related objects as a hobby.

Numismatic or collectable coinage often trades at values over and above the actual melt value of any precious metal found within the coin. Coin grading factors establishing market value are recognized as subjective in nature and may be determined somewhat by the experience and the trained eye of the technician, grading inspector or assayer. When numismatic coins are inspected and graded their condition and rarity is often rated utilizing a commonly recognized alphanumeric grading scale for the industry. Graded specimens may be found encapsulated within a coin or ingot case known within the industry as a slab. The slab attempts to preserve the coins state of condition observed at the time of grading. Most holders utilized by reputable grading organizations are clear or translucent in color, thereby allowing the unencumbered visual inspection of the item while at the same time offering some protection from possible future degradation due to handling or accidents. Cases or holders are also generally marked with the identifying information of the grader and the specimen including the condition and grade of the specimen held within the case. Encapsulating slabs are sometimes considered to be a deterrent to counterfeiting, although not a foolproof method.

As used in this specification and the appended claims, the term "article of value" generally refers to any precious metal item or material disclosed herein, including any type or form of bullion or numismatic collectable. For example, an article of value may be in the form of an ingot, a round, a bar.

As used in this specification and the appended claims, notwithstanding external definitions, the terms "identify" or "re-identify" means to recognize as a particular thing (object).

As used in this specification and the appended claims, notwithstanding external definitions, the term "authenticate", "re-authenticate" or "authentication" means establishing "proof of identity" through the act of confirming the truth of an attribute of a datum or entity by comparing attributes of the object itself to what is known about the objects origin.

As used in this specification and the appended claims, notwithstanding external definitions, the term "modelbase" refers to any form of database, symbolic or statistical, that the present disclosure utilizes, or acquires data from, or adds data to, by way of the internet through its communicatively connected host device in order to perform any function of its intended or unintended use.

As used in this specification and the appended claims, notwithstanding external definitions, the term "testing" or "test" means any investigative procedure, examination, experiment, investigation, checking, analysis, assessment, or sensing in order to learn or accumulate data or knowledge to be utilized in the apparatus, methods or systems of the disclosure, therefore they may be used interchangeably.

As used in this specification and the appended claims, notwithstanding external definitions, the terms "mobile" or "handheld" or "portable" may be used interchangeably and depict that a user of a device or apparatus has the option to utilize the device or apparatus while being held in the hand or hands during operation of the device while performing its intended function as configured and designed, and while the user and device may be in a non-sedentary state of physical progress or movement across a geographical space while such device or apparatus does not require a connection to a fixed power source or fixed source of communication or data transfer, rather than being mounted or at rest.

As used in this specification and the appended claims, notwithstanding external definitions, the terms "stationary", "desktop" and "countertop" devices may be used interchangeably and depict a device or apparatus during its operation performing as designed and intended while remaining at rest or in a fixed position.

The headings and Abstract of the Disclosure provided herein are for convenience only and do not interpret the scope or meaning of the embodiments.

A number of embodiments of the methods, systems and devices are described herein with reference to the accompanying drawings FIGS. 1-25, which form a part hereof, and which show by way of illustration specific embodiments by which the disclosure may be practiced. The disclosure may, however, be embodied in many different forms and should not be construed as limited to the embodiments set forth herein; rather, these embodiments are provided so that this disclosure will be thorough and complete, and will fully convey the subject matter disclosed herein to those skilled in the art.

Among other things, the present disclosure may be embodied as methods, systems or devices, or all. Accordingly, the present disclosure may take the form of an entirely hardware embodiment, an entirely software embodiment, or an entirely operational process scheme or any embodiment combining aspects of the software, hardware and the operational scheme. The following detailed description is therefore not to be taken in a limiting sense.

As described, embodiments of the present disclosure are directed toward an assay based authentication system, method and apparatus for precious metal bullion that enables an average person, not trained in the art, to immediately realize the genuineness of such an item in order to better understand, exchange, collect, purchase or sell bullion items while remaining confident that the items are in fact genuine. Herein described in detail are particular embodiments of the apparatus, systems and methods demonstrating comprehensive capabilities of executing feature extraction, data recognition, data collection, data comparison leading to an automatic issuance of a determination as to the authenticity of bullion items, without the intervention of human will, knowledge or hand.

The present apparatus and system of the disclosure will automatically assay and identify new and old data and authenticate genuine bullion items including bullion items not previously known to a person as genuine or authentic, or reaffirm authenticity of bullion items that are previously known to a person as genuine and authentic.

An important basis and reasoning of the operational method of the disclosure is found within aspects of the art and practice of optics and close range photogrammetry including disciplines within physiological biometric identification, automated identification and data capture technologies and electromotive force identification including eddy current sensing and evaluation. Combinations of aspects of these technologies while combined with the disclosed capabilities provides a unique apparatus, system and method of digital image dimensioning that disentangles recorded symbolic information with the aid of geometry, physics and statistics to accurately measure and scale certain physical attributes of bullion, like size, proportion, weight, luster, relative density, mass and volume, while referencing the acquired data with a model library via an Internet-connected device.

A further embodiment of the disclosure comprises an additional basis and reasoning structure of the operational system which is found within the practice of weighing a subject accurately using computational and force sensing procedures. For example, weight which is the function of force on an object due to gravity, can be calculated from accurately rendered and measured 3D imagery.

As one skilled in the art understands, equal volumes of two substances have the same mass. Density is mass per unit volume. Relative density is explained as the ratio of the density of a substance to the density of a given reference material. If the identified subject's relative density is less than 1, then it is determined as being less dense than the reference material. If a subject's relative density is greater than one, then it is determined as being denser than the reference material. If the subject's density equals one, then it is determined as being as dense as the reference material. Therefore to one skilled in the art it is reasoned that when the reference material is in fact a known parameter such as the factory specification material for the identified subject then it can be surmised that the inspected subject is, or is not, weight correct. However, true weight conclusions based upon computational or geometric weight assumptions can be substantiated with the physical task of weighing the material density of the subject. Therefore, the herein described embodiment provides for a scale as incorporated in FIGS. 4, 4A and 4B.

Another embodiment of the disclosure comprises a basis and reasoning of the operational method of the disclosure, including the practice of electromotive force identification, in particular electromagnetic eddy current sensing. Every metal and alloy has unique electromagnetic properties that can be used to identify the material, given the capability to measure those properties with enough precision. Eddy current testing with higher frequencies gives better differentiation between materials, but lower frequencies penetrate further and can detect material differences at the center of the bullion. Gold and other metals used to make most 22 karat gold alloys, copper and silver, are diamagnetic metals. Their magnetic permeability is less than air. This means that they interact weakly with magnetic fields. These three metals also have the highest conductivities of all metals. High quality modern counterfeit gold bullion coins and bars typically contain an amount of tungsten because of density similarities to that of gold and its relative cost. Tungsten metal is paramagnetic in its magnetic ordering. It has magnetic permeability higher than air and interacts more strongly with magnetic fields. Two other metals, nickel and iron are also used to make a tungsten alloy with a density virtually identical to 22 karat gold. Nickel and iron are both ferromagnetic and interact very strongly with magnetic fields. All three of these metals are relatively poor electrical conductors. The electromagnetic properties of pure 24 karat gold and 22 karat gold are significantly different from tungsten and its alloys thus readily distinguishable from high quality tungsten fakes when utilizing electromotive force identification techniques. Multiple eddy current drive frequencies may be utilized to detect dissimilar metals and metal slugs deep within a gold coin. Another embodiment may determine that alternative eddy current methodology like lift-off techniques may be utilized to detect alternate alloy compositions if so deemed necessary.

A multiplicity of technologies and methodologies like computer vision, electromotive force identification, weight scale measurement and computational reasoning support the rationale behind employing the disclosed methods, systems and devices to automatically assay and authenticate bullion rather than simply identify a certain "make" or "model" of a coin. For those skilled in the art it is known that photogrammetric processes are used to acquire, process, analyze and understand high dimensional data derived from either static or dynamic imagery producing numerical and symbolic information which may be configured specifically to acquire data for determining bullion authenticity.

Embodiments of the disclosure may be designed to work on their own, independent of outside hardware or power sources, or as herein described configured to work within, or with, other machines, devices, apparatus' or other primary applications. The apparatus and system of the disclosure may be configured to operate as a peripheral unit of another machine, or in an alternate configuration as an integrated accessory device when connected communicatively to another device such as a computer, ATM machine, vending machine or handheld mobile device, tablet or the like. In the event the device is configured to operate together with another device it may connect to such device by a variety of methods.

For example, one option may initiate a hard wired connection between the device and the host Internet-connected other device, or wireless, Bluetooth©, LAN, WAN or WiFi networking connections, among other methods. The disclosed device or system, by way of an Internet-connected host device, has access directly or indirectly to one or more international networks and one or more databases assisting it in making determinations of bullion genuineness. Users may utilize the disclosed method, system or device within the privacy of their own home, the work place or within the public as long as adequate access to the database is available. The user simply presents the review specimen to the device in the manner required and waits a short period of time for the notification of genuineness to be delivered. Items that are deemed ingenuine are addressed as such.

Communication, notifications and user prompts are delivered to the user in a variety of ways through the host (other) device such as visually through a touch screen interface or in combination with audio or haptic feedback or by email, messaging or the like. The device may be utilized 24/7, 365 days a year with no interruption in productive service as long as the host (other) device has active, available access to the Internet.

Figure 4:
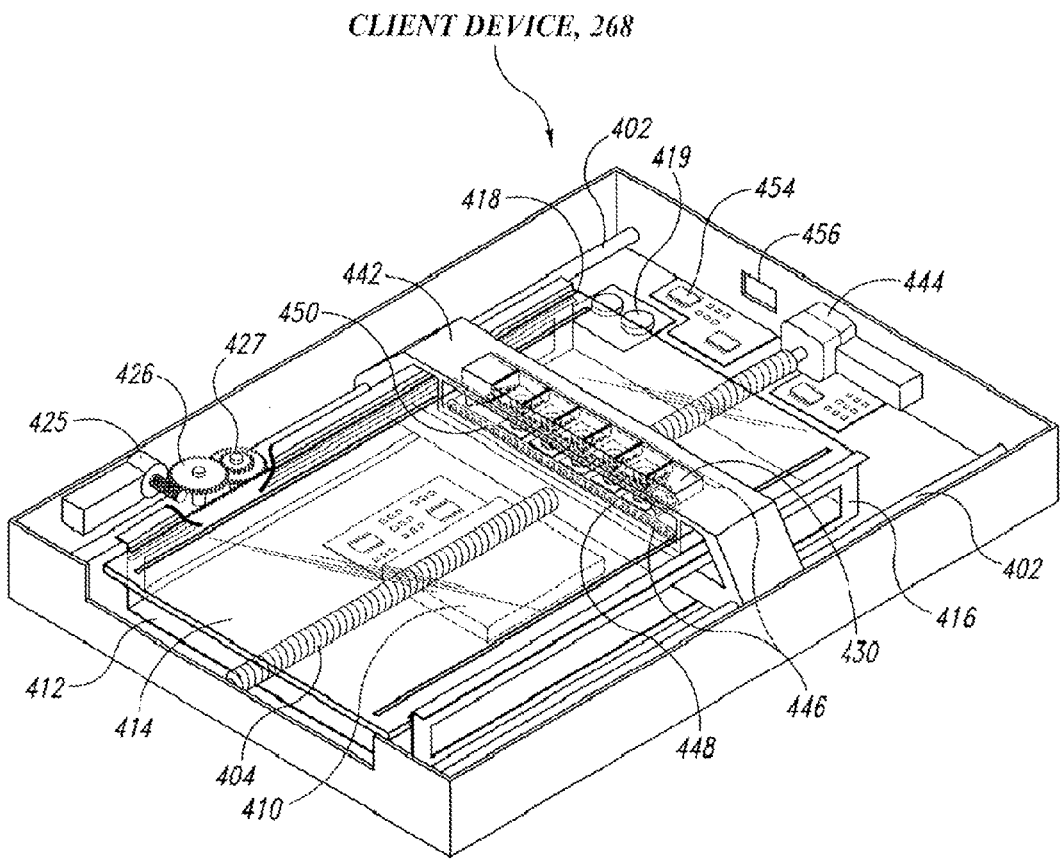
FIG. 4 is a perspective mechanical illustration depicting a handheld authentication apparatus displaying one example of a digital optical imaging component as part of a multi-component operational system, according to one illustrated embodiment.
Figure 4A:
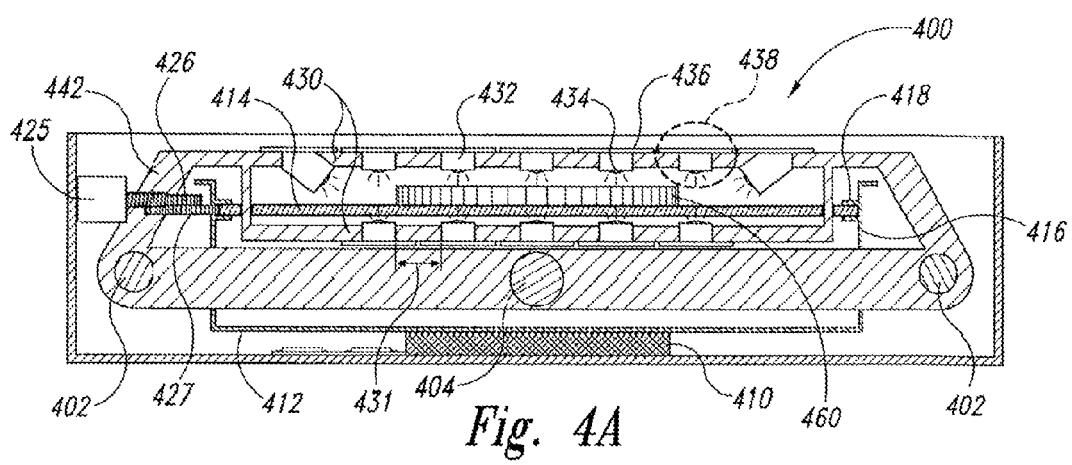
FIG. 4A is a mechanical illustration depicting a cross section of FIG. 4, a handheld authentication device displaying one example of a digital optical imaging component as part of a multi-component operational system, the cross section specifically related to a wafer level contact imaging sensor array and carriage arm configuration, according to one illustrated embodiment.
Figure 4B:
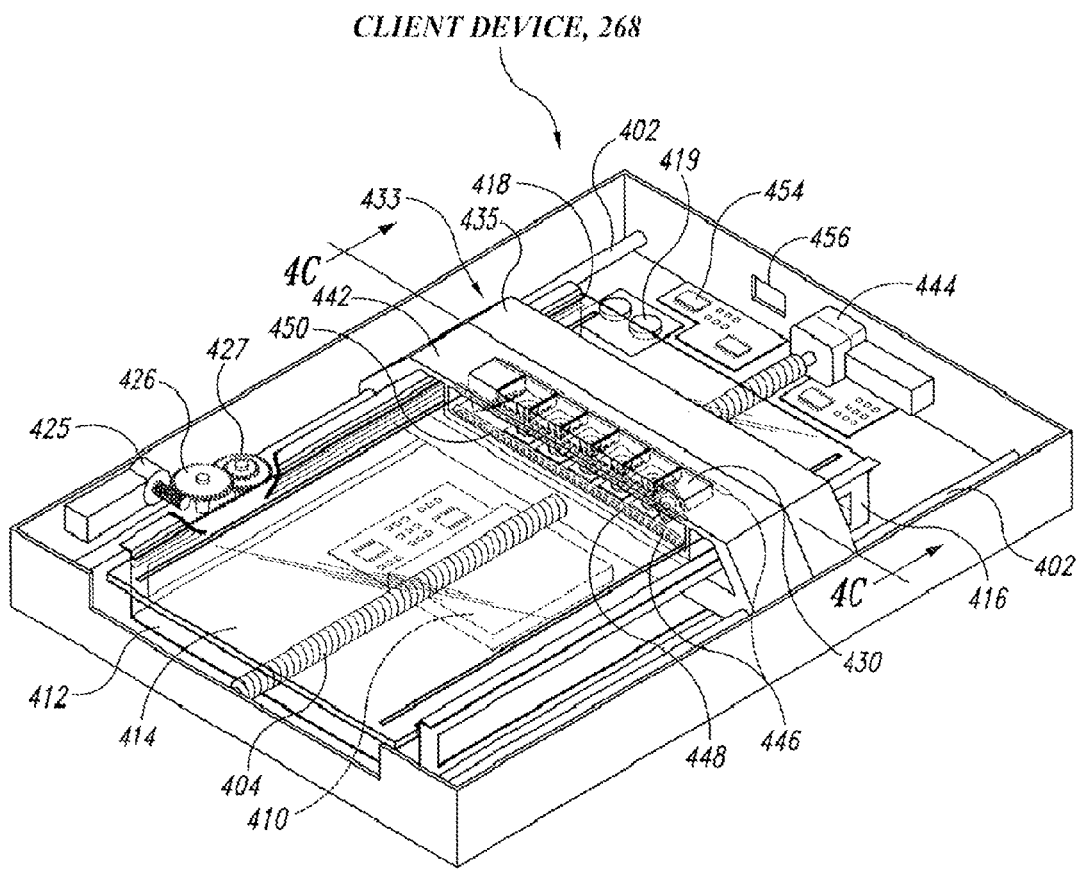
FIG. 4B is a perspective mechanical illustration depicting a handheld authentication device displaying one example of a digital optical imaging component as part of a multi-component operational system including a secondary carriage arm configuration housing an electromagnetic sensor facility, according to one illustrated embodiment.
Figure 4C:
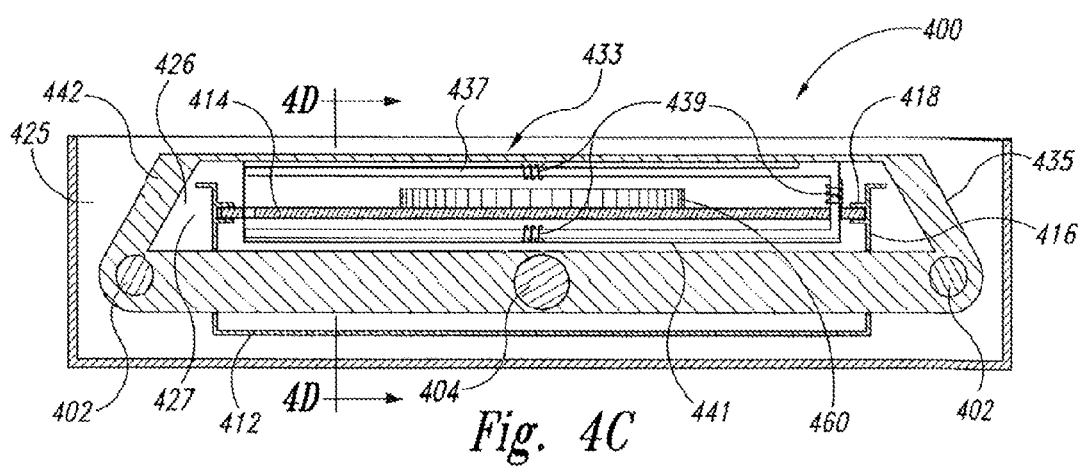
FIG. 4C is a mechanical illustration depicting a cross section of FIG. 4B, a handheld authentication device displaying one example of a digital optical imaging component as part of a multi-component operational system, and displaying one example of an electromagnetic sensor facility, the cross section specifically related a carriage arm configuration housing an electromagnetic sensor, according to one illustrated embodiment.

The disclosed apparatus, client device 268, as shown in FIGS. 4-4C, is comprised of a digital optical imaging component 400, utilizing contact imaging sensor (CIS) technology, a globular CMOS image sensor array system (ISA) 430, a plurality of stacked lens module arrays (LMA) 432, containing lenses, and filters 434, combined with an image sensor 436, as a camera imaging unit, commonly known as a wafer level camera (WLC) 438, a contact imaging sensor (CIS) carriage arm 442, a carriage arm drive system 444, a plurality of illuminating devices 446, comprised of LED or electroluminescent emitters 448, a light diffused reflective housing 450, a precision balance mechanism (scale) 410, a balance pan 412, a glass platen tray 414, balance pan platen support walls 416, glass platen lateral slide rails 418, a glass platen drive system 425, an electromagnetic sensor (EMS) (433) positioned upon a support chassis (435) including a ferrite core (437) and windings (439). Electromagnetic interference shielding (441) is located at points necessary to shield from possible RF interference. WiFi chipset 454, and wired connection port 456, housed within an all encompassing case (not shown).

One or more precision lenses optimally configured for the imaging prerequisite for close range photogrammetry image capture episodes through which the digital image information is received. One, or more, lens filters may be configured to work with the lens configuration. The multi-lens cluster or array is located within one or more camera modules within the case that may be directed in harmony with one or more diffused lighting arrays to capture a plurality of images of at least one surface or a segment of one surface of the subject. Multiple images of the subject may be captured at multiple focal distances in part due to confined working space within the device. Auto focus lenses on one or more cameras or stationary fixed lenses on a multitude of cameras capture images; each with a differing depth of field may be used. Post-imaging software, algorithms and post-image processing enhance and recreate multiple layers of images creating a resultant homogonous image depicting a final product with a much greater depth of field crystalline clarity and acceptable for use in subsequent photogrammetric algorithmic processing. For those knowledgeable in the art, generating a sufficient depth of field by layering multiple images in this manor is simply known as focal plane merging, z-stacking or focus stacking. The resultant image data then offers sufficient detail by which to establish accurate geometric and physical measurements utilizing specialized photogrammetric processes by which resultant bullion authentication is determined along with recording coin surface characteristic data.

In addition to the detailed imaging process the true weight is physically determined by an imbedded balance 410 located under the glass platen 414. The true weight data is referenced with respect to the computed volumetric properties for the subject and then compared to the database established for the bullion coins' known material content. All data is compared against archived modelbase libraries containing information such as the original manufacturing specifications for design, diameter, thickness, weight, material composition, precious metals fineness and specialized edge treatment, if any. Mathematical calculations are performed by automated image analysis algorithms providing an accurate visual and mathematic reference for the assay analysis process.

Three dimensional (3D) based image model data obtained via enhanced close range passive stereo photogrammetry is the preferred optical method of establishing imaged based reference data and as indicated in this preferred method may be considered the primary medium for reference data collection. The present embodiment entails at least one stereo pair of digital static cameras as this configuration allows for extremely dense 3D models of the subject that are recovered quickly and without the added difficulty of singular imagers.

The passive stereo photogrammetry method referred within this embodiment does not require structured light pattern projection onto the subject as does some active stereo photogrammetry. As a result the image capture process is extremely fast, making post image processing even faster and more efficient. In this application close range passive stereo photogrammetry is further explained as one or more, stereo pairs of images of a subject that are captured simultaneously and instantaneously using an array of pre-calibrated static digital cameras. Dynamic (video) imaging cameras may be substituted in alternate embodiments if so desired. Active stereo photogrammetry is similar to passive stereo photogrammetry in that active stereo photogrammetry relies on the use of structured light to acquire the 3D surface images. The use of structured light involves projecting a pattern onto the subject either as a random speckled pattern or a series of stripes or grids using that pattern to help obtain the 3D image. However, when using structured light in order to obtain proper texture images the structured light pattern must be removed within the post image processing. Often this can be done by processing the images to remove the pattern before they are applied to the 3D scan. However, this step may result in a minor decrease in quality of the texture images. Alternatively, the texture images are captured at a slightly different time from when the 3D imaging is obtained which may result in a slight inconsistency between the geometry of the 3D scan and the 2D texture image.

An embodiment described herein uses one or more multiplexed sensor arrays composed of lenses, filters and sensor (WLC's) in the stereo configuration and a passive light source optimally with diffused reflection lighting arrays operating in the 5000K color temperature range for the most effective lighting. No structured light source is necessary or shown.

For accurate 3D imagery representation it is common to configure the lens module array to mimic somewhat the spatial relationship of human eye separation as to be consistent and accurate in multiple image data collection therefore it is prudent to address the lateral separation between imaging devices. For those skilled in the art it is known that for accurate close range stereoscopic imaging a distance equal to approximately $\frac{1}{30}^{th}$ of the distance of the effective focal length to the subject is preferred for stereoscopic 2D image disparity, the basis for 3D depth perception. As image focusing distance extends further away ideally the camera spread will also widen. Mirrors or reflective surfaces may sometimes be utilized to increase focal distance in different embodiments as to create a folded optical path to compensate for distance when imaging occurs within restricted space requirements.

Post imaging point cloud data is derived from the imaging sensor. A point cloud is a set of vertices located within a three dimensional coordinate system. As a representation it is the set of points an imaging device has measured automatically and can be utilized to calculate volumetric and other data through various mathematic algorithms. As known within the art a point cloud is comprised of a large number of calculated points on the surface of an object and stored and utilized as an output data file.

The point cloud vertices are usually defined by X, Y, and Z coordinates in 3D representations and is typically intended to be representative of the external surface contour of an object. For an enhanced surface reconstruction, point cloud data is then converted to a more usable file type such as a polygon mesh model file type or triangle mesh model or the like. For those skilled in the art it is known that a plurality of approaches may be utilized for surface reconstruction of point cloud data such as alpha shaping Delaunay triangulation or ball pivoting all essentially building a network of triangles over the point cloud's vertices in order to manufacture a more precise working form.

Software provides a graphical or numerical comparison of that which is examined to that which is archived as a representative reference image or series of images. Often many points of the point cloud are eliminated in an attempt to reduce data analysis time to an acceptable rate or to reduce data transmission times to a more reasonable time frame while at the same time preventing extraneous reflections from producing errors. Archived data storage is affected directly by file size. On occasion when similar representative subjects are imaged points from each surface of interest are spatially averaged to give high accuracy measurements of object dimensions. This also reduces review time. It is noted herein that this particular representation within the described embodiment continues to leave open its avenue to the conversion of gathered data as to not encumber other various envisioned embodiments of the same or nearly similar procedures.

Within the embodiment image based computer aided inspection may be accomplished in part by using either digital video imaging (dynamic) or digital still imaging (static). Both methods compare the recorded image data to a networked database or modelbase library and subsequently implement the same data matching technology and algorithms. Model matching techniques are broadly classified as surface to surface matching, curve to curve matching or pixel to pixel matching. A primary function of data matching within the embodiment is known as pixel to pixel matching. This method is a process that is fast and accurate and permits immediate response times. By using properly calibrated stereo image processors pixel by pixel matching allows the creation of very dense and accurate range maps.

Those knowledgeable in the art understand a range map is a highly efficient image-like structure for storing dense 3D data. Every pixel in the range map image represents the 3D position of that pixel in space. It is therefore capable of calculating the 3D position of every pixel in the input images: up to 10 million 3D points per stereo pair or more depending on the resolution of the cameras used. Close range photogrammetry for this purpose allows for very accurate image inspection and data evaluation. The apparatus and system of the disclosure have two complementary approaches to determine if a coin or bar is genuine: 1.) primary measurements and 2.) feature based authentication. Feature based authentication in part identifies certain features and characteristics of a coin or bar that may be unique to both genuine coins/bars and counterfeit coins/bars and the use of the data facilitates the preliminary identification of an imaged coin. Primary measurements are used in part to evaluate a coin's potential for authentic determination by identifying and measuring specific dimensions, characteristics and specifications such as diameter, rim thickness, edge serrations and the computational weight of a given coin or bar in order to determine if those measured values fall within the allowable specification range for the coin or bar.

Algorithms built to assess image data produced by the apparatus analyze recorded images on two distinct examination levels identified here as 1.) the feature based level or "Macro Signature Level" (MSL-I) and 2.) the primary level or "Micro Signature Level" (MSL-II). While evaluating specimens at the (MSL-I) levels, algorithms are identifying "grand scale" indicators like factory production specifications and allowable tolerances for each subject from images obtained recognizing the subjects preliminary identifiable traits in so far as "make and model" designation by considering data sets consisting of known shape, diameter, thickness, volume, edge profiles, edge serrations (reeding), color, luster and incused and relief features that emulate known distinct original design patterns. At this level of inspection a full and complete bullion assay does not occur only introductory identification has been acknowledged. In order to establish further reliable and credible "proof of identity" (authentication) conclusions more in depth optical inspection at the (MSL-II) level assists additional methods of testing and data collection. Optically, during the (MSL-II) imaging process the identity surfaces of the subject are imaged at an elevated more defined pixel ratio or higher resolution in order to realize a more comprehensively improved set of image data confirming and logging "one of a kind" unique character sets for each subject facilitating the charting of individual unique surface characteristics and contact marks as well as other anomalies of the subject. The data is then further modified to intensely highlight individual identity patterns in part by structuring the data received into geometric based "constellation signature maps" 560 (GSM's) utilizing the most identifiable and unique character data as an additional resource base. The final iteration and data set establishes a very unique CSM 560 for every imaged subject thereby creating in part the basis utilized for future specimen identity recognition creating a virtual fingerprint able to discriminate like subjects without error.

Figure 5:
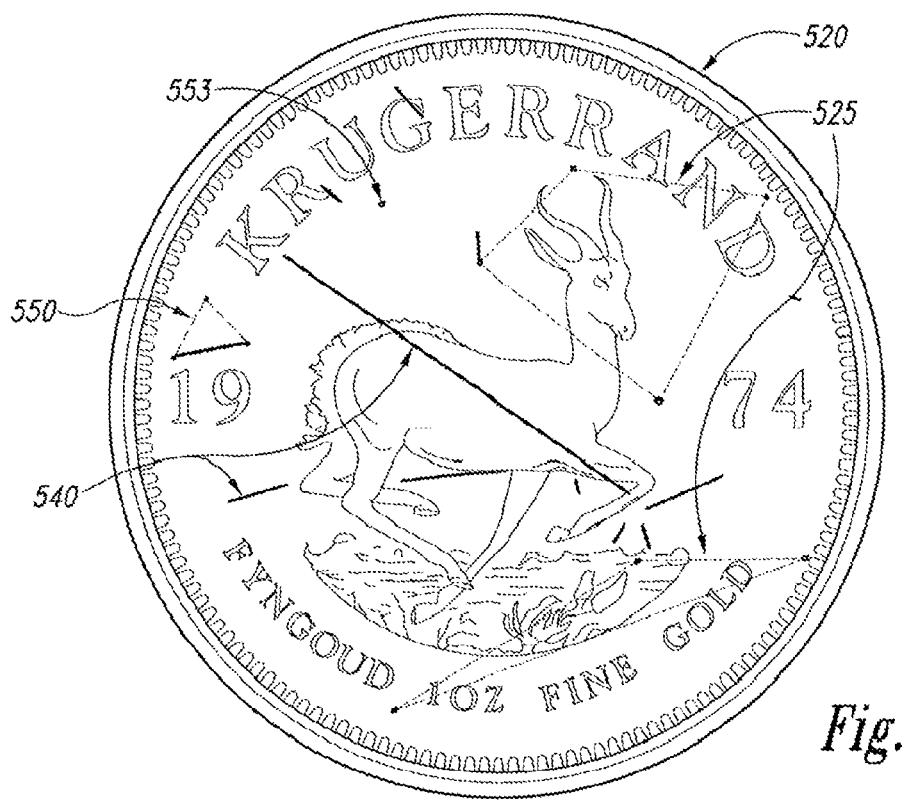
FIG. 5 is an illustration depicting a precious metals bullion coin with superficial inclusions.
Figure 5A:
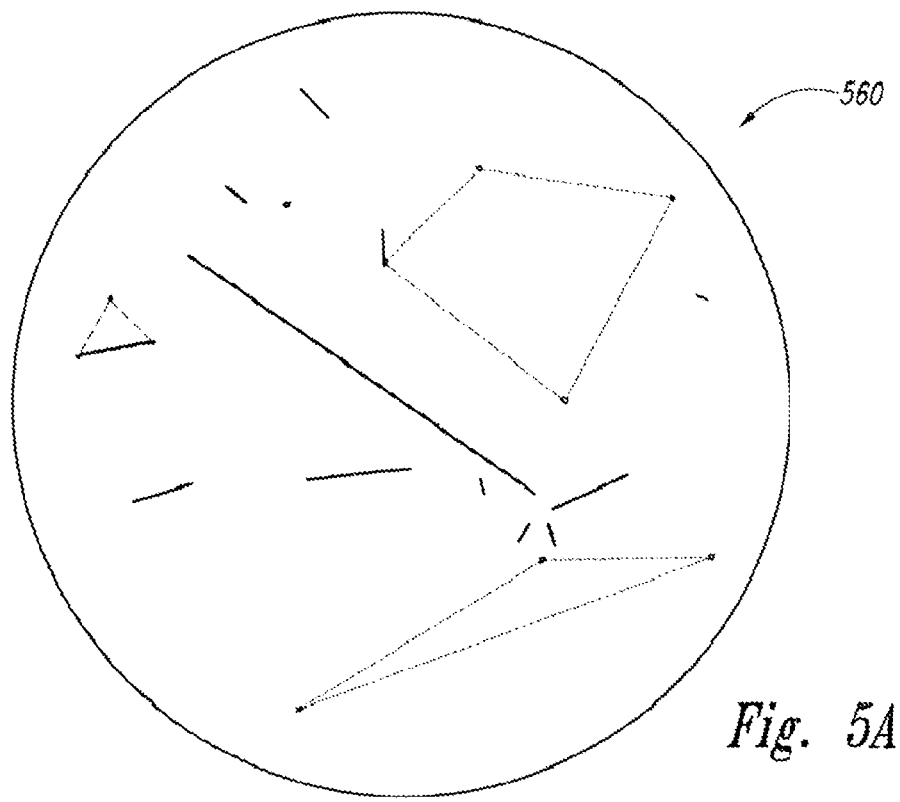
FIG. 5A is an illustration depicting a constellation signature map (CSM) as derived from the superficial inclusions indicated in FIG. 5, according to one illustrated embodiment.

FIGS. 5 and 5A depict perspective illustrations 520 and 560 of one side of a single gold bullion coin having been imaged by the image acquisition subsystem of the article of value exchange system capturing a set of surface characteristics from the received article of value. The depicted surface characteristic subsets 525, 540, 550, and 553 as shown in this illustrated embodiment were automatically selected from all imaged surface characteristics (not shown) for the depicted individual article of value. The data subsets were determined adequate in their purpose to uniquely identify the article. In particular, the acquired data set 560, including subsets 525, 540, 550 and 553 of imaged surface characteristics, is known and recorded as a constellation signature map (CSM) of the received article of value in this illustrated embodiment. The CSM readily distinguishes the received article of value from other articles of value of the same type and/or from articles of value of other types when compared to the received article of value. The CSM is derived from and represents any number of original design features located on the coin, circulation contact marks and/or factory birth marks located on, and characteristic of, the received article of value. Original design features, contact marks and birth marks may be perceived as singular units or multiple features and are in part derived from original incused or relief design features, contact abrasions and bag marks 553, nicks and scratches 540, polishing or buff marks and die defect marks like clash marks and die cracks that have originated in production. A subset grouping of these feature indicators may be found and recognized as single marks 553 being utilized as a reference point, or multiple marks or abrasions 525. Combinations of multiple contact marks 550, 525, nicks and scratches may be utilized as a data subset for the CSM. A linear abrasion 540, or scratch may be utilized individually, in whole or in part, or as a segment, or as a derived point along its axis, to create a working datum point or group of points as a usable reference for any data subset. As exemplified in the illustrated embodiment, the complete CSM 560 is thusly created from the random geometric patterns derived from the data subsets 525, 540, 550 and 553 and their interrelationships to one another. Data subsets may be utilized in various ways to calculate one of a kind unique digital signatures for each article of value. For example, length, width or curvature of linear abrasions may be measured. Distance, angle and direction between referenced inclusions may be calculated. Inclusions themselves may be measured, traced and charted as virtual islands with indiscriminate shapes located within any subset. Alternatively, other geometric shapes derived from multiple data sets may contemplate internal or external surface area computations or direction and plane angle of its legs as computed and measured in degrees or radians and located in a particular position by comparison of location and relationship to the coin's original design features or relationships to other geometric patterns relative to one another. Another unique method of positive signature identification may be found by studying the axial rotation component of both parallel surfaces of a coin in relation to the obverse and reverse sides of the same coin. By accurately matching the official medalic orientation position of the design features for the obverse and reverse sides of the coin, CSM geometric pattern sets for the obverse and reverse sides of the coin may be overlaid, projecting both geometric patterns upon one another, thereby creating a third unique CSM for the article of value. Simply identifying the proper axial rotation of the coin's official medalic orientation between the obverse and reverse sides of the coin may draw a specific correlation between the obverse and reverse GSM's.

MSL-I imaging pixel ratios compare somewhat to un-enhanced standard definition (SD) resolutions and may be found within the range of 480p-576p, whereas MSL-II level imaging pixel ratios may be considered in the high definition (HD) range and may be located around 720p-1080p or higher. As such, a predetermined pixel configuration or set up is not mandatory allowing the present embodiment to archive either SD or HD file size and format. The initial MSL-I "make and model" ID data when merged with more detailed MSL-II data about the subject works to compile an accurate and precise overall data structure in which to formulate further comparisons and establish final decisions and conclusions about the known attributes of the subject under scrutiny and its origin. The resultant data set is configured, condensed and matched to an archived modelbase library for similar coins/bars. The archive process is unique in that only the CSM data along with thumbnail versions of the image is archived for future use greatly reducing transmitted data file sizes and reducing transmission time.

Recent approaches for coin recognition may broadly be categorized as methods based on rotationally invariant features and methods based on registration. Registration based methods tend to have fewer false positive results and have been shown to be effective. In one embodiment, a process may follow the following steps:

Reference Library Generation:

The methods outlined below require the generation of a standard image for a given coin. As pristine coins may be difficult to obtain to generate the standard image, an average image from two or more typical coins may be averaged together to eliminate unique features in a standard image. Further, the typical coin may yield better comparison images as the shiny surfaces do not tend to bias the reference image.

Segmentation:

The process of distinguishing or finding the coin from the background may be accomplished by thresholding the gray values or by using the Hough Transform. Such a process may be simplified by testing only one coin at a time. This process may be used as a first order tool to define the boundaries prior to the next step.

Feature Extraction and Registration:

Since coins have many similar features, methods beyond gray scale analysis are needed. The method of using image gradient measurements may be quantified to rotate and register the image to a database. Image gradient generation is a common image transformation and may be found in any of several image processing resources. Examples include the following:

Lab View by National Semiconductor
Mat Lab by Mathworks
IDL, Interactive Data Language by Exelis
OpenCV (Open Source Code for Computer Vision)

Other sources may include Matrox or any other specific company tool sets.

Once the segmentation takes place and some physical measurements are known, the gradient information may be compared to a library of similar gradient data sets based on other coins with known close parameters. This is a point at which image rotation, scaling and indexing may be used advantageously. These operations may be performed with Cartesian or polar coordinates, each with some features and some difficulties.

Classification:

With the gradient calculations, a straightforward "nearest neighbor" scheme may be used to select the best fit coin match.

From the Classification, the basic parameters of the coin may be matched to other recorded parameters such as size and weight. Results of the comparison to these other parameters may be used to determine if the coin is authentic. Some filtering may be required using the technique of Fast Fourier Transform (FFT) to remove high frequency image noise that is not pertinent to the overall classification process. Experimentation may be needed to find the proper thresholds.

Unique Feature Determination:

Once a coin is classified and determined to be authentic. The step of determining what is unique about the coin may be made.

The reference image of the coin may be subtracted from the image of the test coin. The remaining features may be presumed to be unique features of the test coin that have been induced from wear. These wear marks are unique to that coin. The method of Principal Component Analysis may be used to separate the key, unique features for archival storage and file reference. From the Principal Components, a comparison may be made for the same coin at a future date using the Principal Components directly. Alternatively, the Principal components may be converted to a coin "fingerprint". A coin finger print would essentially be some repeatable algorithm applied to the Principal components that would reduce the data from that map to another, simpler form. Enhancements to this technique may be made by either applying a 2 bit map or a gray scale feature set.

FIG. 1 is a schematic diagram of a system 100 configured in accordance with an illustrated embodiment of the disclosure. In the illustrated embodiment, system 100 includes one or more networks 105, such as local area networks ("LANs") and/or wide area networks ("WANs") and/or cloud based networks. The system 100 also includes a wireless network 108, client devices 101-102, those other than client devices 103-104, and client accessible databases, 106-107, whether or not owned or managed by the client.

One embodiment of client device 101-102 may be practical as described in more detail in FIG. 2 below, employed in combination with another device or system or both. Generally however, the system and workings of client device 102 may include any mobile computing device capable of receiving and sending a message over a network, such as wireless network 110, or the like. Such devices can include for example, portable devices such as cellular telephones, smart phones, display pagers, radio frequency (RF) devices, infrared (IR) devices, Personal Digital Assistants (PDAs), hand-held computers, laptop computers, wearable computers, tablet computers, integrated devices or accessories combining one or more of the preceding devices, or the like.

Client device 101 may include any computing device that typically connects using a wired communications medium such as personal computers, multiprocessor systems, microprocessor-based or programmable consumer electronics, network PCs, or the like. In one embodiment, one or more of client devices 101, 102, 103, 104 may also be configured to operate over a wired, or wireless or cloud based network system.

Client devices 101, 102 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing any web-based language, including a wireless application protocol messages (WAP), or the like.

In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), and eXtensible Markup Language (XML), Extensible HyperText Markup Language (XHTML) or the like, to display and send information.

Client devices 101, 102 may also include at least one other client application that is configured to receive content from another computing device. The client application may include a capability to provide and receive textual content, multimedia information, or the like. The client application may further provide information that identifies itself, including a type, capability, name, location or the like.

In one embodiment, client devices 101, 102 may uniquely identify themselves through any of a variety of mechanisms, including a telephone number, mobile identification number (MIN), mobile station I.D. (MSID), international mobile subscriber identity (IMSI), an electronic serial number (ESN), mobile device identifier, network address, GPS or other identifier. The identifier may be provided in a message, or the like, sent to another computing device.

Client devices 101, 102 may also be configured to communicate a message, such as through email, SMS, MMS, IM, IRC, mIRC, Jabber, or the like, with another computing device. However, the present disclosure is not limited to these message protocols, and any other message protocol may be employed.

Client devices 101, 102 may further be configured to include a client application that enables the user to log into a user account that may be managed by another computing device. Such user account, for example, may be configured to enable the user to receive emails, send/receive messages; access selected web pages such as might be presented to the client device.

For example, in one embodiment, the client application might include a web browser that enables a user (consumer) to make sales, and/or purchase transactions. However, managing of messages or otherwise participating in transactions may also be performed without logging into a user account.

Wireless network 108 is configured to couple the client device 102 with network 105. Wireless network 108 may include any of a variety of wireless sub-networks that may further overlay stand-alone ad-hoc networks, or the like, to provide an infrastructure-oriented connection for client device 102. Such sub-networks may include mesh networks, Wireless LAN (WLAN) networks, cellular networks, or the like. Client device 101 may also be configured to connect directly with WAN, LAN or Cloud based networks if such a connection is desired.

Wireless network 108 may further employ a plurality of access technologies including 2nd (2G), 3rd (3G), 4th (4G) & (4G LTE,) or $5^{th}$ generation radio access for cellular systems, WLAN, Wireless Router (WR) mesh, or the like. Access technologies such as 2G, 2.5G, 3G, 4G, 4S, 4G LTE and future access networks may enable wide area coverage for client devices, such as client device 101 or 102 with various degrees of mobility.

For example, wireless network 108 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 108 may include any wireless communication mechanism by which information may travel between client device 102 and another computing device, network, or the like.

Other device 103, while hosting client device 268, may optionally communicate with a base station (not shown), or directly with another computing device. Network interface 250 includes circuitry for coupling client device 268 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi™, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, a keyboard or a touch screen adaptation of a keyboard. Keypad 256 may also include command buttons that are associated with selecting and sending images. Illuminator 258 may provide a status indication and/or provide light. Illuminator 258 may remain active for specific periods of time or in response to events.

For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions. The Illuminator or multiple illuminators may also function as a light source for camera operations in another configuration.

Figure 2:
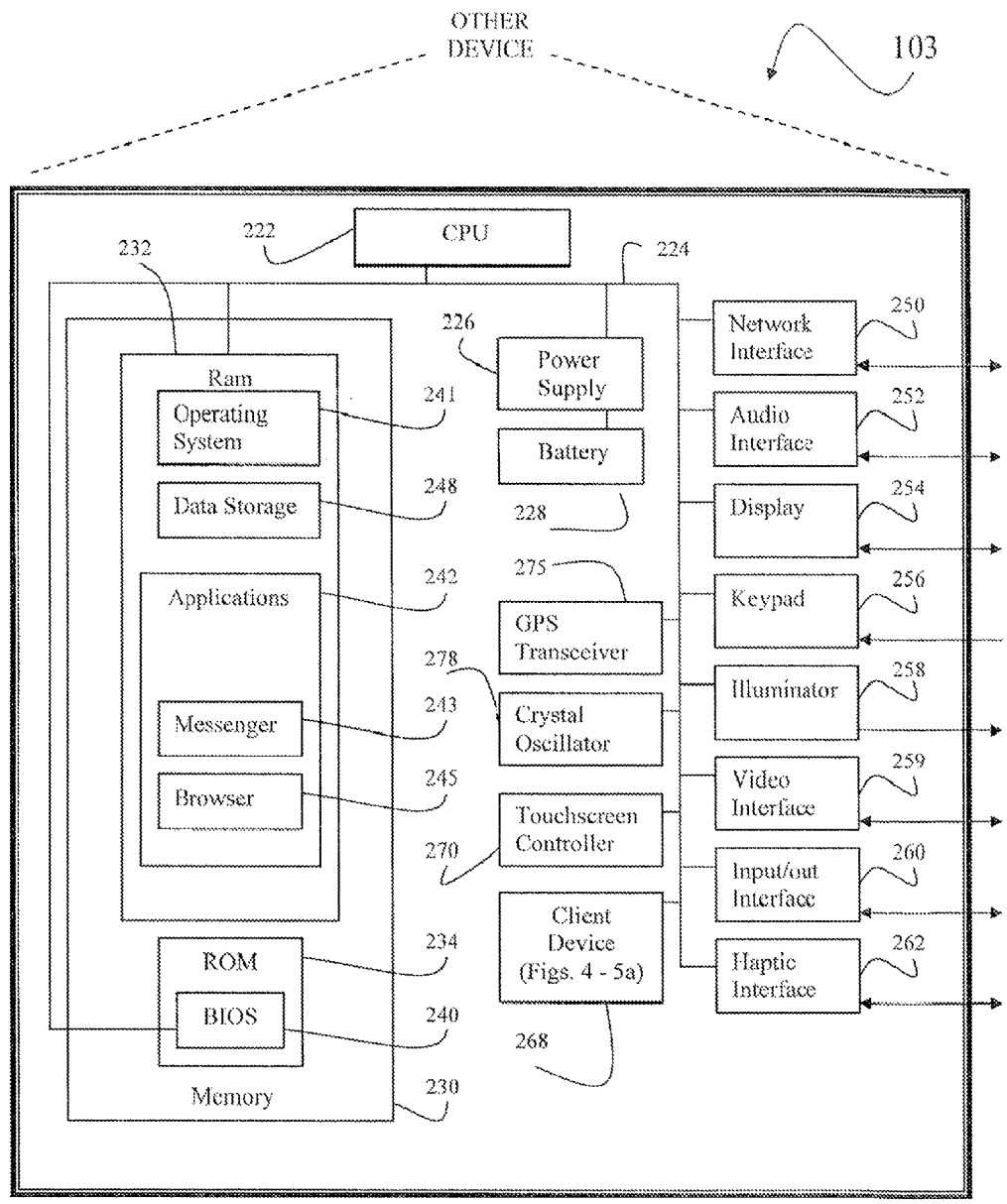
FIG. 2 is a schematic diagram of a system including a client device according to one illustrated embodiment.

Other device 103 also comprises input/output interface 260 for communicating with external devices, such as a printer, headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate device 103 in a particular way when another user of a mobile or computing device is calling.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of other device 103. The mass memory also stores an operating system 241 for controlling the operation of device 103.

It will be appreciated that this component may include a general-purpose operating system such as a version of UNIX, or LINUX™, or a specialized communication operating system such as Windows Phone™ WP7, or WP7 "Mango", the Symbian® OS, Android® OS or Apple iOS, iPhone 2G, iPhone 3G, iPhone 3GS, iPhone 4G, iPhone 4S, iPhone 4G LTE, iPhone 5, iPad, iPad2, New iPad, iPad Mini, iPod touch $2^{nd}$, $3^{rd}$, and $4^{th}$ generations, and Blackberry OS, Blackberry 10, or the like. The operating system may include, or interface with application programs written in languages such as Java, Objective C, or the like, that may provide a user interface, computations, logic control and enabling the control of hardware components such as client device 268 and/or operating system operations.

Memory 230 further includes one or more data storage 248, which can be utilized by other device 103 to store, among other things, applications (Apps) 242 and/or other data. For example, data storage 248 may also be employed to store information that describes various capabilities of device 103, as well as store an identifier. The information, including the identifier, may then be provided to another device based on any of a variety of events, including being sent as part of a header during a communication, sent upon request, or the like. In one embodiment, the identifier and/or other information about device 103 might be provided automatically to another networked device, independent of a directed action to do so by a user of device 103. Thus, in one embodiment, the identifier might be provided over the network transparent to the user. In one embodiment a user downloads a program (of a sort frequently referred to as an "app" in industry parlance) onto other device 103, specifically designed to control device 268 (described below) and to transmit data collected from device 268 to server 109 or 110, controlled by computer program 111 or 112, respectively.

Moreover, data storage 248 may also be employed to store personal information including but not limited to contact lists, personal preferences, data files, graphs, videos, GPS coordinates or the like. Data storage 248 may further provide storage for user account information useable by client devices of FIG. 1, or the like. At least a portion of the stored information may also be stored on a disk drive or other storage medium (not shown) within other device 103.

Applications 242 may include computer executable instructions which, when executed by other device 103, transmit, receive, and/or otherwise process messages (e.g., SMS, MMS, IM, email, and/or other messages), multimedia information, static and dynamic imagery and enable telecommunication with another user of another client device or a third party application provider.

Other examples of application programs include calendars, browsers, email clients, IM applications, SMS applications, VOIP applications, Mobile applications, contact managers, task managers, transcoders, database programs, word processing programs, security applications, spreadsheet programs, traffic management help, games, personal banking or investing, search programs, GPS location based services, navigation assistance and so forth. Applications 242 may include, for example, messenger 243, and browser 245.

Browser 245 may include any client application configured to receive and display graphics, text, multimedia, and the like, employing any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), and eXtensible Markup Language (XML), Extensible HyperText Markup Language (XHMTL) and the like, to display and send a message. However, any of a variety of other web-based languages may also be employed. In one embodiment, a consumer seeking to purchase and/or sell precious metals may employ browser 245 to interact with other device 104 of FIG. 1.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like.

For example, in one embodiment, messenger 243 may be configured as an IM application, such as AOL Instant Messenger, Yahoo! Messenger, .NET Messenger Server, ICQ, MSFT live chat or the like. In one embodiment messenger 243 may be configured to include a mail user agent (MUA) such as Elm, Pine, MH, Outlook, Eudora, Mac Mail, Mozilla Thunderbird, Gmail, or the like. In another embodiment, messenger 243 may be a client application that is configured to integrate and employ a variety of messaging protocols.

In one embodiment, messenger 243 may employ various message boxes or folders to manage and/or store messages. For example, in one embodiment, information about a purchase and/or sale of recently assayed bullion might be communicated to any private party or consumer using messenger 243.

With reference to FIGS. 4, 4A and 4B client device 268, presented in the form herein described, utilizing an embodiment displaying one example of a close range stereo photogrammetric image capture system functioning within its faculty by utilizing a multi-component operational system, accordingly is described as follows:

One primary component of the device is the digital optical imaging component 400, utilized in capturing digital image data. An optical imaging system could be a conventional lens and sensor arrangement with a means to optimize focus settings or consisting of cameras utilizing a plurality of lenses and filters arranged as stacked modules 432 containing one, or more, lenses and filters 434, which may include filters that are polarized and/or colored. The combination thereof, realized by those skilled in the art as wafer lever cameras (WLC's) or camera cubes 438, or the like. An example of a designed WLC utilized in this configuration may be OmniVision's VGA 640×480 (OVM-7675) camera cube chip or Aptina Imaging's (MT9-D111) 2 MP auto focus camera. In both examples the WLC may be soldered directly to the printed circuit card 436 thereby eliminating the space required for a dedicated socket connection.

By combining a compact imaging solution on one integrated chip the use of camera cube construction greatly enhances usable space within confined regions of the device without sacrificing image quality or processing speed. It is known by those skilled in the art that it is common to acquire production level WLC cubes at z-height dimensions of less than 2.5 mm. Furthermore, positioning and combining together a plurality of lens modules (WLC) adjacent in fashion to one another, in a position of linear conjunction thereby constitutes a linear lens module array (LMA) 430, where upon each WLC is ideally separated from other adjacent WLC's by the optimum separation 431 envisioned for the accurate facilitation of stereoscopic 2D image disparity, the basis for 3D depth perception. Individual wafer level cameras (WLC) 438 do not necessarily contain identical lens/filter stack setups in accordance with the adjacent module and may be configured differently within the same (LMA) dependent upon several factors like differing focal points or focal distance in order to maximize image clarity for a 3D image representation of subjects.

For those skilled in the art of stereoscopy, it is known that some lateral separation 431 between lenses is desired in order to mimic the natural separation space between the human eyes in an effort to replicate 3D image perception. A starting point for measured separation typically equates to approximately $1/30^{th}$ of distance of the effective focal length to the subject in order to maintain the proper separation disparity. Functioning as part of the lens module array 432 is the linear sensor array 436 upon which the lens module array is permanently affixed, producing a linear group of wafer level cameras.

Within the exemplary embodiment, a linearly aligned arrangement of a plurality of complementary metal-oxide-semiconductor (CMOS) image sensors 436 is situated as the image sensor array (ISA) 430, and is mechanically affixed at the base of the lens module array 432 to a plurality of image sensors 436. When combined, the linear lens array and the linear sensor array essentially perform as what is commonly known within the art as a contact image sensor (CIS). A variety of sensors types may be used, but because CMOS sensors have been found to operate on far less energy than CCD sensors and produce less heat, they are a more attractive option for power management. Additionally, CMOS resolutions have greatly improved making them very close to CCD quality. Moreover, with the proper interchangeable lens set ups, CMOS sensors can excel.

Fitting the CMOS sensor 436 with the proper lens configuration in the lens module 432 allows one to capture extremely crisp images of subjects at a very close range. A necessary prerequisite in close range stereo photogrammetry or macro-photogrammetry. However, working distances within the confines of the housing (not shown) remain tight sometimes requiring the alternative option of post imaging data manipulation, including the utilization of software for focus stacking or focal plane merging wherein multiple images of the subject are captured at multiple focal distances and compiled into a single crisp example depicting the full depth of focus for the subject. As mentioned previously herein, the resultant image data then offers sufficient detail by which to establish and record geometric and physical measurement data for use in issuing final authentication determinations and facilitate future identification procedures utilizing constellation signature maps (GSM's).

The CMOS photodetector and the readout amplifier are both part of each pixel. This arrangement enables the integrated charge to be converted into a voltage inside the pixel which can then simply be read out over x-y wires instead of using a charge domain shift register, as in COD's. This arrangement also allows CMOS imagers the ability to run fast enough to enable features like electronic pan, tilt, zoom and image stabilization, at very little power consumption, at times over 100 times less than COD's. The lower power consumption also allows for battery power and USB powered applications to be realized more frequently.

The imaging sensor can also be a light-field camera also known as a plenoptic camera. This type of device captures multiple images from the object via a micro lens array located close to an image sensor. Data collected from this arrangement can then create an image file that can be represented in three dimensions where any particular depth of the original object is in clear focus. Further, due to the nature of this embodiment of the disclosure, a conventional fixed lens is not needed and conventional 2-D images can be generated showing exceptional focus clarity.

The illuminating device (446) herein described as a dedicated light source (DLS) includes a reflector housing (448) and contains one or more LED emitters 450 equally represented as substantially red, substantially blue and substantially green in color. The LED emitters are located within the reflective housing 448. The reflective housing of the illuminating device 446 is designed with diffused, reflective interior surface characteristics as opposed to a specular reflective surface characteristic, firstly to reflect incident rays produced by the R/G/B LED emitters at multiple angles onto the subject 460 in a manner of diffused reflection thereby maintaining a consistent and intense surface coverage of the subject and secondly, allowing the reflected light to reach the subject without being partially depleted in its intensity as would be the case if the same light passed through a secondary light diffuser before landing on the subject. The illumination could also come from a suitably energy efficient means that also provides a diffuse light such as an electroluminescent material.

Another primary operational component of an embodiment of the disclosure is the inclusion of a physical precision balance (weight scale) 410 located within the case housing at a location under the glass platen 414, and supporting the glass platen on which the subject 460 does rest during examination. The precision balance 410 is utilized for the discovery of the scalar quantity (weight) of the inspected subject. Scalar quantity is further defined by those knowledgeable in the art as simply a physical system that is not changed by a coordinate system. In this case, the coordinate system is a dedicated algorithm that calculates the theoretical quantity (of weight). Acquired data, both computational and scalar is compared to known reference data of the archived modelbase.

Another important basis and reasoning of the operational method of the disclosure is found within aspects of the art and practice of electromotive force identification, or electromagnetic eddy current sensing. Eddy current measurement is an inductive measuring method based on the extraction of energy from an oscillating circuit. Eddy currents are induced within coins by a changing magnetic field in the coin according to Faraday's Induction Law. The eddy currents are proportional to the strength of the magnetic field, the conductivity of the coin, and the frequency of the magnetic field. By knowing expected eddy current responses for known coins of known conductivity and by applying a known magnetic field, coins may be identified and further may be screened to be authentic.

An eddy current sensor for a coin test can use two coils: one is around a ferrite cylinder which is a smaller diameter than the coin under test and is used to produce a magnetic field. The cylinder is located in the center of a ferrite plate. The other coil is on the ferrite plate and serves to produce a voltage proportional to any Eddy currents induced in a test coin. The coin under test is moved to be in a position parallel with the ferrite plate and located in front of the magnetic field inducing coil. The resulting voltage picked up in the second coil is based on given inputs and may be measured to determine the type of coin and the validity of that coin based on other parameters associated with that coin, for example, size and weight. This specific implementation would be used for a single side approach. Another possible approach may be to have a magnetic inducing coil on one side of a coin and a voltage detection coil on the other. Also, a grouping of electromagnetic sensor units may applied together, yet in another instance offering a different configuration, a single sensor may utilize multiple frequencies in order to determine multiple necessary parameters.

Figure 4D:
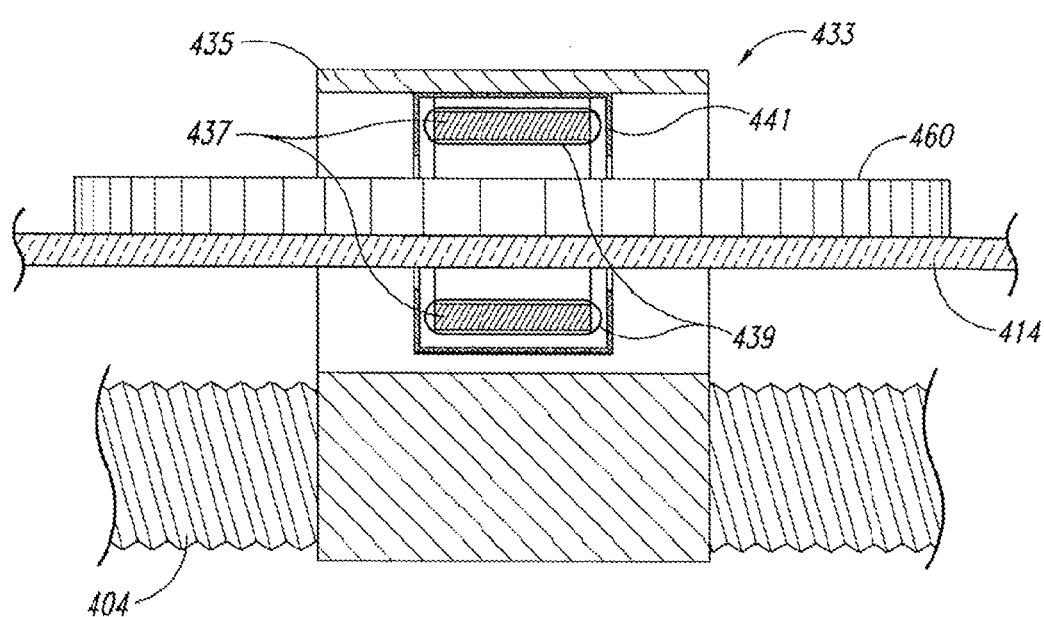
FIG. 4D is a mechanical illustration depicting a vertical cross section of FIG. 4C, the electromagnetic sensor facility, according to one illustrated embodiment.

As depicted within FIGS. 4B, 4C and 4D, an electromagnetic sensor 433 is present to evaluate bullion items with respect to individual physical characteristics. In the described embodiment, relating to FIGS. 4B, 4C and 4D the embodiment of the disclosure depicts a dual poled, ferrite core 437 (or other magnetically permeable substance), with windings consisting of low and high frequency coils 439, that are capable of producing an oscillating electromagnetic field in one, or multiple frequencies. When actuated, an electromagnetic field interacts with the subject as the subject passes within the proximity of the gapped poles of the core 439 causing a measured amount of energy loss and fluctuation. Accordingly, the amplitude of the signal changes in a similar manner as related to the conductance, geometric properties, mass, density, magnetic permeability and homogeneity of the subject. The sensor reacts to the changes depending on the physical properties of the subject and is able to record and compare new data to the databases for the known criteria for each subject. Determinations can be made regarding all of the physical attributes of each subject but a primary utilization of eddy current testing within the apparatus of the disclosure is to demonstrate the homogeneity or non-homogeneity of the subject's structure. It is known by those knowledgeable in the art that contemporary bullion coins and bars are manufactured as homogenous in structure in all instances of production. Therefore laminations, plating, cladding or slug filled examples of bullion are not genuine in all instances. Eddy current testing with higher frequencies gives better differentiation between materials, but lower frequencies penetrate further and can detect material differences at the center of the rounds and bars. Gold and the metals used to make most 22 karat gold alloys, copper and silver, are diamagnetic metals. Their magnetic permeability is less than air which means that they interact weakly with magnetic fields. These three metals also have the highest conductivities of all metals coins and bars. Fake gold coins and bars typically contain an amount of tungsten because of density similarities to that of gold and its relative cost is inexpensive. Tungsten metal is paramagnetic in its magnetic ordering. It has magnetic permeability higher than air and interacts more strongly with magnetic fields. Two other metals, nickel and iron, are used to make a tungsten alloy with a density virtually identical to 22 karat gold. They are both ferromagnetic and interact very strongly with magnetic fields. All three of these metals are relatively poor electrical conductors. The electromagnetic properties of pure 24 karat gold and 22 karat gold are significantly different from tungsten and its alloys thus readily distinguishable from high quality tungsten fakes when utilizing electromotive force identification techniques.

An example of a typical assay event performed by the present disclosure of client device 268 would proceed thusly, as the exampled embodiment is configured to interact as a peripheral device to the other device 103, (host device); It is first connected to the host in any manner desired, then powered up automatically through host 103, or the internal battery 419 if not connected by a hard wired connection. The described embodiment receives and transmits communication and data through user interaction and input via prompts through the host 103, which is also web enabled. The user/operator of client device 268 is identified through the (ESN) registration and/or (GPS) coordinates of host 103. In this example the device is physically connected (wired) to host device 103 through a hard wired connection via high speed USB connection 456. At the start, client device 268 proceeds to prompt the user, through host 103's user interface for direction and response. Using the host 103 interface (not shown) the user makes a selection to assay bullion by choosing the desired option to request to assay loose precious metal bullion items such as sample coin 460.

Client device 265 responds to user direction issued through the other device 103 interface and prompts the user to place the sample 460 for inspection upon the extended glass platen 414 of device 265. The glass platen 414 is utilized in similar fashion as would be a glass platen used within a common flat bed scanner. The user's bullion item 460 is introduced to the device by the user. When the sample has been introduced by the user upon the glass platen 414 and as the glass platen retracts into the device 103 with sample 460 on board, the sample automatically passes between the eddy current sensor's 433 gapped poles 439 thus interacts with the produced electromagnetic field while moving at a rate equal to the stepper motor 425 platen retraction rate. The eddy current sensor 433 immediately detects and obtains data related to the physical properties of sample 460 and determines if the sample is, or is not, homogenous in structure. In an affirmative determination the process continues and proceeds through the remaining testing and required imaging. If determined not homogenous in structure sample 460 is rejected immediately and the user is issued a failed test indicator by way of the host device 103 interface. When determined homogenous in nature imaging and other testing and measuring is to continue when device 103 upon an internal indication of the complete closure of the platen tray, understands that the sample has been placed upon the glass platen, was found to be homogenous via eddy current examination then proceeds to determine the exact physical weight of sample 460 as force is exerted upon the precision balance 410 as a measureable down force upon on the glass platen 414 thus establishing the true weight of the sample 460.

The glass platen 414 sits upon, and within two balance pan lateral side rails 418 that connect directly to the precision balance mechanism 410 situated directly under the platen. Two balance pan vertical sidewall extensions 416 connect the glass platen 414, via the lateral side rails 418 to the precision balance 410. The balance in this instance expresses a standard deviation of ±0.001 g, at temperatures between 41°-104°, with a stabilization time of less than 1 second. Accordingly, less than 2 seconds after the platen tray 414 has closed the precision balance 410 has internally self calibrated and has discovered the scalar quantity of the inspected sample 460. The glass platen 414 in this instance herein functions as an integral part of the balance pan feature 412 for the precision balance 410 located underneath the platen, and as such has been weight compensated for.

The sample 460 need not be centered on the surface of the glass platen 414 for the imaging task or the weight computation as the CIS carriage arm 442 surrounds the sample on all sides allowing the sample to be place "within the proximity" of center. The eddy current sensor carriage arm 433 surrounds the sample on three sides allowing a clear reach across the sample for sensor 437 testing. The precision balance pan 412 is designed to accept "off center" weight loads while maintaining a high level of accuracy. The CIS carriage arm 442 containing the wafer level cameras 438 and the image sensor array 430 is designed to sweep a surface area larger than the sample 460 in order to receive the required image data from a 360 degree view envelope. The carriage arm 442 is powered fore and aft by the stepper motor 444 and stepper motor drive screw 404 and is limited in its throw by an optimally placed detect sensors, not shown. The glass platen tray 414 is powered by a second stepper motor 425 combined with reducer gears 426,427 matched to sidewall cogs on the platen edges. The glass platen tray 414 is also limited in its run length, fore and aft, by strategically placed detect sensors (not shown).

A single sweep of the CIS carriage arm 442 is adequate for accurately detailed image capture data. The CIS carriage arm then retreats to its initial start position post deployment. Movement of the carriage arm 442 is initiated by stepper motor 444 working in concert with stepper drive screw 404. Image data and other reference data is then transmitted through the host 103 to the internet to one or more model databases 106,107 for designed algorithmic functions and data comparison performed by a server 109 or 110, having a computer program 111 or 112 stored on non-transitory computer readable memory and access to database 106 or 107. Dependant on data traffic volume and connection speed a computer based decision is rendered on the genuineness of the reviewed subject typically, in approximately 10-15 seconds. The user is then informed by way of the host 103 interface indicating the results of the automatic assay, then prompted with a "repeat function" query or a "finish function" query in order to proceed. In an alternative embodiment, host 103 extracts information from the images formed and sends the extracted data to server 109 or 110, in order to reduce the amount of data that must be transmitted.

Other device 103 may be configured to adapt to client device 268 wherein the Video interface 259 is arranged to capture video images, such as a still photo, a video segment, an infrared video, or the like. For example, video interface 259 may be coupled to one or more static frame digital cameras, or digital video cameras, micro camera arrays 430, or the like, via it's connection, either hard wired, blue tooth, WiFi or otherwise. Video interface 259 may comprise one or more lenses 434, one or more image sensors (436) and other electronics. Image sensors 436 may include a complementary metal-oxide-semiconductor (CMOS) integrated circuit, charge-coupled device (CCD), contact image sensor (CIS) setup, or any other integrated circuit for sensing light.

Optional, GPS transceivers, 275 can determine the physical coordinates of device 268 on the surface of the Earth, which typically outputs a location as latitude and longitude values. GPS transceiver 275 can also employ other geo-positioning mechanisms, including, but not limited to, triangulation, assisted GPS (AGPS), E-OTD, CI, SAI, ETA, BSS or the like, to further determine the physical location of client device 268 on the surface of the Earth.

It is understood that under different conditions, GPS transceiver 275 can determine a physical location within meters for client device 268; and in other cases, the determined physical location may be less precise. In one embodiment, however, a client device may through other components, provide other information that may be employed to determine a physical location of the device, including for example, a MAC address, IP address, Mobile Station ID (MSID), Mobile Identification Number (MIN), International Mobile Subscriber Identity (IMSI) or the like.

Additionally, a timing device 278 may issue data to record the time and calendar date of each inspection and optionally log the data with other data collected for each inspection procedure if so desired.

Figure 3:
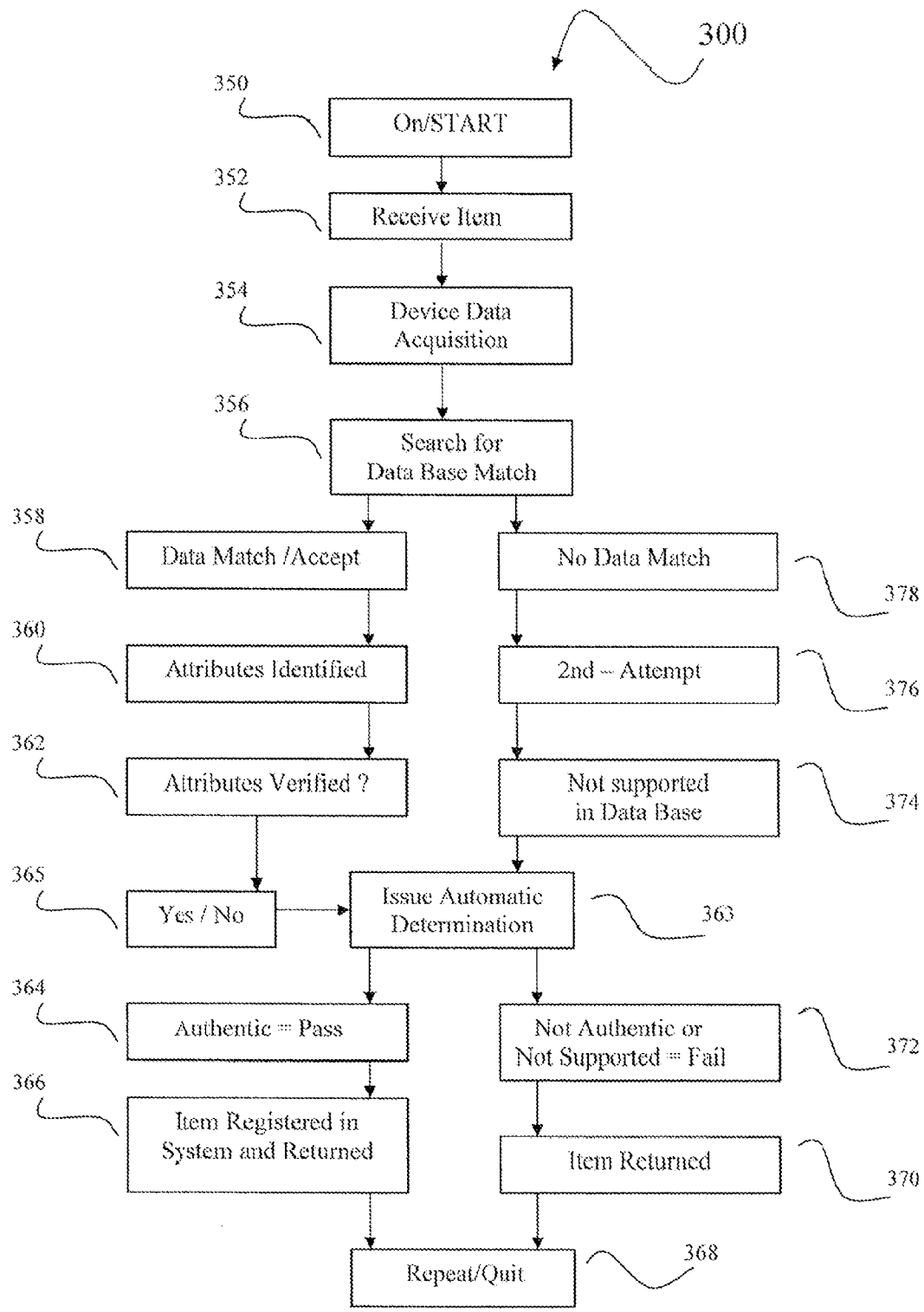
FIG. 3 is a flow diagram of a process for managing and directing assessment or analysis of a sample, according to one illustrated embodiment.

The operation of certain aspects of the disclosure will now be described with respect to FIG. 3. FIG. 3 is a flow diagram of a process 300 configured in accordance with an embodiment of the disclosure for managing and directing the assaying process for each sample. An exemplary authentication event configured in accordance with the current disclosure for operating an article of value exchange system may proceed as shown in FIG. 3. A user has a desire to authenticate a bullion piece or other article of value. As such, the user may initiate a wireless connection between a smart phone and an apparatus as disclosed herein, having previously downloaded an appropriate application to the smart phone for this purpose. According to the illustrated embodiment, the user initiates a start command 350 for the apparatus as disclosed herein, utilizing the interface of the smart phone in order to proceed with the authentication testing as desired. The apparatus as disclosed herein welcomes the user utilizing the smart phone interface as described and proceeds to direct the user to physically insert an article of value into the receiving area 352 of the apparatus as disclosed herein. Upon receipt of the article of value, the apparatus as disclosed herein acquires data from the article of value 354 then conducts a search for a database match in the system model database 356. If no match is found, then a second attempt is made at the procedure 378 to find a database match. After multiple failed attempts to find a match in the system model database 356 the article of value is deemed not supported in data base 374. An automatic determination that the item is not supported is issued to the user via the host smart phone interface 363, communicating an item not supported determination 372, thereafter returning the article of value from the apparatus receiving area 370. The system then quits or repeats the program, depending on the user's response to a repeat query 368.

Alternatively, if a data match is rendered sufficient and accepted 358, then the unique attributes are identified from the article of value and the attribute data is forwarded to the model database library 360 in an attempt to verify the unique attributes 362. Resulting Yes/No verification of attributes 365 prompts issuance 363 of an automatic determination of Pass/Fail. If Yes at 365, attributes are verified and the article of value is deemed authentic. The article of value thus passes the authentication assay 364 and its data is registered in the system. The article is then returned to the user from the receiving area 366. The system then quits or repeats the program, depending on the user's response to a repeat query 368. If No at 365, attributes are not verified and the article of value is deemed not authentic, thus failing inspection testing 372 and prompting the return of the article of value by way of the receiving area 370. The program then quits or repeats 368, depending on the user's response to a repeat query via a command prompt issued through the host interface via the user's smart phone.

Embodiments of client device 268 as disclosed herein include several unique features and advantages. For example, one embodiment disclosed provides for an automated, portable, point of sale identification assessment of authenticity of bullion coins, and the like reviewed with client device 268 by an interested party.

Another embodiment of the disclosure would have the reference data including all or parts of the modelbase library included in other device 103 or the client device 268 itself, allowing for the comparison of actual measurements and the rendering to be made locally, without the need to communicate over the internet. In this embodiment, communications over the internet would be required periodically to receive program and reference data updates from the server 109 or 110.

While the embodiment of client device 268 as disclosed herein includes electromagnetic, optical and precision scale components, it can be appreciated that another embodiment may exclude the scale component, relying primarily on the electromagnetic and optical sensing for authenticity assessment. This embodiment may use the optical sensing of the bullion piece dimensional characteristics to determine a computed scalar measurement.

Yet another embodiment of client device 268 may exclude all or some elements of the optical sensing disclosed herein by providing the user a means such as keyboard or touch screen on client device 268 or other device 103 of identifying the bullion piece to be examined.

Figure 6:
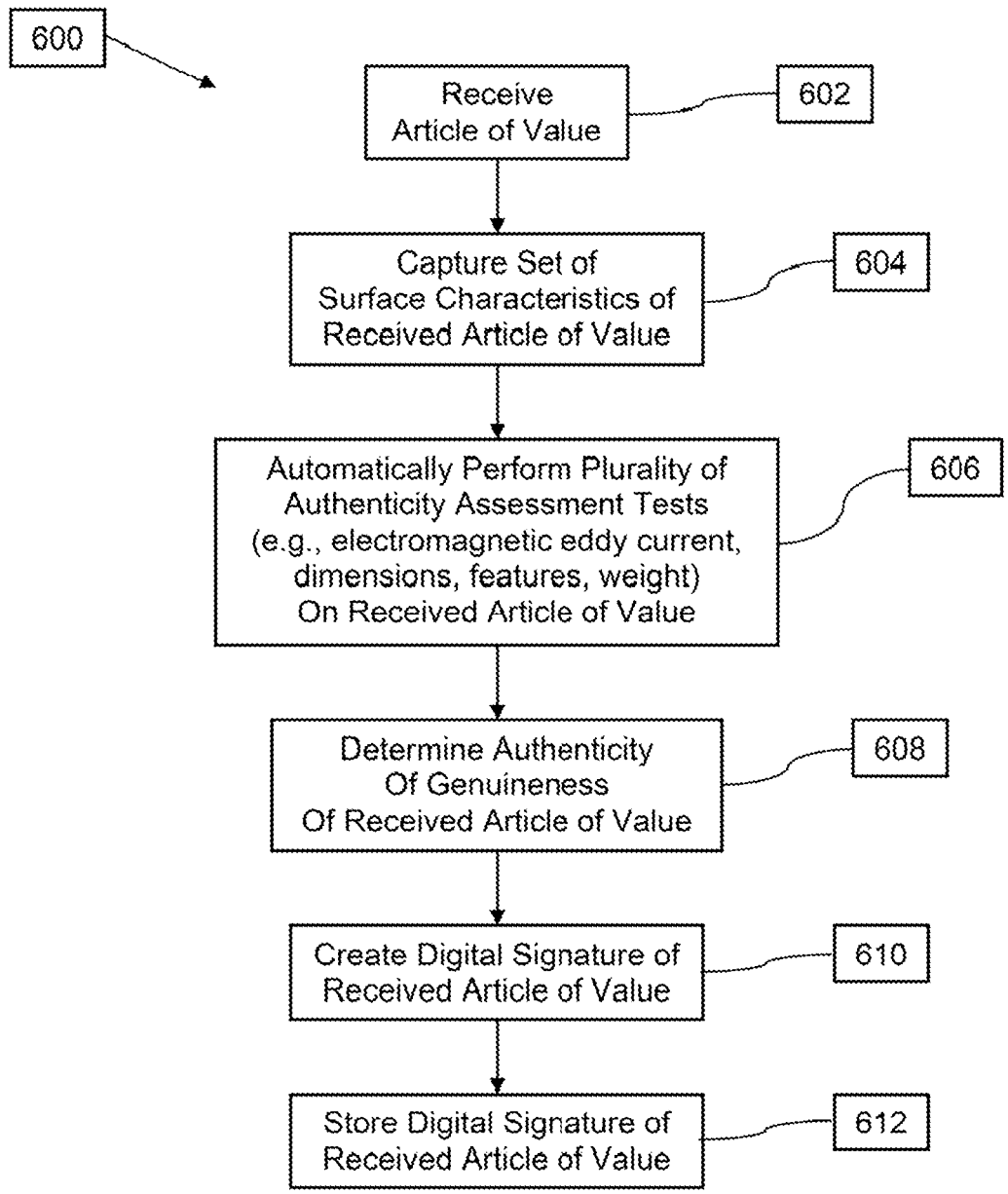
FIG. 6 is a flow chart at a high level of a method of operating an article of value exchange system, according to one illustrated embodiment.

FIG. 6 shows at a high level a method 600 of operating an article of value exchange system, according to one illustrated embodiment. The exchange system may include at least one processor, at least one nontransitory process-readable storage medium communicatively coupled to the at least one processor, and at least one image acquisition subsystem also communicatively coupled to the at least one processor. The article of value exchange system may include any of such systems or components thereof, including variations thereof, described and discussed herein, and may be useful for any of the various operations disclosed and discussed herein.

At 602, an article of value receiving portion of the article of value exchange system receives an article of value. The article of value receiving portion of the system may have any configuration and characteristics suitable for receiving an article of value having any form disclosed and discussed herein, including various forms of bullion. In particular, for example, the article of value may be in the form of a coin, ingot or bar.

At 604, at least one image acquisition subsystem of the article of value exchange system may capture a set of surface characteristics from the received article of value. The set of surface characteristics may be selected to uniquely identify the article of value. In particular, the set of surface characteristics of the received article of value may uniquely distinguish the received article of value from other articles of value of the same type and/or from articles of value of other types compared to the received article of value.

At 606, the article of value exchange system may automatically perform a plurality of authenticity assessment tests on the received article of value. Any such tests are performed essentially independent of external influence or control, largely or wholly involuntary, without interference, assistance or intervention of human will or human physical involvement in the process. The authenticity assessment tests may assess any of a variety of characteristics of a received article of value, including but not necessarily limited to electromagnetic eddy current, physical or other features, dimensions, constituent metal composition and/or weight. An assessment test performed by the exchange system may assess characteristics of a received article of value individually or in any combination. Such a test may assess at least constituent metal content and weight of a received article of value.

At 608, at least one processor of the value exchange system determines an authenticity of genuineness of the received article of value. The authenticity of genuineness is based on an outcome of the plurality of assessment tests and on nominal specifications for an article of value of the same type as the received article of value. The outcome may result from the processor comparing the outcome of the plurality of assessment tests on the received article of value to the nominal specifications of the article of value of the same type.

At 610, at least one processor of the value exchange system creates a digital signature characteristic of the received article of value. The digital signature may include information that includes unique characteristics of the received article of value and uniquely reproducibly distinguishes and identifies the received article of value from other articles of value of the same type or of different types compared to the received article of value.

At 612, the article of value exchange system causes storage of the digital signature of the received article of value. The stored digital signature may be used later for recognition and/or verification of the received article of value. The stored digital signature may also be used to record, follow and/or monitor the transaction history associated with the received article of value.

Figure 7:
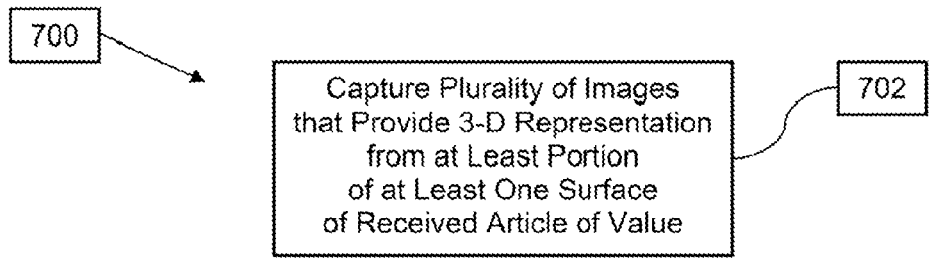
FIG. 7-9 are flow charts of particular aspects of a method of operating an article of value exchange system related to capturing a set of surface characteristics that uniquely identifies an article of value received by the exchange system, according to the illustrated embodiments.

FIG. 7 shows a method 700 for carrying out a particular aspect of method 600 related to capturing a set of surface characteristics that uniquely identifies the received article of value, according to one illustrated embodiment.

At 702, capturing the set of surface characteristics by the image acquisition subsystem includes capturing a plurality of images from at least one surface of the received article of value. The captured plurality of images provides a three-dimensional representation of at least a portion of the surface from which the plurality of images is captured. The surface from which the plurality of images is captured may be one or the other of two diametrically opposed surfaces across a center plane of the received article of value.

Figure 8:
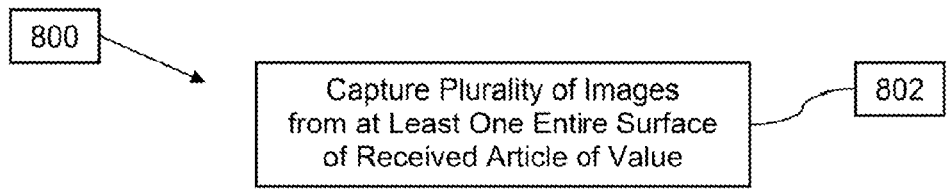

FIG. 8 shows a method 800 for carrying out a particular aspect of method 600 related to capturing a set of surface characteristics that uniquely identifies the received article of value, according to another illustrated embodiment.

At 802, capturing the set of surface characteristics by the image acquisition subsystem includes capturing a plurality of images from at least one entire surface of the received article of value. The entire surface from which the plurality of images is captured may be one or the other of two diametrically opposed entire surfaces across a center plane of the received article of value.

Figure 9:
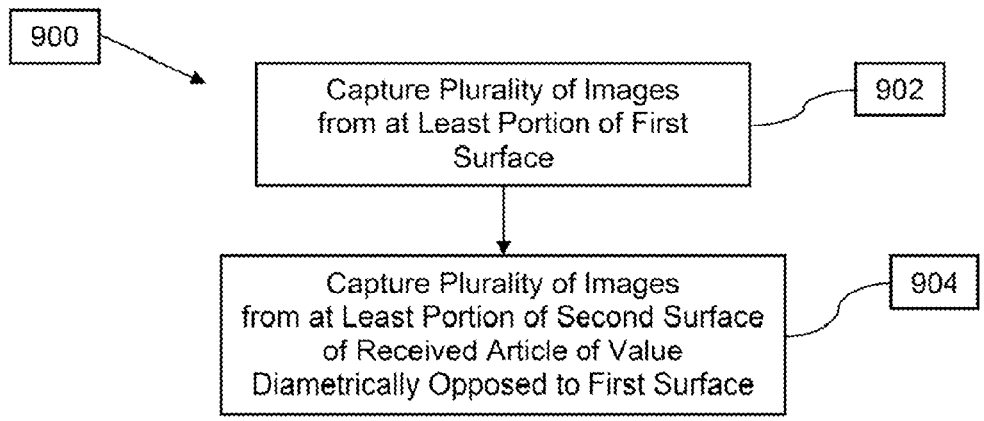

FIG. 9 shows a method 900 for carrying out a particular aspect of method 600 related to capturing a set of surface characteristics that uniquely identifies the received article of value, according to another illustrated embodiment.

At 902, capturing the set of surface characteristics by the image acquisition subsystem includes capturing a plurality of images from at least a portion of one surface of the received article of value. The surface from which the plurality of images is captured may be one of two diametrically opposed surfaces across a center plane of the received article of value.

At 904, capturing the set of surface characteristics includes capturing a plurality of images from at least a portion of a second surface of the received article of value. The second surface from which the plurality of images is capture may be the other of two diametrically opposed surfaces across a center plane of the received article of value.

Figure 10:
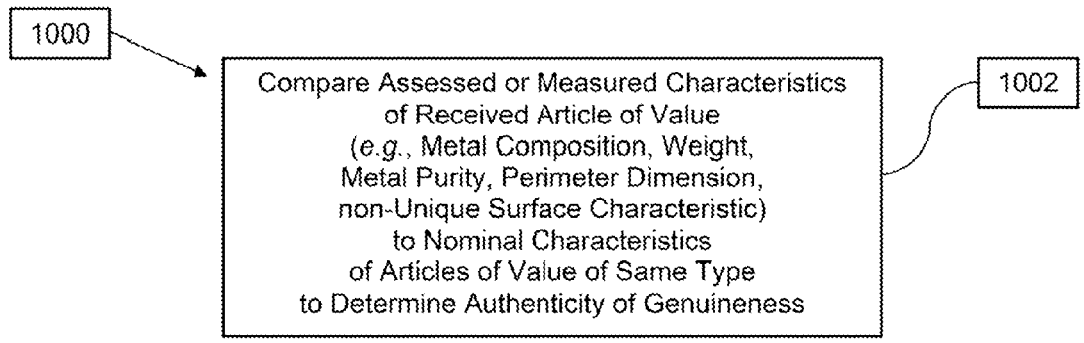
FIG. 10 is a flow chart of a particular aspect of a method of operating an article of value exchange system related to determining an authenticity of genuineness for an article of value received by the exchange system, according to one illustrated embodiment.

FIG. 10 shows a method 1000 for carrying out a particular aspect of method 600 related to determining an authenticity of genuineness of the received article of value, according to another illustrated embodiment.

At 1002, determining the authenticity of genuineness of the received article includes comparing one or more assessed, detected or measured characteristics or parameters of the received article to corresponding characteristics or parameters of articles of value of the same type as the received article of value. Assessed characteristics or parameters of the article of value may include, but are not necessarily limited to, one or more of metal composition, article weight, metal purity, perimeter dimension, non-unique surface characteristics, and discontinuity in metal composition.

Figure 11:
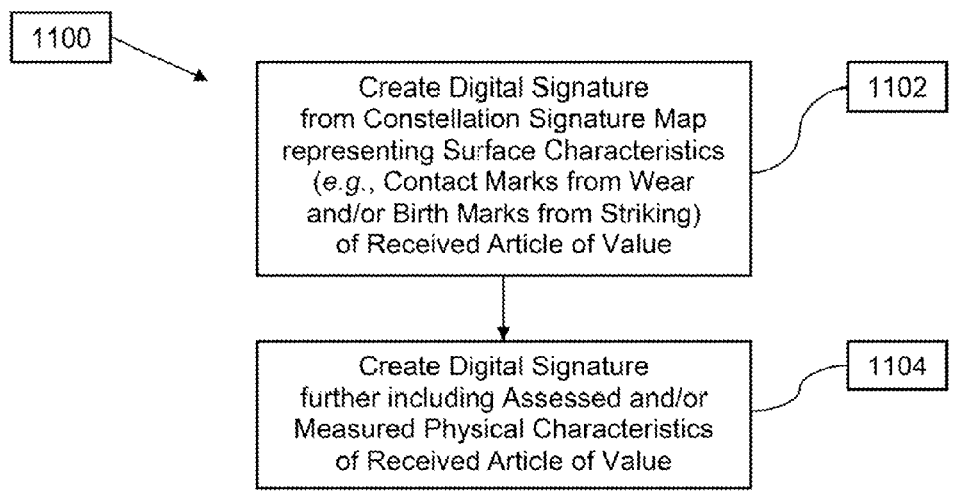
FIG. 11 is a flow chart of a particular aspect of a method of operating an article of value exchange system related to creating a digital signature for an article of value received by the exchange system, according to one illustrated embodiment.

FIG. 11 shows a method 1100 for carrying out a particular aspect of method 600 related to creating a digital signature for the received article of value, according to another illustrated embodiment.

At 1102, creating the digital signature includes creating from images captured by the image capture subsystem a constellation signature map. The constellation signature map is derived from and represents a number of contact marks and a number of birth marks located on and characteristic of the received article of value. Contact marks typically originate from wear and birth marks from striking or casting of the received article. The constellation signature map may represent surface characteristics of the received article of value including, but not limited to, contact marks and birth marks.

At 1104, creating the digital signature includes at least in part combining one or more assessed and/or measure physical characteristics of the received article of value with the surface characteristics represented by the constellation signature map.

Figure 12:
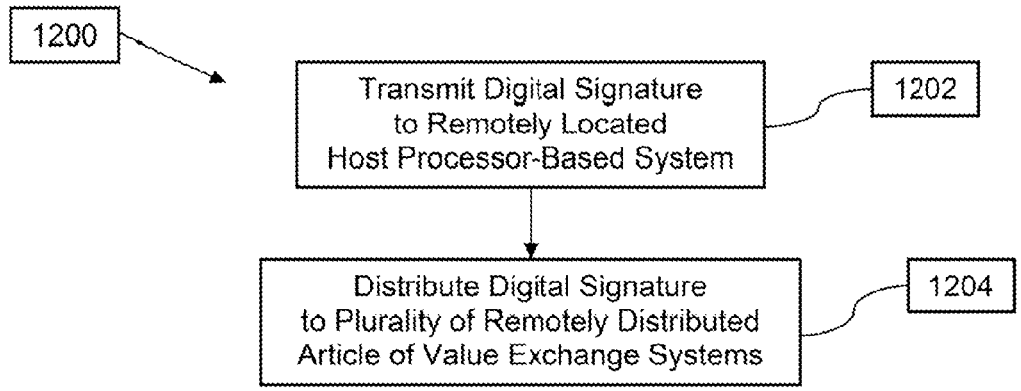
FIG. 12 is a flow chart of a particular aspect of a method of operating an article of value exchange system related to causing storage of a digital signature for an article of value received by the exchange system, according to one illustrated embodiment.

FIG. 12 shows a method 1200 for carrying out a particular aspect of method 600 related to causing storage of the digital signature for the received article of value, according to another illustrated embodiment.

At 1202, causing storage of the digital signature includes transmitting the digital signature to a remotely located host processor-based system.

At 1204, the digital signal is distributed from the remotely located host processor-based system to one or a plurality of remotely distributed article of value exchange systems.

Transmission and distribution of the digital signature may take place either via wire-based systems or wirelessly, e.g., via cloud-based systems.

Figure 13:
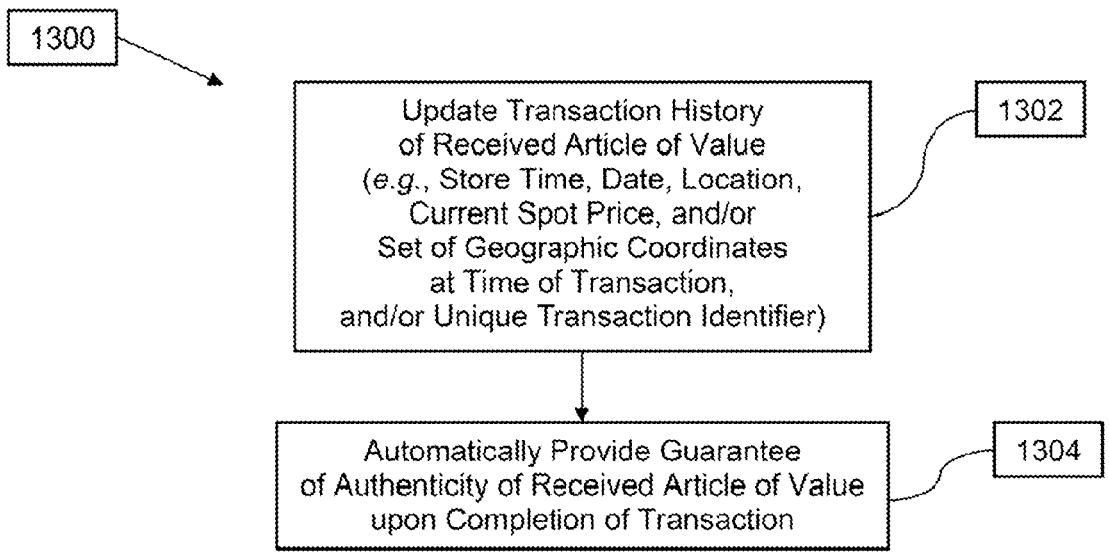
FIG. 13 is a flow chart of a particular aspect of a method of operating an article of value exchange system related to updating a transaction history of an article of value received by the exchange system, according to one illustrated embodiment.

FIG. 13 shows a method 1300 for carrying out a particular aspect of method 600 related to updating a transaction history of the received article of value, according to one illustrated embodiment. More particularly, FIG. 13 may show the method 1300 for carrying out an aspect of method 1200 wherein method 1300 may follow from method 1200.

At 1302, updating a transaction history of the received article of value includes storing at least one of a timestamp when a transaction occurs, a date when the transaction occurs, or a current spot price at a time of the transaction. Updating a transaction history may also include storing a unique set of geographical coordinates corresponding to the location at which a transaction occurs, e.g., as identified by a mobile communications device. Updating a transaction history may also include assigning a unique transaction identifier to the transaction to uniquely identify the transaction and storing the unique transaction identifier.

At 1304, when the transaction is complete and the transaction history has been updated, the article of value exchange system may automatically provide an indication of a guarantee of the authenticity of the received article of value. That is, the system may provide the indication of a guarantee of authenticity essentially independent of external influence or control, largely or wholly involuntary, without interference, assistance or intervention of human will or human physical involvement in the process of providing the indication.

Figure 14:
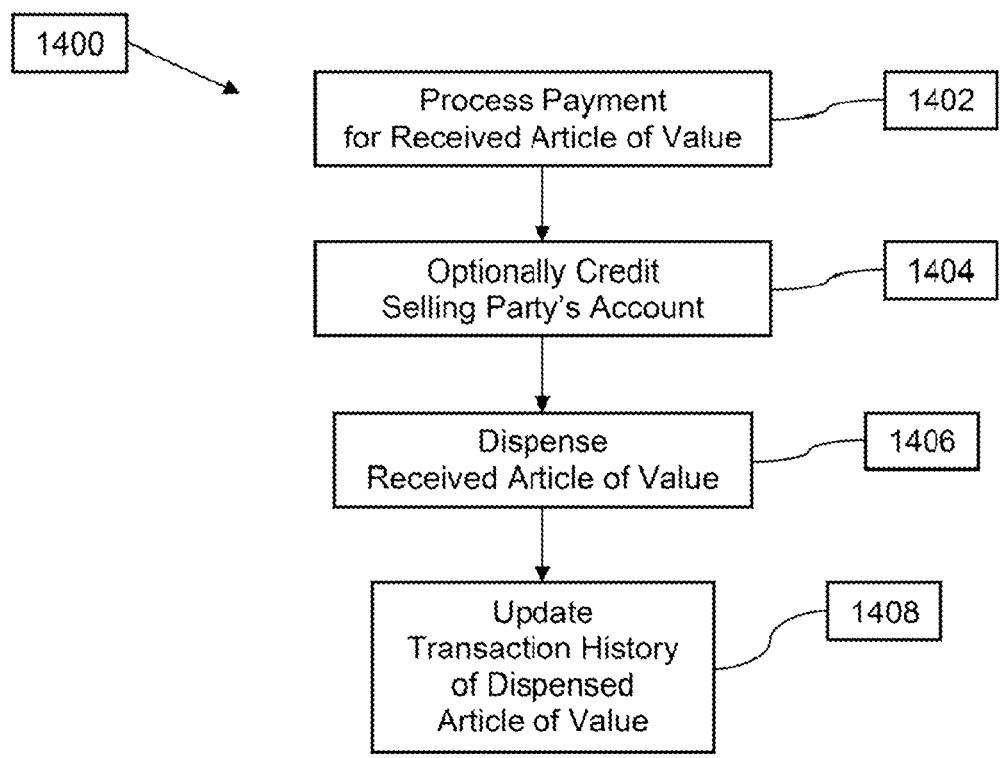
FIG. 14 is a flow chart of a particular aspect of a method of operating an article of value exchange system related to handling or processing a payment amount for an article of value of the same type as an article of value received by the exchange system, according to one illustrated embodiment.

FIG. 14 shows a method 1400 for carrying out a particular aspect of method 600 related to handling or processing a payment amount for an article of value of the same type as the received article of value, according to another illustrated embodiment.

At 1402, the article of value exchange system processes a payment for the received article of value. The payment for the received article corresponds to is the amount to the amount for an article of value of the same type as the received article. The payment is handled or processed by a payment receipt portion of the article of value exchange system.

At 1404, the article of value exchange system optionally credits an account of the selling party for the payment amount.

At 1406, the exchange system, upon receipt of payment, dispenses the received article of value. A dispensing portion of the exchange system dispenses the received article of value.

At 1408, the exchange system updates the transaction history of the dispensed article of value.

Figure 15:
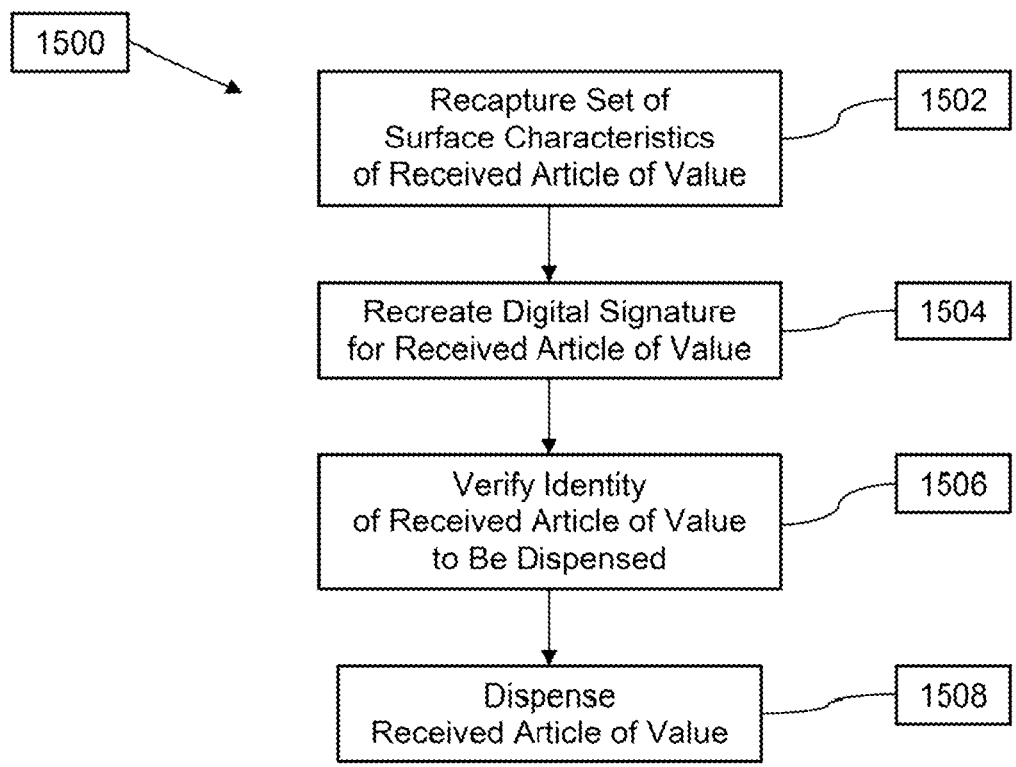
FIG. 15 is a flow chart of a particular aspect of a method of operating an article of value exchange system related to recapturing a set of surface characteristics, recreating a digital signature, and verifying an identity of an article of value dispensed by the exchange system, according to one illustrated embodiment.

FIG. 15 shows a method 1500 for carrying out a particular aspect of method 600 related to recapturing a set of surface characteristics, recreating a digital signature, and verifying an identity of the dispensed article of value, according to another illustrated embodiment. More particularly, FIG. 15 may show the method 1500 for carrying out an aspect of method 1400 wherein method 1500 may follow from method 1400.

At 1502, an image acquisition subsystem of the article of value exchange system recaptures a set of surface characteristics from the received article of value. The image acquisition subsystem may recapture the set of characteristics immediately before the exchange system dispenses the received article of value. The recaptured set of surface characteristics uniquely identifies and distinguishes the received article of value from other articles of value of the same type and/or from articles of value of other types compared to the received article of value.

At 1504, a processor of the article of value exchange system recreates a digital signature for the received article of value. The processor may recreate the digital signature immediately before the exchange system dispenses the received article of value. The digital signature includes information that uniquely reproducibly identifies the received article of value from other articles of value of the same type and/or from articles of value of other types compared to the received article of value.

At 1506, the article of value exchange system verifies the identity of the article about to be dispensed. Verification is based at least in part on the recreated digital signature. Verification may depend on and result from at least in part comparison of the recreated digital signature with one or more digital signature(s) created at earlier time(s) for the received article of value.

At 1508, following verification of the received article of value, the article of value exchange system dispenses the article of value to the recipient.

Figure 16:
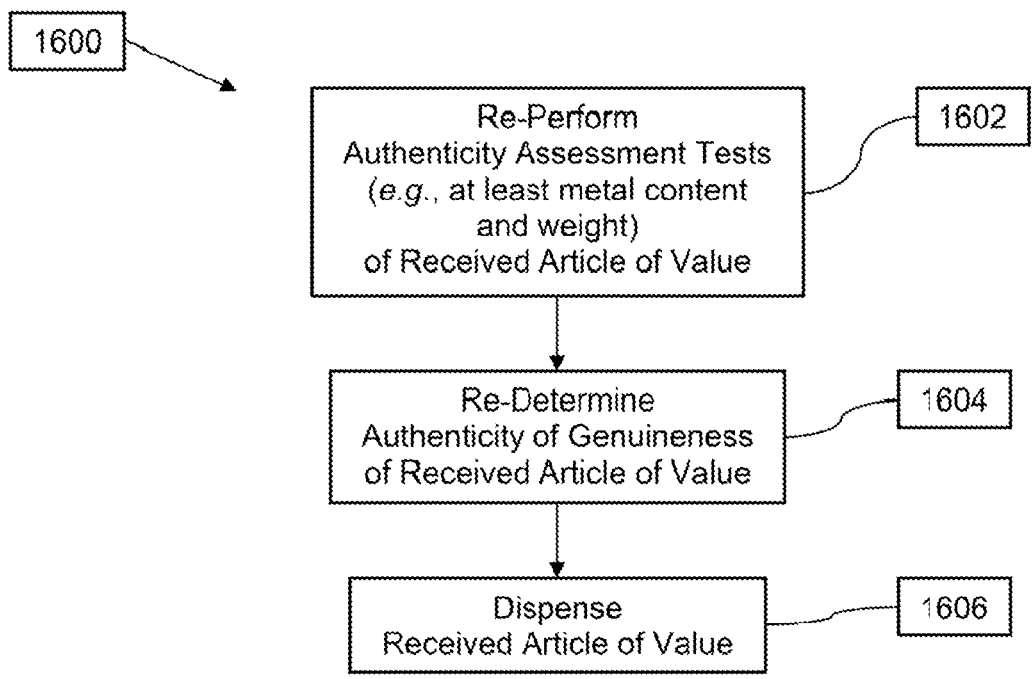
FIG. 16 is a flow chart of a particular aspect of a method of operating an article of value exchange system related to re-performing authenticity assessment tests and re-determining an authenticity of genuineness of an article of value received by the exchange system, according to one illustrated embodiment.

FIG. 16 shows a method 1600 for carrying out a particular aspect of method 600 related to re-performing authenticity assessment tests and re-determining an authenticity of genuineness of the received article of value, according to another illustrated embodiment. More particularly, FIG. 15 may show the method 1600 for carrying out an aspect of method 1400 wherein method 1600 may follow from method 1400.

At 1602, the article of value exchange system re-performs a plurality authenticity assessment tests on the received article of value. The exchange system may re-perform the plurality of assessment tests immediately before the exchange system dispenses the received article of value. Any such re-performed tests may be carried out automatically, that is, essentially independent of external influence or control, largely or wholly involuntary, without interference, assistance or intervention of human will or human physical involvement in the process. The re-performed authenticity assessment tests may assess any of a variety of characteristics of a received article of value, including but not necessarily limited to electromagnetic eddy current, physical or other features, dimensions, constituent metal composition and/or weight. An assessment test performed by the exchange system may assess characteristics of a received article of value individually or in any combination. Such a test may assess at least constituent metal content and weight of a received article of value.

At 1604, at least one processor of the article of value exchange system re-determines an authenticity of genuineness of the received article of value. The processor may re-determine the authenticity of genuineness immediately before the exchange system dispenses the received article of value. The authenticity of genuineness is based on an outcome of the plurality of assessment tests and on nominal specifications for an article of value of the same type as the received article of value. The outcome may result from the processor comparing the outcome of the plurality of assessment tests on the received article of value to the nominal specifications of the article of value of the same type.

At 1606, following re-determination of the authenticity of genuineness of the received article of value, the article of value exchange system dispenses the article of value to the recipient.

Figure 17:
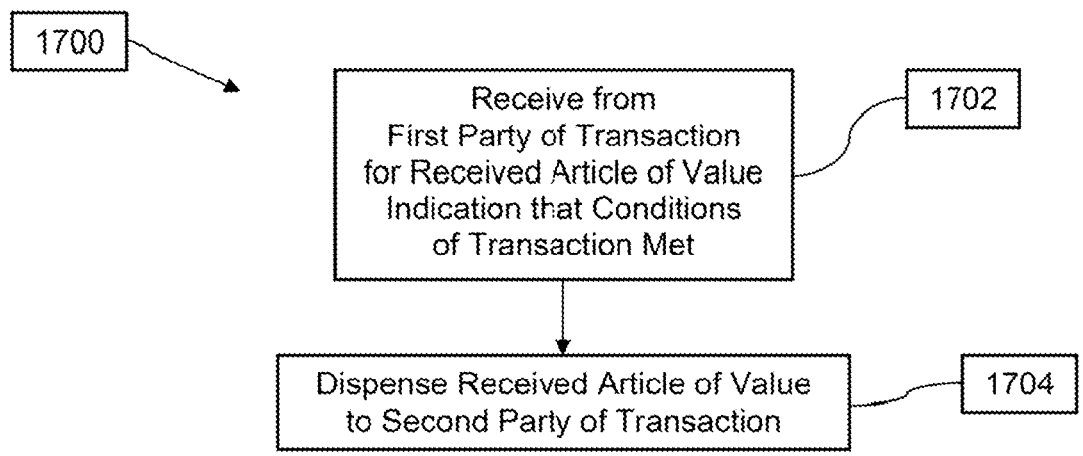
FIG. 17 is a flow chart of a particular aspect of a method of operating an article of value exchange system related to dispensing a received article of value after confirmation that all conditions of the transaction have been met, according to one illustrated embodiment.

FIG. 17 shows a method 1700 for carrying out a particular aspect of method 600 related to dispensing the received article of value after confirmation that all conditions of the transaction have been met, according to another illustrated embodiment.

At 1702, at least one processor of the article of value exchange system receives an indication from a first party of a transaction for the received article of value that all conditions of the transaction have been met.

At 1704, upon receipt of the indication from the first party that all transaction conditions have been met, the article of value exchange system dispenses the received article of value to a second party of the transaction. The article of value may be dispensed to the second party by a dispensing portion of the exchange system.

Figure 18:
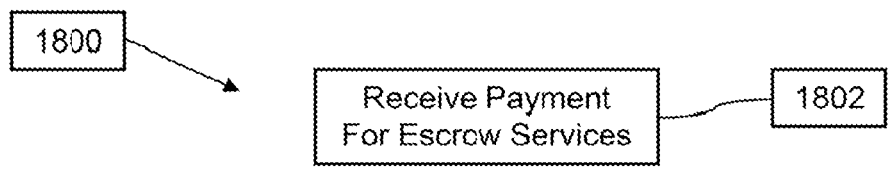
FIG. 18 is a flow chart of a particular aspect of a method of operating an article of value exchange system related to receiving payment by the exchange system for escrow services rendered, according to one illustrated embodiment.

FIG. 18 shows a method 1800 for carrying out a particular aspect of method 600 related to receiving payment by the article of value exchange system for escrow services rendered, according to another illustrated embodiment. More particularly, FIG. 18 may show the method 1800 for carrying out an aspect of method 1700 wherein method 1800 may follow from method 1700.

At 1802, the article of value exchange system receives from the exchange system payment for escrow services rendered. The payment for escrow services may be received by a payment receipt portion of the article of value exchange system.

Figure 19:
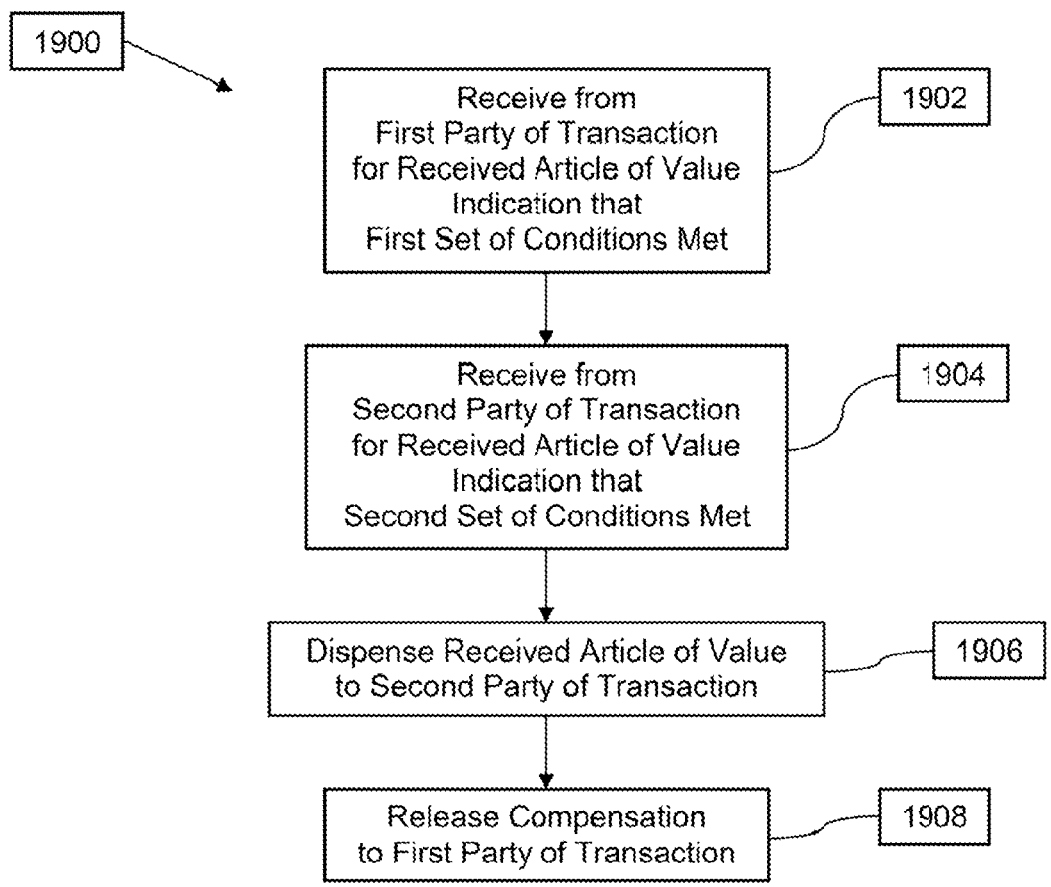
FIG. 19 is a flow chart of a particular aspect of a method of operating an article of value exchange system related to dispensing an article of value and releasing compensation for the article of value by the exchange system, according to one illustrated embodiment.

FIG. 19 shows a method 1900 for carrying out a particular aspect of method 600 related to dispensing and releasing compensation for the received article of value by the article of value exchange system, according to another illustrated embodiment. More particularly, FIG. 19 may show the method 1900 for carrying out an aspect of method 1800 wherein method 1900 may follow from method 1800.

At 1902, at least one processor of the article of value exchange system receives from a first party to a transaction for the received article of value an indication that a first set of conditions of the transaction has been met.

At 1904, at least one processor of the exchange system receives from a second party to the transaction an indication that a second set of conditions of the transaction has been met.

At 1906, the article of value exchange system dispenses the received article of value to the second party to the transaction. The exchange system dispenses the article of value to the second party in response to at least receipt of the indications that the first and second sets of condition of the transaction have been met. The exchange system may dispense the article of value by a dispensing portion of the exchange system.

At 1908, the article of value exchange system, having dispensed the article of value to the second party to the transaction, releases to the first party to the transaction compensation or payment for the received article of value. The compensation or payment to the first party may be made by a payment portion of the exchange system.

Figure 20:
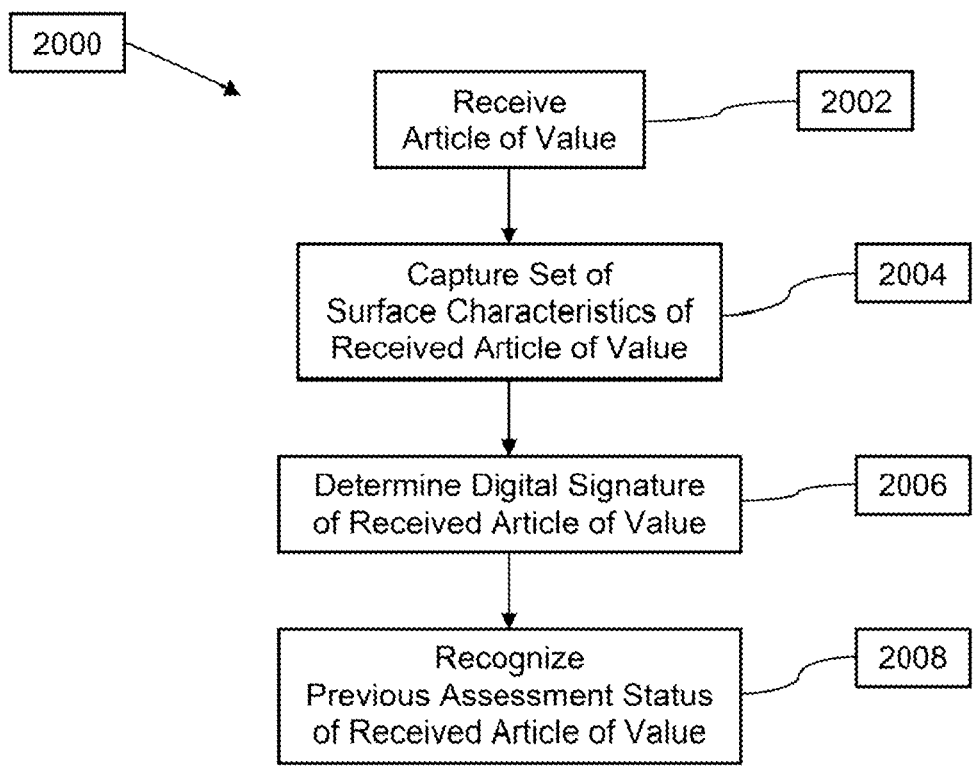
FIG. 20 is a flow chart at a high level of a method of operating an article of value exchange system, according to another illustrated embodiment.

FIG. 20 shows at a high level a method 2000 of operating an article of value exchange system, according to one illustrated embodiment. The exchange system may include at least one processor, at least one nontransitory process-readable storage medium communicatively coupled to the at least one processor, and at least one image acquisition subsystem also communicatively coupled to the at least one processor. The article of value exchange system may include any of such systems or components thereof, including variations thereof, described and discussed herein, and may be useful for any of the various operations disclosed and discussed herein.

At 2002, an article of value receiving portion of the article of value exchange system receives an article of value. The article of value receiving portion of the system may have any configuration and characteristics suitable for receiving an article of value having any form disclosed and discussed herein, including various forms of bullion. In particular, for example, the article of value may be in the form of a coin.

At 2004, at least one image acquisition subsystem of the article of value exchange system may capture a set of surface characteristics from the received article of value. The set of surface characteristics may be selected to uniquely identify the article of value. In particular, the set of surface characteristics of the received article of value may uniquely distinguish the received article of value from other articles of value of the same type and/or from articles of value of other types compared to the received article of value.

At 2006, at least one processor of the article of value exchange system determines a digital signature of the received article of value. The determined digital signature is based at least in part on the set of surface characteristics captured by the image acquisition subsystem. The unique surface characteristics included in the digital signature may uniquely reproducibly identify the received article of value and distinguish it from other articles of value of the same or different types.

At 2008, at least one processor of the article of value exchange system recognizes previous assessment status of the received article of value and whether the received article of value was previously assessed. Recognition of the previous assessment status is based at least in part on the digital signal determined for the received article of value.

Figure 21:
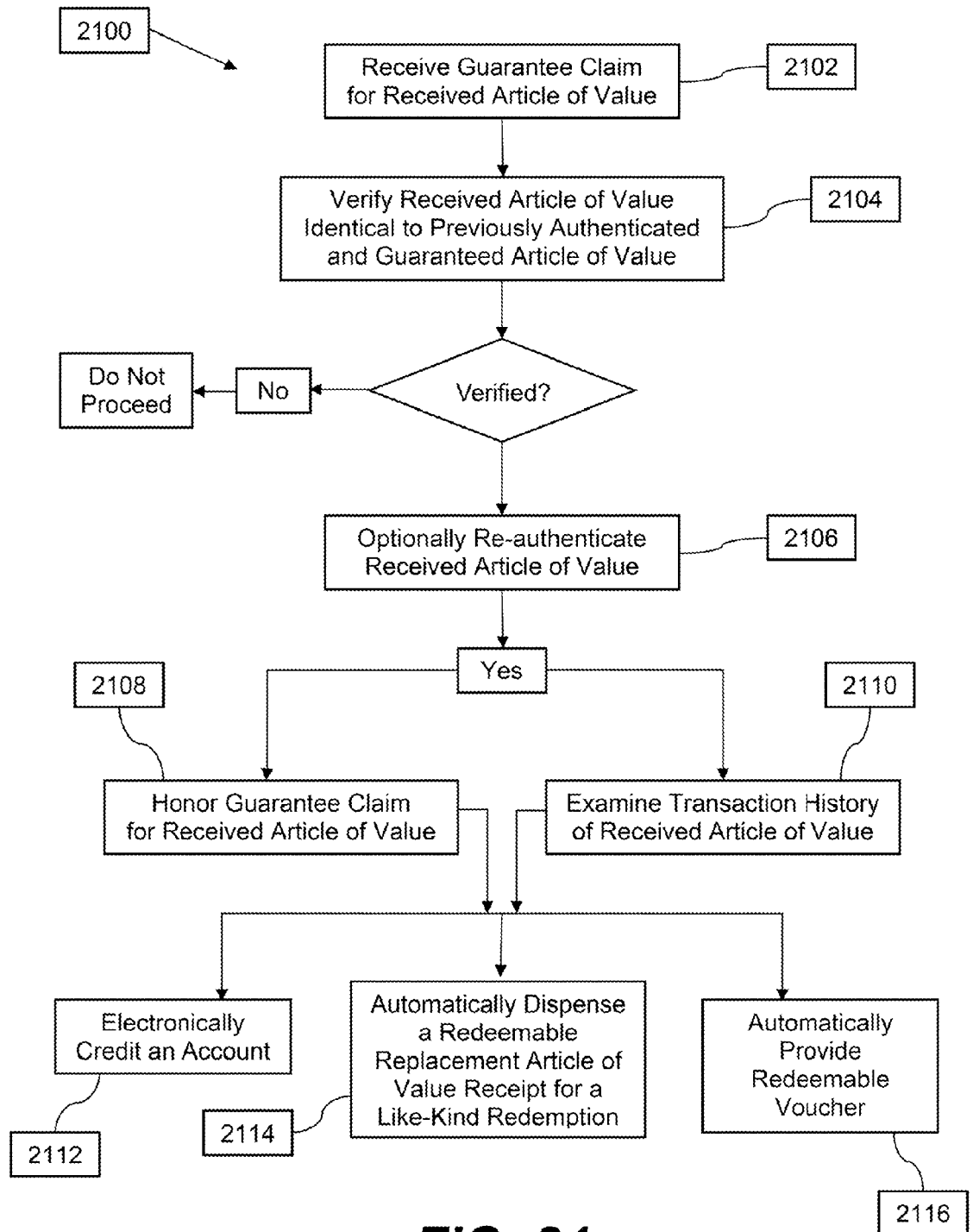
FIG. 21 is a flow chart of a particular aspect of a method of operating an article of value exchange system related to receiving and determining whether to honor a guarantee claim for an article of value received by the exchange system, according to one illustrated embodiment.

FIG. 21 shows a method 2100 for carrying out a particular aspect of method 2000 related to receiving and determining whether to honor a guarantee claim for the received article of value, according to another illustrated embodiment.

At 2102, an article of value exchange system or an operator thereof receives a guarantee claim for the received article of value.

At 2104, at least one processor of the exchange system operates to verify whether or not the received article of value is identical to a previously authenticated and guaranteed article of value. In particular, the processor verifies whether the received article of value is one of a plurality of articles of value previously authenticated and guaranteed. If the received article of value is not verified as identical to one of a plurality of previously authenticated and guaranteed articles of value, the article of value exchange process does not continue.

At 2106, as an aspect of the process of verification of the received article of value, re-authentication of the received article of value may optionally be carried out on the article of value. At least one processor of the article of value exchange system operates to determine whether to honor the received guarantee claim, based at least in part on the outcome of the verification.

At 2108, upon successful verification that the received article of value was previously authenticated and guaranteed, at least one processor of the exchange system operates to reach a conclusion to honor the guarantee claim received for the article of value.

At 2110, upon successful verification that the received article of value was previously authenticated and guaranteed, at least one processor of the exchange system operates to examine the transaction history of the received article of value.

At 2112, upon successful verification that the received article of value was previously authenticated and guaranteed and upon honoring the guarantee and examining the transaction history, at least one processor of the exchange system may operate to electronically credit an account of the party from whom the authenticated and guaranteed article of value was received.

At 2114, upon successful verification that the received article of value was previously authenticated and guaranteed and upon honoring the guarantee and examining the transaction history, the article of value exchange system may automatically dispense a redeemable replacement article of value receipt for a like-kind redemption, that is, dispensing a redeemable replacement receipt essentially independent of external influence or control, largely or wholly involuntary, without interference, assistance or intervention of human will or human physical involvement in the process.

At 2116, upon successful verification that the received article of value was previously authenticated and guaranteed and upon honoring the guarantee and examining the transaction history, at least one processor of the exchange system may operate to automatically provide a redeemable voucher to the party from whom the authenticated and guaranteed article of value was received. The redeemable voucher may have a unique identifier (e.g., machine-readable symbol, value encoded in a wireless transponder) corresponding to at least a portion of a monetary value associated with the guarantee.

Figure 22:
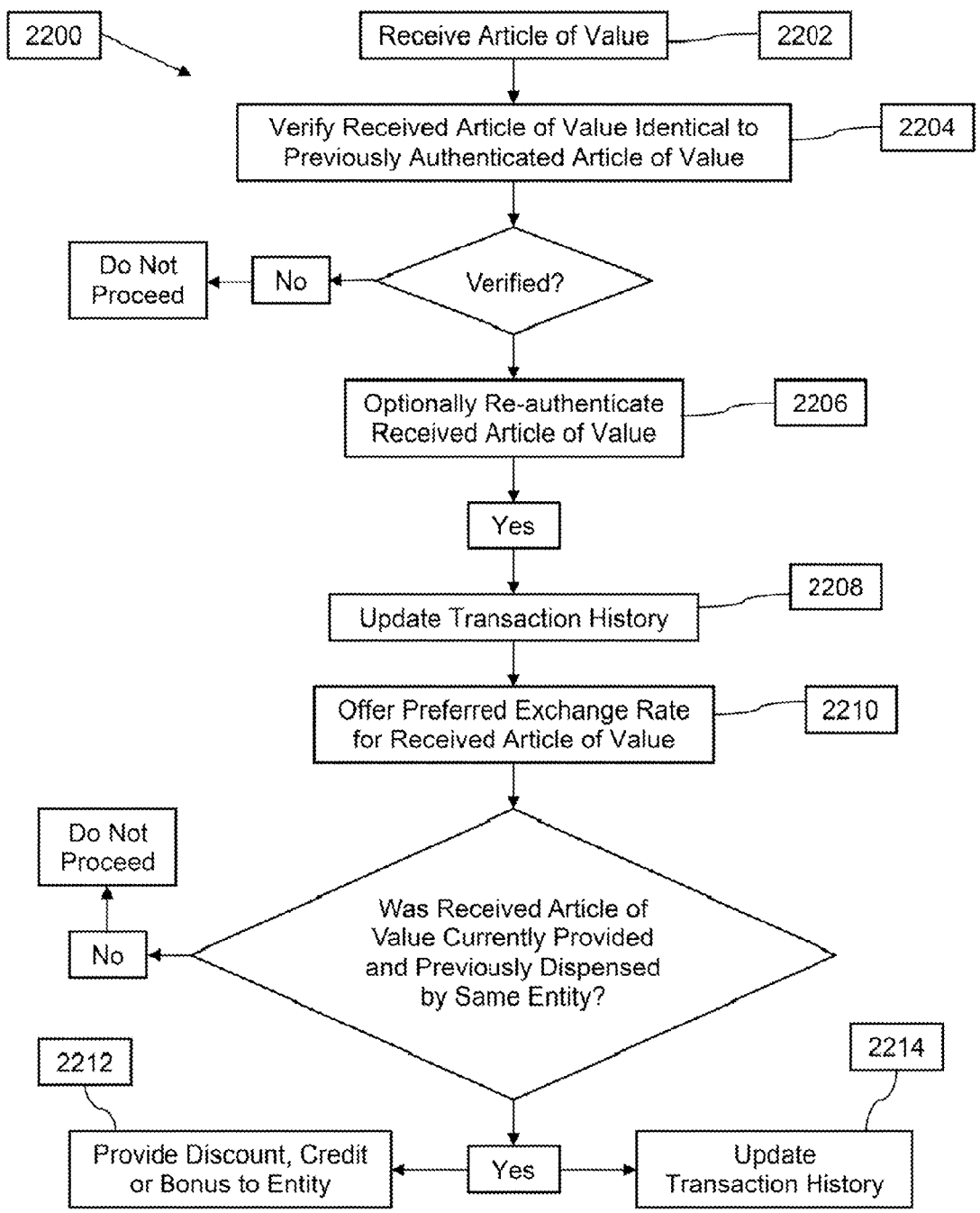
FIG. 22 is a flow chart of a particular aspect of a method of operating an article of value exchange system related to receiving an article of value, verifying the received article of value, and determining whether the received article of value was currently provided and previously dispensed by the same entity, according to one illustrated embodiment.

FIG. 22 shows a method 2200 for carrying out a particular aspect of method 2000 related to receiving an article of value, verifying the received article of value, and determining whether the received article of value was currently provided and previously dispensed by the same entity, according to another illustrated embodiment.

At 2202, an article of value exchange system receives an article of value.

At 2204, at least one processor of the exchange system operates to verify whether or not the received article of value is one of a plurality of articles of value previously authenticated. If the received article of value is not verified as identical to one of a plurality of previously authenticated articles of value, the article of value exchange process does not continue.

At 2206, as an aspect of the process of verification of the received article of value, re-authentication of the received article of value may optionally be carried out on the article of value.

At 2208, upon successful verification that the received article of value was one of a plurality of articles of value that was previously authenticated, at least one processor of the exchange system operates to update the transaction history of the received article of value. Updating the transaction history of the received article of value may include storing at least one of a timestamp when a transaction occurs, a date when the transaction occurs, or a current spot price at a time of the transaction. Updating a transaction history may also include storing a unique set of geographical coordinates corresponding to the location at which a transaction occurs, e.g., as identified by a mobile communications device. Updating a transaction history may also include assigning a unique transaction identifier to the transaction to uniquely identify the transaction and storing the unique transaction identifier.

At 2210, upon successful verification that the received article of value was one of a plurality of articles of value that was previously authenticated, at least one processor of the exchange system operates to offer a preferred exchange rate for the received verified article of value relative to unverified articles of value. At least one processor of the exchange system further determines whether the same entity currently provided and previously dispensed the verified received article of value. The determination is based at least in part on a transaction history of the verified received article of value. If the same entity did not currently provide and previously dispense the verified received article of value, the article of value exchange process does not continue.

At 2212, upon confirmation that the verified received article of value was currently provided and previously dispensed by the same entity, at least one processor of the article of value exchange system provides at least one of a discount, a credit, of a bonus to the entity that currently provided and previously dispensed the article of value.

At 2214, upon confirmation that the verified received article of value was currently provided and previously dispensed by the same entity, at least one processor of the article of value exchange system updates the transaction history of the received article of value.

Figure 23:
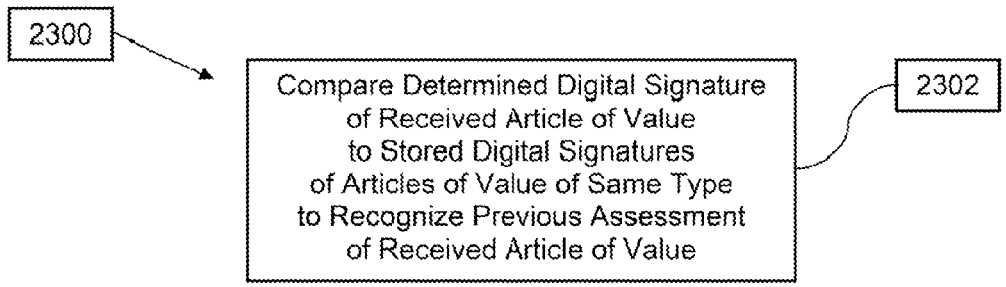
FIG. 23 is a flow chart of a particular aspect of a method of operating an article of value exchange system related to determining or recognizing whether an article of value received by the exchange system was previously assessed, according to one illustrated embodiment.

FIG. 23 shows a method 2300 for carrying out a particular aspect of method 2000 related to determining or recognizing whether the article of value was previously assessed, according to another illustrated embodiment.

At 2302, at least one processor of the article of value exchange system compares the determined digital signature of the received article of value to a number of respective stored digital signatures of other articles of value of at least the same type as the received article of value.

Figure 24:
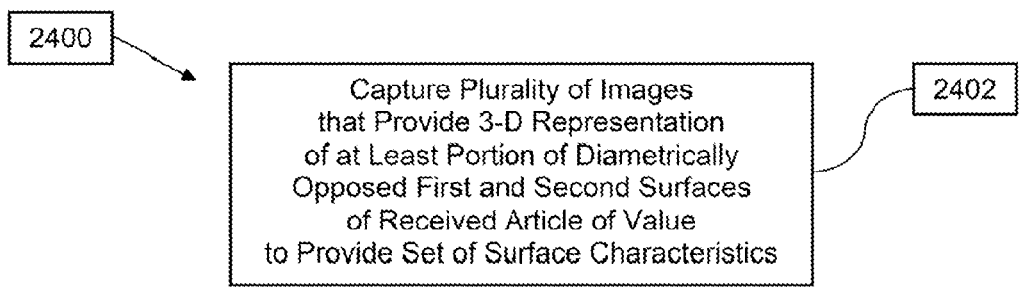
FIG. 24 is a flow chart of a particular aspect of a method of operating an article of value exchange system related to capturing from a received article of value a set of surface characteristics that uniquely identifies the article of value, according to one illustrated embodiment.

FIG. 24 shows a method 2400 for carrying out a particular aspect of method 2000 related to capturing a set of surface characteristics from the received article of value that uniquely identifies the article of value, according to another illustrated embodiment.

At 2402, an image acquisition subsystem of the article of value exchange system captures a plurality of images that provide a three-dimensional representation of at least a portion of a first surface of the received article of value and at least a portion and of at least a portion of a second surface of the received article of value, wherein the first and second surfaces are diametrically opposed to one another across a center plane of the article of value.

Figure 25:
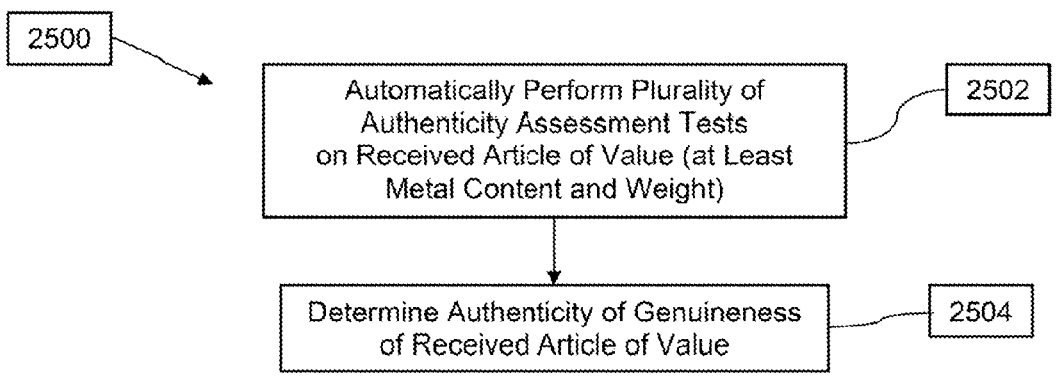
FIG. 25 is a flow chart of a particular aspect of a method of operating an article of value exchange system related to automatically performing a plurality of authenticity assessment tests and determining an authenticity of genuineness of the received article of value, according to one illustrated embodiment.

FIG. 25 shows a method 2500 for carrying out a particular aspect of method 2000 related to automatically performing a plurality of authenticity assessment tests and determining an authenticity of genuineness of the received article of value, according to another illustrated embodiment.

At 2502, the article of value exchange system automatically performs a plurality of authenticity assessment tests on the received article of value. Any such tests are performed essentially independent of external influence or control, largely or wholly involuntary, without interference, assistance or intervention of human will or human physical involvement in the process. The authenticity assessment tests may assess any of a variety of characteristics of a received article of value, including but not necessarily limited to electromagnetic eddy current, physical or other features, dimensions, constituent metal composition and/or weight. An assessment test performed by the exchange system may assess characteristics of a received article of value individually or in any combination. Such a test may assess at least constituent metal content and weight of a received article of value.

At 2504, at least one processor of the article of value exchange system determines and authenticity of genuineness. The authenticity of genuineness is based on an outcome of the plurality of assessment tests and on nominal specifications for an article of value of the same type as the received article of value. The outcome may result from the processor comparing the outcome of the plurality of assessment tests on the received article of value to the nominal specifications of the article of value of the same type.

In one embodiment of a system or device disclosed herein, a coin or other precious metal bullion piece may be uniquely marked at some stage during the authentication process. For example, by a process termed nanoindentation the piece may be given a unique mark that may then be recorded in a transaction history. Nanoindentation may be considered in the same family as Atomic Force Microscopy, though at a much larger scale. To add such an approach in practice, particular features would need to be added:

Physical Coin Orientation

It would be desirable to mark the coin in one or more specific locations so that the marking could be readily identified. Alternatively, each article of value could be marked at a random location such that the mark would be a unique feature in order to allow identification of one mark from another.

Increased Resolution to See and Measure the Marks

Nanoindentation would be expected to require resolution higher than that typically anticipated for the authentication devices and systems, for example, on the order of sub-micrometers. It may also require a more elaborate scanning mechanism that would allow scanning of the entire surface of the coin, even if scanning for only a single nanoindentation. These may increase the cost of the system beyond that required for a system simply designed for authentication.

The Nanoindentation Tool

Such a tool is expected to be relatively expensive.

Power Requirements

Nanoindentation may require a source of power greater than the battery power expected to be adequate to operate the authentication system.

Electronics to Measure the Force Required to Apply the Mark

To use this technique would require measuring and controlling the forces to achieve a mark of known characteristics, such as mark volume. The electronics required for such sensitivity make increase the cost of the device.

From the foregoing, it will be appreciated that specific embodiments of the disclosure have been described herein for purposes of illustration, but that various modifications may be made without deviating from the spirit and scope of the various embodiments of the disclosure. Furthermore, while specific advantages associated with certain embodiments of the disclosure have been described above in the context of those embodiments other embodiments may also exhibit such advantages, and not all embodiments need necessarily exhibit such advantages to fall within the scope of the disclosure.

For example, embodiments as shown need not be exact in the configuration as detailed. Certain parts or processes may be omitted, configured differently, located in other networked machinery, computers, handheld and mobile devices and utilized or accessed remotely, as would be with cloud computing services.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments. Aspects of the embodiments can be modified, if necessary, to employ systems, circuits and concepts of the various patents, applications and publications to provide yet further embodiments.

For instance, the foregoing detailed description has set forth various embodiments of the devices and/or processes via the use of block diagrams, schematics, flow charts and examples. Insofar as such block diagrams, schematics, flow charts and examples contain one or more functions and/or operations, it will be understood by those skilled in the art that each function and/or operation within such block diagrams, flow charts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of operating an article of value exchange system including at least one processor, at least one nontransitory process-readable storage medium communicatively coupled to the at least one processor, and at least one image acquisition subsystem communicatively coupled to the at least one processor, the method comprising:
  receiving an article of value by an article of value receiving portion of the article of value exchange system;
  capturing by the image acquisition subsystem a set of surface characteristics from the article of value that uniquely identifies the article of value from other articles of value of a same type and from articles of value of other types;
  automatically performing a plurality of authenticity assessment tests on the received article of value without human intervention, the authenticity assessment tests which assess at least constituent metal content and weight of the received article of value;

determining an authenticity of genuineness of the received article of value, by the at least one processor, based on an outcome of the plurality of assessment tests and nominal specifications for at least constituent metal content and weight;

creating a digital signature for the received article of value, by the at least one processor, that includes information that uniquely reproducibly identifies the article of value from other articles of value of the same type and of different types; and causing a storing of the digital signature for the received article of value for later use in at least one of recognition or verification of the received article of value.

2. The method of claim 1 wherein capturing a set of surface characteristics from the article of value that uniquely identifies the article of value includes capturing a plurality of images that provide a three-dimensional representation of at least a portion of at least one surface of the received article of value.

3. The method of claim 1 wherein capturing a set of surface characteristics from the article of value that uniquely identifies the article of value includes capturing a plurality of images of at least one entire surface of the received article of value.

4. The method of claim 1 wherein capturing a set of surface characteristics from the article of value that uniquely identifies the article of value includes capturing a plurality of images of at least a portion of a first surface of the received article of value and from at least a portion of a second surface of the received article of value, the second surface diametrically opposed to the first surface across a center plane of the article of value.

5. The method of claim 1 wherein performing a plurality of authenticity assessment tests on the received article of value includes performing electromagnetic eddy current tests on the received article of value and weighing the received article of value.

6. The method of claim 1 wherein determining an authenticity of genuineness of the received article of value includes comparing an assessed metal composition of the article of value to a nominal metal composition for articles of value of the same type as the received article of value.

7. The method of claim 1 wherein determining an authenticity of genuineness of the received article of value includes comparing an assessed weight of the article of value to a nominal weight for articles of value of the same type as the received article of value.

8. The method of claim 1 wherein determining an authenticity of genuineness of the received article of value includes comparing an assessed metal purity of the article of value to a nominal metal purity for articles of value of the same type as the received article of value.

9. The method of claim 1 wherein determining an authenticity of genuineness of the received article of value includes detecting a discontinuity in a metal composition of the article of value.

10. The method of claim 1 wherein determining an authenticity of genuineness of the received article of value includes comparing at least one perimeter dimension of the article of value from a number of captured images of at least a portion of the article of value to a respective nominal perimeter dimension for the article of value.

11. The method of claim 1 wherein determining an authenticity of genuineness of the received article of value includes comparing at least one non-unique surface characteristic to a nominal non-unique surface characteristic for articles of value of the same type as the received article of value.

12. The method of claim 1 wherein creating a digital signature for the received article of value includes creating from the captured images a constellation signature map that represents a number of contact marks from wear and a number of birth marks from striking or casting of the received article of value.

13. The method of claim 1 wherein creating a digital signature for the received article of value includes creating from the captured images a constellation signature map that represents surface characteristics including a number of contact marks from wear and a number of birth marks from striking or casting of the received article of value in three dimensions.

14. The method of claim 13 wherein creating a digital signature for the received article of value further includes creating the digital signature based at least in part on one or more measured or assessed physical characteristics of the received article of value in addition to the surface characteristics represented by the constellation signature map.

15. The method of claim 1 wherein causing a storing of the digital signature for the received article of value for later use includes transmitting the digital signature to a remotely located host processor-based system for distribution to a plurality of remotely distributed article of value exchange systems.

16. The method of claim 1, further comprising:
updating a transaction history of the received article of value.

17. The method of claim 16 wherein updating a transaction history of the received article of value, includes storing at least one of a timestamp when a transaction occurs, a date when the transaction occurs, a location where the transaction occurs, a current spot price at a time of the transaction, a mobile communications device identifying a unique set of geographic coordinates, or assigning a unique transaction identifier to uniquely identify the transaction.

18. The method of claim 17, further comprising:
automatically providing an indication of a guarantee of the authenticity of the article value at a completion of the transaction.

19. The method of claim 1, further comprising:
handling a payment for an article of value of the same type as the received article of value by a payment receipt portion of the article of value exchange system; and
dispensing the received article of value by a dispensing portion of the article of value exchange system.

20. The method of claim 19, further comprising:
updating a transaction history of the received article of value being dispensed.

21. The method of claim 19, further comprising:
recapturing by the image acquisition subsystem, immediately before dispensing the received article of value, a set of surface characteristics from the article of value that uniquely identifies the article of value from other articles of value of the same type and from articles of value of other types;
recreating a digital signature for the received article of value immediately before dispensing, by the at least one processor, that includes information that uniquely reproducibly identifies the article of value from other articles of value of the same type and of different types; and
verifying an identity of the article of value being dispensed based at least in part on the recreated digital signature.

22. The method of claim 19, further comprising:
re-performing the plurality of authenticity assessment tests on the received article of value immediately before dispensing the received article of value, the authenticity assessment tests which assess at least constituent metal content and weight of the received article of value; and re-determining an authenticity of genuineness of the received article of value, by the at least one processor immediately before dispensing the received article of value, based on an outcome of the plurality of assessment tests and nominal specifications for at least constituent metal content and weight.

23. The method of claim 1, further comprising:

receiving, by the at least one processor, an indication from a first party to a transaction for the received article of value that all conditions of the transaction for the received article of value have been met; and in response to at least receipt of the indication from the first party, dispensing the received article of value to a second party of the transaction for the received article of value by a portion of the article of value exchange system.

24. The method of claim 23, further comprising:

receiving a payment by a payment receipt portion of the article of value exchange system for escrow services rendered by the article of value exchange system.

25. The method of claim 24, further comprising:

receiving, by the at least one processor, an indication from a first party to a transaction for the received article of value that a first set of conditions of the transaction for the received article of value has been met; and receiving, by the at least one processor, an indication from a second party to the transaction for the received article of value that a second set of conditions of the transaction for the received article of value has been met;

in response to at least receipt of the indications that the first and the second set of conditions have been met:

dispensing the received article of value to the second party of the transaction for the received article of value; and releasing compensation to the first party of the transaction for the received article of value.

26. A method of operating an article of value exchange system including at least one processor, at least one nontransitory process-readable storage medium communicatively coupled to the at least one processor, and at least one image acquisition subsystem communicatively coupled to the at least one processor, the method comprising:

receiving an article of value by an article of value receiving portion of the article of value exchange system;

capturing by the image acquisition subsystem a set of surface characteristics from the article of value that uniquely identifies the article of value from other articles of value of a same type and from articles of value of other types;

determining a digital signature of the received article of value, by the at least one processor, based at least in part on the captured set of surface characteristics; and recognizing, by the at least one processor, whether the received article of value was previously assessed based at least in part on the determined digital signature for the received article of value.

27. The method of claim 26, further comprising:

receiving a guarantee claim for the received article of value;

verifying, by the at least one processor, that the received article of value is one of a plurality of articles of value which were previously authenticated and guaranteed; and determining whether to honor the guarantee claim for the received article of value based at least in part on an outcome of the verification.

28. The method of claim 27, further comprising:

in response to an outcome of the verification indicating that the received article of value was previously authenticated and guaranteed, examining a transaction history of the received article of value.

29. The method of claim 27 or 28, further comprising:

in response to an outcome of the verification indicating that the received article of value was previously authenticated and guaranteed, electronically crediting an account.

30. The method of claim 27 or 28, further comprising:

in response to an outcome of the verification indicating that the received article of value was previously authenticated and guaranteed, automatically dispensing by the article of value exchange system a redeemable replacement article of value receipt for a like-kind redemption.

31. The method of claim 27 or 28, further comprising:

in response to an outcome of the verification that indicates that the received article of value was previously authenticated and guaranteed, automatically providing a redeemable voucher with a unique identifier for at least a portion of a monetary value associated with the guarantee.

32. The method of claim 27, further comprising:

verifying, by the at least one processor, that the received article of value is one of a plurality of articles of values which were previously authenticated; and in response to an outcome of the verification that indicates that the received article of value is one of a plurality of articles of values which were previously authenticated, updating a transaction history of the received article of value.

33. The method of claim 32 wherein updating a transaction history of the received article of value, includes storing at least one of a timestamp when a transaction occurs, a date when the transaction occurs, a location where the transaction occurs, a current spot price at a time of the transaction, or assigning a unique transaction identifier to uniquely identify the transaction.

34. The method of claim 27, further comprising:

verifying, by the at least one processor, that the received article of value is one of a plurality of articles of values which were previously authenticated; and in response to an outcome of the verification that indicates that the received article of value is one of a plurality of articles of values which were previously authenticated, offering a preferred exchange rate for the received verified article of value relative to unverified articles of value.

35. The method of claim 27, further comprising:

verifying, by the at least one processor, that the received article of value is one of a plurality of articles of values which were previously authenticated; and in response to an outcome of the verification that indicates that the received article of value is one of a plurality of articles of values which were previously authenticated, determining, by the at least one processor, whether an entity who has currently provided the received article of value to the article of value exchange system was the same entity to whom the article of value was previously dispensed based at least in part on a transaction history of the received article of value.

36. The method of claim 35, further comprising:

in response to a determination that the entity who has currently provided the received article of value to the article of value exchange system was previously dispensed the received article of value, updating the transaction history of the received article of value.

37. The method of claim 35, further comprising:
in response to a determination that the entity who has currently provided the received article of value to the article of value exchange system was previously dispensed the received article of value, providing at least one of a discount, a credit, or a bonus to the entity.

38. The method of claim 26, 27, 32, 34 or 35 wherein recognizing whether the received article of value was previously assessed includes comparing the determined digital signature of the received article of value to a number of respective stored digital signatures of other articles of value of at least the same type as the received article of value.

39. The method of claim 26, 27, 32, 34 or 35 wherein capturing a set of surface characteristics from the article of value that uniquely identifies the article of value includes capturing a plurality of images that provide a three-dimensional representation of at least a portion of a first surface of the received article of value and from at least a portion of a second surface of the received article of value, the second surface diametrically opposed to the first surface across a center plane of the article of value.

40. The method of claim 26, 27, 32, 34 or 35, further comprising:
automatically performing a plurality of authenticity assessment tests on the received article of value, the authenticity assessment tests which assess at least constituent metal content and weight of the received article of value; and
determining, by the at least one processor, an authenticity of genuineness of the received article of value based on an outcome of the plurality of assessment tests and nominal specifications for at least constituent metal content and weight.

41. The method of claim 26, further comprising:
causing, by the at least one processor, a storing of the determined digital signature for the received article of value for later use in at least one of recognition or verification of the received article of value.

42. The method of claim 26, further comprising:
updating, by the at least one processor, a previously stored digital signature for the received article of value based on the determined digital signature for the received article of value.

43. The method of claim 26, further comprising:
automatically providing an indication of a guarantee of the authenticity of the article value upon a dispensing the article of value.

44. A method for bullion piece authentication, the method comprising:
placing a bullion piece in contact with a bullion piece authentication device by a first user;
automatically measuring one or more characteristics of the bullion piece by the bullion piece authentication device;
automatically and with no human intervention, comparing the measurement data to a reference set of information for authentic bullion pieces;
automatically and with no human intervention, determining whether the bullion piece is authentic;
displaying an indication to the first user indicative of whether the bullion piece is authentic; and
the first user removing the authenticated bullion piece from contact with the bullion piece authentication device.

45. The method of claim 44 wherein a placing a bullion piece in contact with a bullion piece authentication device by a first user includes placing the bullion piece in a handheld bullion piece authentication device.

46. The method of claim 44 wherein placing a bullion piece in contact with a bullion piece authentication device by a first user includes placing the bullion piece in a retaining area within the bullion piece authentication device.

47. The method of claim 44 wherein placing a bullion piece in contact with a bullion piece authentication device by a first user includes contacting the bullion piece with a probe of the bullion piece authentication device.

48. The method of claim 44 wherein automatically measuring one or more characteristics of the bullion piece includes measuring electromagnetic characteristics of the bullion piece.

49. The method of claim 48 wherein measuring electromagnetic characteristics of the bullion piece includes measuring eddy currents.

50. The method of claim 44 wherein automatically measuring one or more characteristics of the bullion piece includes imaging to capture identifying characteristics on a surface of the bullion piece.

51. The method of claim 44 wherein automatically measuring one or more characteristics of the bullion piece includes weighing the bullion piece.

52. The method of claim 44 wherein automatically measuring one or more characteristics of the bullion piece includes lighting the bullion piece with structured or diffuse lighting.

53. The method of claim 44 wherein automatically measuring one or more characteristics of the bullion piece includes x-raying the bullion piece.

54. The method of claim 44 wherein automatically measuring one or more characteristics of the bullion piece includes measuring acoustic velocity of the bullion piece.

55. The method of claim 44 wherein automatically measuring one or more characteristics of the bullion piece includes measuring far field scattering signatures of the bullion piece.

56. The method of claim 44 wherein comparing measurement data to a reference set of information includes comparing the measurement data to the reference set of information at a remote location from the bullion piece authentication device.

57. The method of claim 44 wherein comparing measurement data to a reference set of information includes comparing the measurement data to the reference set of information at the bullion piece authentication device.

58. The method of claim 44, further comprising: transmitting characteristics measurements over the Internet to a remote location from the bullion piece authentication device.

59. The method of claim 44, further comprising: charging a service fee for providing an authentication service via the bullion piece authentication device.

60. The method of claim 44, further comprising: debiting a financial account of the first user a service fee for providing an authentication service via the bullion piece authentication device.

61. The method of claim 44, further comprising: debiting a user account of the first user a service fee for providing an authentication service via the bullion piece authentication device.

62. The method of claim 44, further comprising: causing a debiting of a wireless carrier account of the first user a service fee for providing an authentication service via the bullion piece authentication device.

63. The method of claim 44, further comprising: debiting a revolving credit card account of the first user a service fee for providing an authentication service via the bullion piece authentication device.

64. The method of claim 44, further comprising: debiting a gift card account of the first user a service fee for providing an authentication service via the bullion piece authentication device.

65. The method of claim 44, further comprising: charging a financial account of the first user a service fee on a monthly, annual or other intermittent basis for providing an authentication service via the bullion piece authentication device.

66. The method of claim 44 wherein the first user is offered the authentication service for no charge.

67. The method of claim 44 wherein the first user is offered the authentication service for a charitable donation.

68. The method of claim 44 wherein the first user is offered the authentication service for a combination of partial fee and partial charitable donation.

69. The method of claim 44, further comprising: automatically making an offer of guarantee of authenticity to the first user when the bullion piece is automatically determined to be authentic.

70. The method of claim 44, further comprising: charging a service fee to the first user for issuing a guarantee of authenticity to the first user as offered when the bullion piece is automatically determined to be authentic.

71. The method of claim 44, further comprising: debiting a financial account of the first user a service fee for providing a guarantee of authenticity to the first user as offered when the bullion piece is automatically determined to be authentic.

72. The method of claim 44, further comprising: debiting a user account of the first user a service fee for providing a guarantee of authenticity to the first user as offered when the bullion piece is automatically determined to be authentic.

73. The method of claim 44, further comprising: causing a debiting of a wireless carrier account of the first user for providing a guarantee of authenticity to the first user as offered when the bullion piece is automatically determined to be authentic.

74. The method of claim 44, further comprising: debiting a revolving credit card account of the first user for providing a guarantee of authenticity to the first user as offered when the bullion piece is automatically determined to be authentic.

75. The method of claim 44, further comprising: debiting a gift card account of the first user for providing a guarantee of authenticity to the first user as offered when the bullion piece is automatically determined to be authentic.

76. The method of claim 44, further comprising: charging a financial account of the first user a service fee on a monthly, annual or other intermittent basis for providing a guarantee of authenticity to the first user as offered when the bullion piece is automatically determined to be authentic.

77. The method of claim 44 wherein the first user is offered a guarantee of authenticity for no charge.

78. The method of claim 44 wherein the first user is offered a guarantee of authenticity for a charitable donation.

79. The method of claim 44 wherein the first user is offered a guarantee of authenticity for a combination of partial fee and partial charitable donation.

80. The method of claim 44, further comprising: an automatic determination by the bullion piece authentication device that, based upon identification of unique surface marks of the bullion piece, the bullion piece is a specific bullion piece previously catalogued in a database.

81. An article of value exchange system, the system comprising:
at least one processor;
at least one nontransitory process-readable storage medium communicatively coupled to the at least one processor;
at least one image acquisition subsystem communicatively coupled to the at least one processor; and
at least one assessment test subsystem communicatively coupled to the at least one processor;
an article of value receiving portion of the exchange system configured to receive an article of value;
the at least one image acquisition subsystem operable to capture a set of surface characteristics from the article of value that uniquely identifies the article of value from other articles of value of a same type and from articles of value of other types;
the exchange system operable to automatically perform a plurality of authenticity assessment tests on the received article of value without human intervention, the authenticity assessment tests assessing at least constituent metal content and weight of the received article of value;
the at least one processor operable to determine an authenticity of genuineness of the received article of value, the determination based on an outcome of the plurality of assessment tests and nominal specifications for at least constituent metal content and weight;
the at least one processor operable to create a digital signature for the received article of value, the digital signature including information that uniquely reproducibly identifies the article of value from other articles of value of the same type and of different types; and
the exchange system operable to store the digital signature of the received article of value for later use in at least one of recognition or verification of the received article of value.

82. The exchange system of claim 81 wherein the at least one image acquisition subsystem captures a plurality of images that provide a three-dimensional structure of at least a portion of at least one surface of the received article of value.

83. The exchange system of claim 81 wherein the at least one image acquisition subsystem captures a plurality of images that provide a three-dimensional structure of at least a portion of at least one entire surface of the received article of value.

84. The exchange system of claim 81 wherein the at least one image acquisition subsystem captures a plurality of images that provide a three-dimensional structure of at least a portion of at least a portion of a first surface of the received article of value and from at least a portion of a second surface of the received article of value, the second surface diametrically opposed to the first surface across a center plane of the article of value.

85. The exchange system of claim 81 wherein the at least one assessment test subsystem includes an electromagnetic eddy current tester and a load cell and performs a plurality of authenticity assessment tests on the received article of value including performing electromagnetic eddy current tests on the received article of value and weighing the received article of value.

86. The exchange system of claim 81 wherein the at least one processor determines an authenticity of genuineness of the received article of value including comparing an assessed metal composition of the article of value to a nominal metal composition for articles of value of the same type as the received article of value.

87. The exchange system of claim 81 wherein the at least one processor determines an authenticity of genuineness of the received article of value including comparing an assessed weight of the article of value to a nominal weight for articles of value of the same type as the received article of value.

88. The exchange system of claim 81 wherein the at least one processor determines an authenticity of genuineness of the received article of value including comparing an assessed metal purity of the article of value to a nominal metal purity for articles of value of the same type as the received article of value.

89. The exchange system of claim 81 wherein the at least one processor determines an authenticity of genuineness of the received article of value including detecting a discontinuity in a metal composition of the article of value.

90. The exchange system of claim 81 wherein the at least one processor determines an authenticity of genuineness of the received article of value including comparing at least one perimeter dimension of the article of value from a number of captured images of at least a portion of the article of value to a respective nominal perimeter dimension for the article of value.

91. The exchange system of claim 81 wherein the at least one processor determines an authenticity of genuineness of the received article of value including comparing at least one non-unique surface characteristic to a nominal non-unique surface characteristic for articles of value of the same type as the received article of value.

92. The exchange system of claim 81 wherein the at least one processor creates from the captured images a constellation signature map that represents a number of contact marks from wear and a number of birth marks from striking or casting of the received article of value.

93. The exchange system of claim 81 wherein the at least one processor creates from the captured images a constellation signature map that represents surface characteristics including a number of contact marks from wear and a number of birth marks from striking or casting of the received article of value in three dimensions.

94. The exchange system of claim 93 wherein the at least one processor creates a digital signature for the received article of value further including creating the digital signature based at least in part on one or more measured or assessed physical characteristics of the received article of value in addition to the surface characteristics represented by the constellation signature map.

95. The exchange system of claim 81 wherein the exchange system stores the digital signature for the received article of value for later use including transmitting the digital signature to a remotely located host processor-based system for distribution to a plurality of remotely distributed article of value exchange systems.

96. The exchange system of claim 81 wherein the processor updates a transaction history of the received article of value.

97. The exchange system of claim 96 wherein updating a transaction history of the received article of value includes storing at least one of a timestamp when a transaction occurs, a date when the transaction occurs, a location where the transaction occurs, a current spot price at a time of the transaction, a unique mobile communications device identifying a set of geographic coordinates, or assigning a unique transaction identifier to uniquely identify the transaction.

98. The exchange system of claim 97 wherein the exchange system automatically provides an indication of a guarantee of the authenticity of the article value at a completion of the transaction.

99. The exchange system of claim 81 wherein a payment receiving portion of the exchange system handles a payment for an article of value of the same type as the received article of value and a dispensing portion of the exchange system dispenses the received article of value.

100. The exchange system of claim 99 wherein the processor updates a transaction history of the received article of value being dispensed.

101. The exchange system of claim 99 wherein
immediately before the dispensing portion of the exchange systems dispenses the received article of value, the image acquisition subsystem recaptures a set of surface characteristics from the article of value that uniquely identifies the article of value from other articles of value of the same type and from articles of value of other types;
immediately before dispensing the received article of value, the at least one processor recreates a digital signature for the received article of value that includes information that uniquely reproducibly identifies the article of value from other articles of value of the same type and of different types; and
the at least one processor verifies an identity of the article of value being dispensed based at least in part on the recreated digital signature.

102. The exchange system of claim 99 wherein
immediately before the dispensing portion of the exchange systems dispenses the received article of value, the at least one assessment test subsystem re-performs the plurality of authenticity assessment tests on the received article of value including assessing at least constituent metal content and weight of the received article of value;
immediately before dispensing the received article of value, the at least one processor re-determines the authenticity of genuineness of the received article of value, based on an outcome of the plurality of assessment tests and nominal specifications for at least constituent metal content and weight.

103. The exchange system of claim 81 wherein the at least one processor receives an indication from a first party to a transaction for the received article of value that all conditions of the transaction for the received article of value have been met and, in response to at least receipt of the indication from the first party, dispenses the received article of value to a second party of the transaction for the received article of value by a dispensing portion of the article of value exchange system.

104. The exchange system of claim 103 wherein a payment receipt portion of the exchange system receives a payment for escrow services rendered by the exchange system.

105. The exchange system of claim 104 wherein
the at least one processor receives an indication from a first party to a transaction for the received article of value that a first set of conditions of the transaction for the received article of value have been met;
the at least one processor receives an indication from a second party to the transaction for the received article of value that a second set of conditions of the transaction for the received article of value have been met; and
in response to at least receipt of the indication that the first and the second set of conditions have been met, a dispensing portion of the exchange system dispenses the received article of value to the second party of the transaction for the received article of value; and the exchange system releases compensation to the first party of the transaction for the received article of value.

106. An article of value exchange system, the system comprising:
- at least one processor;
- at least one nontransitory process-readable storage medium communicatively coupled to the at least one processor; and
- at least one image acquisition subsystem communicatively coupled to the at least one processor;
- an article of value receiving portion of the exchange system configured to receive an article of value;
- the at least one image acquisition subsystem operable to capture a set of surface characteristics from the article of value that uniquely identifies the article of value from other articles of value of a same type and from articles of value of other types;
- the at least one processor operable to create a digital signature for the received article of value, the digital signature including information that uniquely reproducibly identifies the article of value from other articles of value of the same type and of different types; and
- the at least one processor operable to recognize whether the received article of value was previously assessed based at least in part on the determined digital signature for the received article of value.

107. The exchange system of claim 106 wherein the exchange system receives a guarantee claim for the received article of value; verifies, by the at least one processor, that the received article of value is one of a plurality of articles of value which were previously authenticated and guaranteed; and determines whether to honor the guarantee claim for the received article of value based at least in part on an outcome of the verification.

108. The exchange system of claim 107 wherein, in response to an outcome of the verification indicating that the received article of value was previously authenticated and guaranteed, the exchange system examines a transaction history of the received article of value.

109. The exchange system of claim 107 or 108 wherein, in response to an outcome of the verification indicating that the received article of value was previously authenticated and guaranteed, the exchange system electronically credits an account.

110. The exchange system of claim 107 or 108 wherein, in response to an outcome of the verification indicating that the received article of value was previously authenticated and guaranteed, a dispensing portion of the exchange system automatically dispenses a replacement article of value by the article of value exchange system.

111. The exchange system of claim 107 or 108 wherein, in response to an outcome of the verification indicating that the received article of value was previously authenticated and guaranteed, the exchange system automatically provides a redeemable voucher with a unique identifier for at least a portion of a monetary value associated with the guarantee.

112. The exchange system of claim 107 wherein the exchange system verifies, by the at least one processor, that the received article of value is one of a plurality of articles of values which were previously authenticated and, in response to an outcome of the verification that indicates that the received article of value is one of a plurality of articles of values which were previously authenticated, updates a transaction history of the received article of value.

113. The exchange system of claim 112 wherein updating a transaction history of the received article of value, includes storing at least one of a timestamp when a transaction occurs, a date when the transaction occurs, a location where the transaction occurs, a current spot price at a time of the transaction, or assigning a unique transaction identifier to uniquely identify the transaction.

114. The exchange system of claim 107 wherein the exchange system verifies, by the at least one processor, that the received article of value is one of a plurality of articles of values which were previously authenticated and, in response to an outcome of the verification that indicates that the received article of value is one of a plurality of articles of values which were previously authenticated, provides a preferred exchange rate for the received verified article of value relative to unverified articles of value.

115. The exchange system of claim 107 wherein the exchange system verifies, by the at least one processor, that the received article of value is one of a plurality of articles of values which were previously authenticated and, in response to an outcome of the verification that indicates that the received article of value is one of a plurality of articles of values which were previously authenticated, determines, by the at least one processor, whether an entity who has currently provided the received article of value to the article of value exchange system was previously dispensed the received article of value based at least in part on a transaction history of the received article of value.

116. The exchange system of claim 115 wherein, in response to a determination that the entity who has currently provided the received article of value to the article of value exchange system was the entity to whom the exchange system previously dispensed the received article of value, the exchange system updates the transaction history of the received article of value.

117. The exchange system of claim 115 wherein, in response to a determination that the entity who has currently provided the received article of value to the article of value exchange system was the entity to whom the exchange system previously dispensed the received article of value, the exchange system provides at least one of a discount, a credit, or a bonus to the entity.

118. The exchange system of claim 106, 107, 112, 114 or 115 wherein operable to recognize whether the received article of value was previously assessed includes operable to compare the determined digital signature of the received article of value to a number of respective stored digital signatures of other articles of value of at least the same type as the received article of value.

119. The exchange system of claim 106, 107, 112, 114 or 115 wherein operable to capture a set of surface characteristics from the article of value that uniquely identifies the article of value includes operable to capture a plurality of images that provide a three-dimensional representation of at least a portion of a first surface of the received article of value and from at least a portion of a second surface of the received article of value, the second surface diametrically opposed to the first surface across a center plane of the article of value.

120. The exchange system of claim 106, 107, 112, 114 or 115 wherein the exchange system automatically performs, by at least one assessment test subsystem, a plurality of authenticity assessment tests on the received article of value, the authenticity assessment tests assessing at least constituent metal content and weight of the received article of value, and determines, by the at least one processor, an authenticity of genuineness of the received article of value based on an outcome of the plurality of assessment tests and nominal specifications for at least constituent metal content and weight.

121. The exchange system of claim 106 wherein the exchange system stores, by the at least one processor, the determined digital signature for the received article of value for later use in at least one of recognition or verification of the received article of value.

122. The exchange system of claim 106 wherein the exchange system updates, by the at least one processor, a previously stored digital signature for the received article of value based on the determined digital signature for the received article of value.

123. The exchange system of claim 106 wherein the exchange system automatically provides an indication of a guarantee of the authenticity of the article value upon a dispensing the article of value.

124. A bullion piece authentication device, the device comprising:
- at least one processor;
- at least one nontransitory process-readable storage medium communicatively coupled to the at least one processor;
- at least one bullion piece measurement subsystem communicatively coupled to the at least one processor; and
- at least one bullion piece contact site configured to contact a bullion piece;
- the at least one bullion piece measurement subsystem operable to measure physical characteristics of the bullion piece placed by a user in contact with the bullion piece contact site of the authentication device;
- the at least one processor operable to compare measurement data for the bullion piece placed by the user in contact with the bullion piece contact site of the bullion piece authentication device to a reference set of data for authentic bullion pieces;
- the at least one processor operable to determine the authenticity of the bullion piece placed by the user in contact with the bullion piece contact site of the bullion piece authentication device; and
- the bullion piece authentication device operable to display to the user an indication of authenticity of the bullion piece.

125. The bullion piece authentication device of claim 124 wherein the authentication device transmits measured characteristics of a bullion piece over the Internet to a location remote from the authentication device.

126. The bullion piece authentication device of claim 124 wherein the authentication device charges a service fee to the user for providing an authentication service to the user.

127. The bullion piece authentication device of claim 124 wherein the authentication device makes an offer of guarantee of authenticity to the user.

128. The bullion piece authentication device of claim 124 wherein the authentication device charges a service fee to the user for providing a guarantee of authenticity to the user.

129. The bullion piece authentication device of claim 124 wherein the authentication device automatically determines for a bullion piece processed in the authentication device, based on unique surface marks of the bullion piece, the bullion piece is a specific bullion piece previously catalogued in a database.

* * * * *